US008457212B2

(12) United States Patent         (10) Patent No.:     US 8,457,212 B2
     Mitani et al.                 (45) Date of Patent:     Jun. 4, 2013

(54) IMAGE PROCESSING APPARATUS, IMAGE PROCESSING METHOD, RECORDING MEDIUM, AND PROGRAM

(75) Inventors: Koichi Mitani, Kanagawa (JP); Masakazu Ohashi, Kanagawa (JP); Akira Sugiyama, Kanagawa (JP); Norio Kono, Kanagawa (JP)

(73) Assignee: Sony Corporation, Tokyo (JP)

( * ) Notice: Subject to any disclaimer, the term of this patent is extended or adjusted under 35 U.S.C. 154(b) by 1581 days.

(21) Appl. No.: 11/510,389

(22) Filed: Aug. 25, 2006

(65) Prior Publication Data
   US 2007/0047660 A1  Mar. 1, 2007

(30) Foreign Application Priority Data
   Aug. 26, 2005   (JP) .................................. 2005-245742

(51) Int. Cl.
   *H04N 11/02*   (2006.01)
(52) U.S. Cl.
   USPC .................................. 375/240.25; 375/240.26
(58) Field of Classification Search
   USPC ......................................... 375/240.25, 240.26
   See application file for complete search history.

(56) References Cited

U.S. PATENT DOCUMENTS

| 5,510,842 | A | * | 4/1996 | Phillips et al. | 375/240.25 |
| 5,557,332 | A | * | 9/1996 | Koyanagi et al. | 375/240.16 |
| 6,104,751 | A | * | 8/2000 | Artieri | 375/240.14 |
| 2002/0031184 | A1 | | 3/2002 | Iwata | |
| 2003/0048848 | A1 | | 3/2003 | Li et al. | |

FOREIGN PATENT DOCUMENTS

| EP | 1 542 474 | 6/2005 |
| JP | 6 351000 | 12/1994 |
| JP | 8 56334 | 2/1996 |
| JP | 9 275561 | 10/1997 |
| JP | 9 294262 | 11/1997 |
| JP | 10 178644 | 6/1998 |
| JP | 2001 352524 | 12/2001 |
| JP | 2004 310878 | 11/2004 |
| JP | 2004 343512 | 12/2004 |
| WO | WO 98/44745 | 10/1998 |

OTHER PUBLICATIONS

Chen Y-K et al.: "Media Applications on Hyper-Threading Technology" Intel Technology Journal, US, Feb. 2002, pp. 1-11, XP002296402.
English translation of the Office Action of corresponding Taiwanese application.

* cited by examiner

*Primary Examiner* — Sath V Perungavoor
*Assistant Examiner* — Jeffery Williams
(74) *Attorney, Agent, or Firm* — Frommer Lawrence & Haug LLP; William S. Frommer; Ellen Marcie Emas

(57)   ABSTRACT

An image processing apparatus includes a plurality of decoders, each decoding a predetermined region of each frame forming coded stream and an output unit receiving pixel data obtained as a result of the decoding processing by the plurality of decoders and combining the pixel data into decoded image data to output it. One subject decoder supplies, among pixel data obtained as a result of the decoding processing by the subject decoder, pixel data necessary for a different decoder to the different decoder, and also obtains, among pixel data obtained as a result of the decoding processing by the different decoder, pixel data necessary for the subject decoder from the different decoder. The subject decoder performs the decoding processing by referring to the pixel data obtained as a result of the decoding processing by the subject decoder and the pixel data obtained from the different decoder.

14 Claims, 46 Drawing Sheets

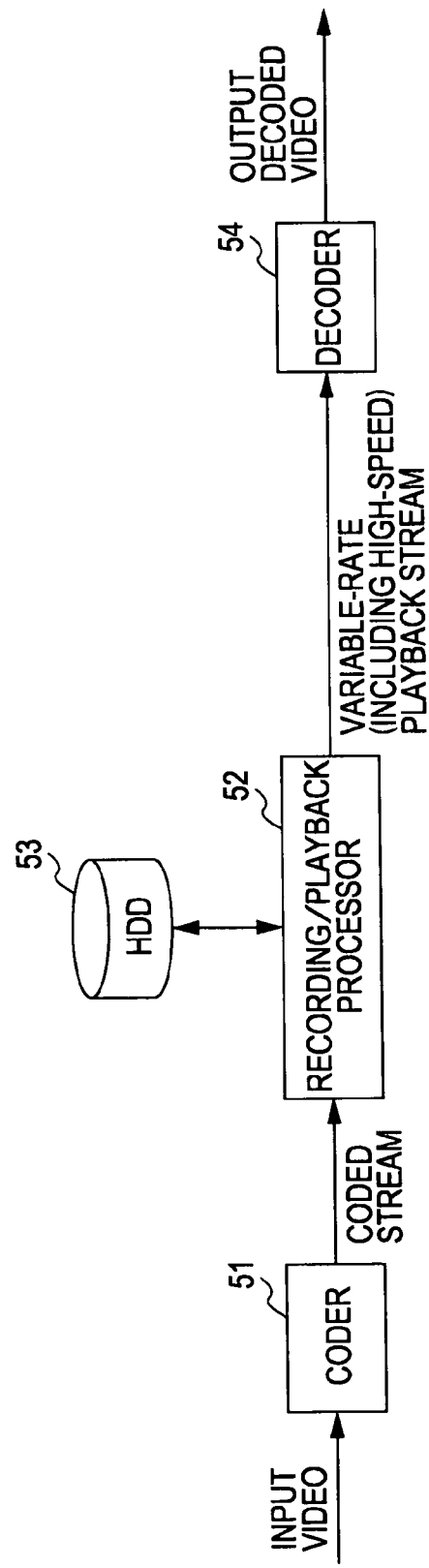

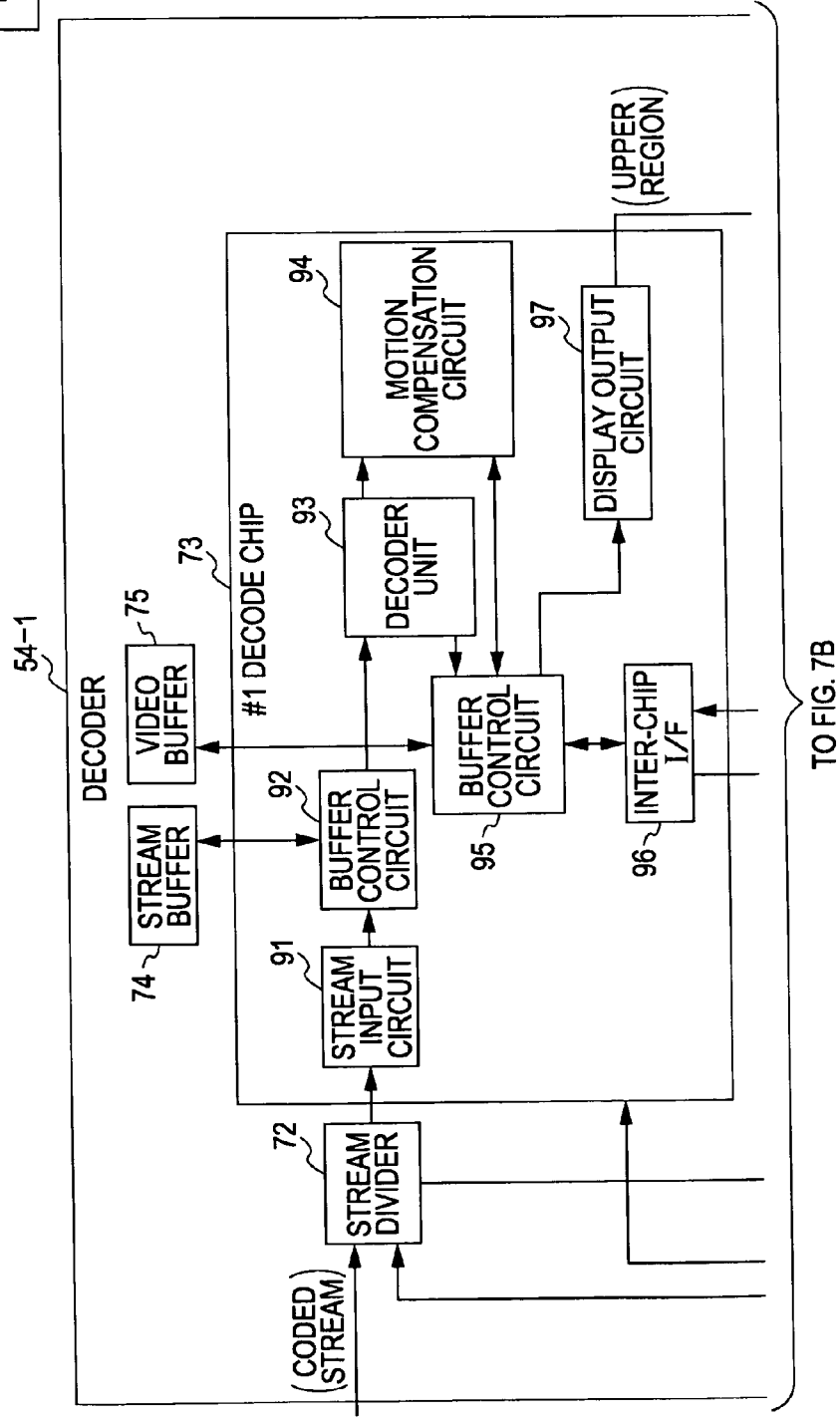

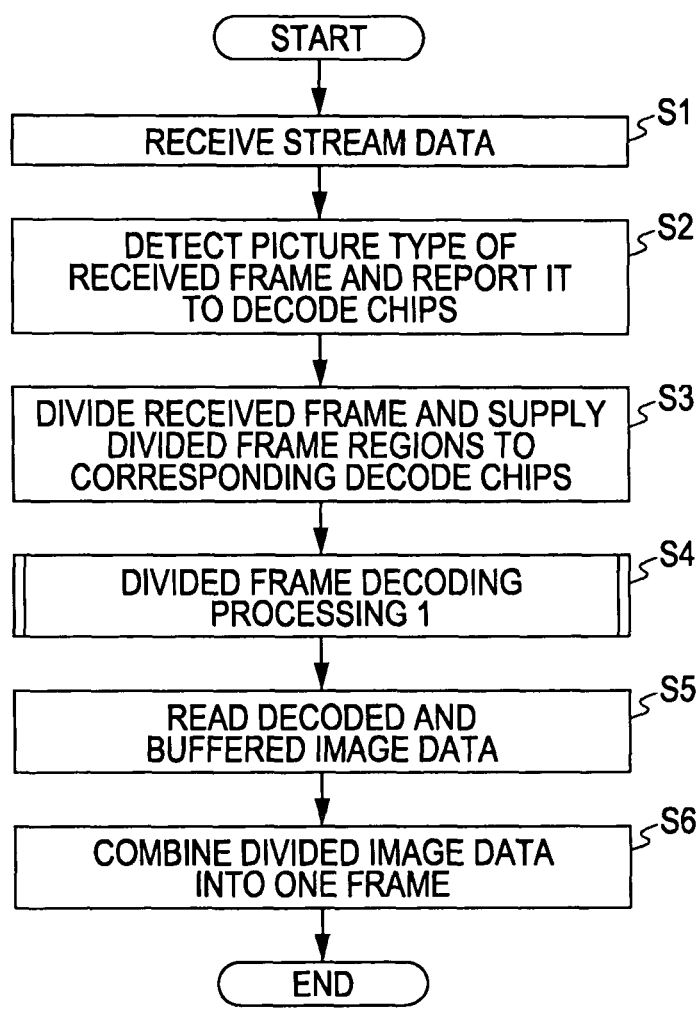

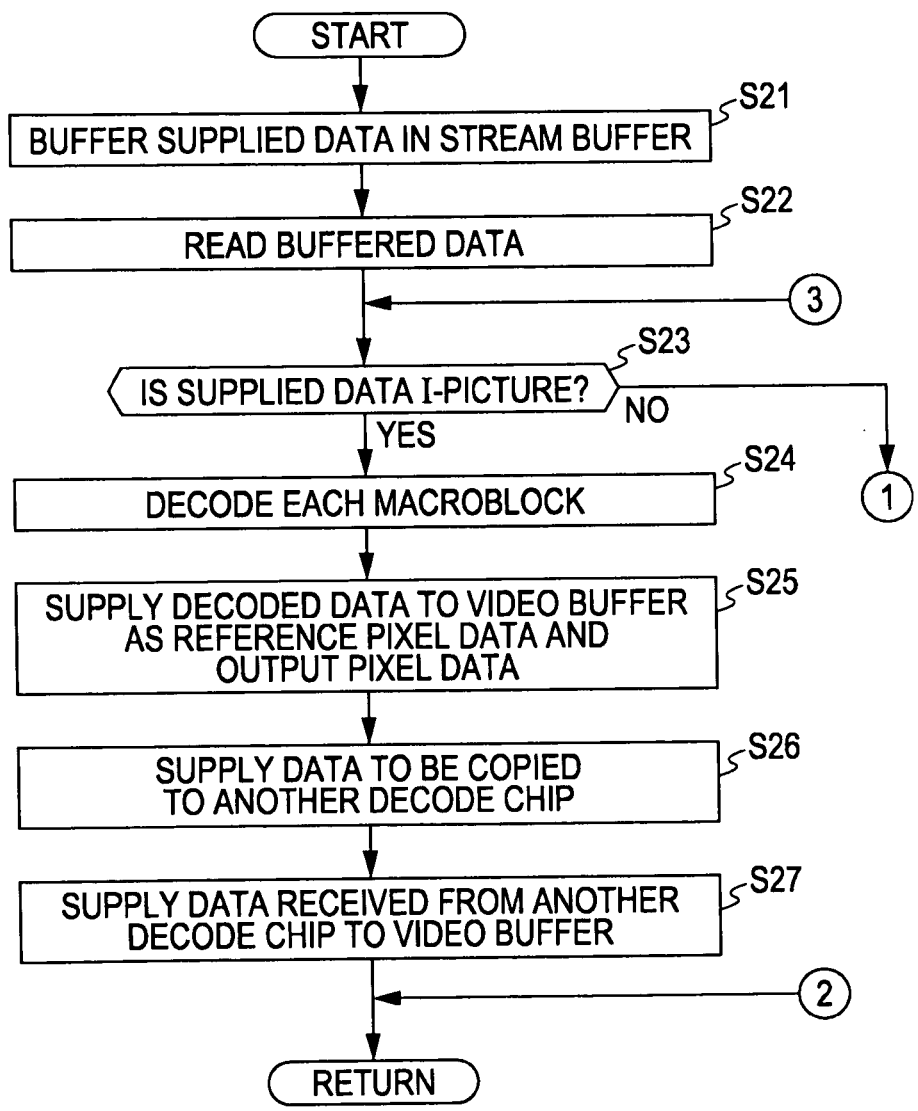

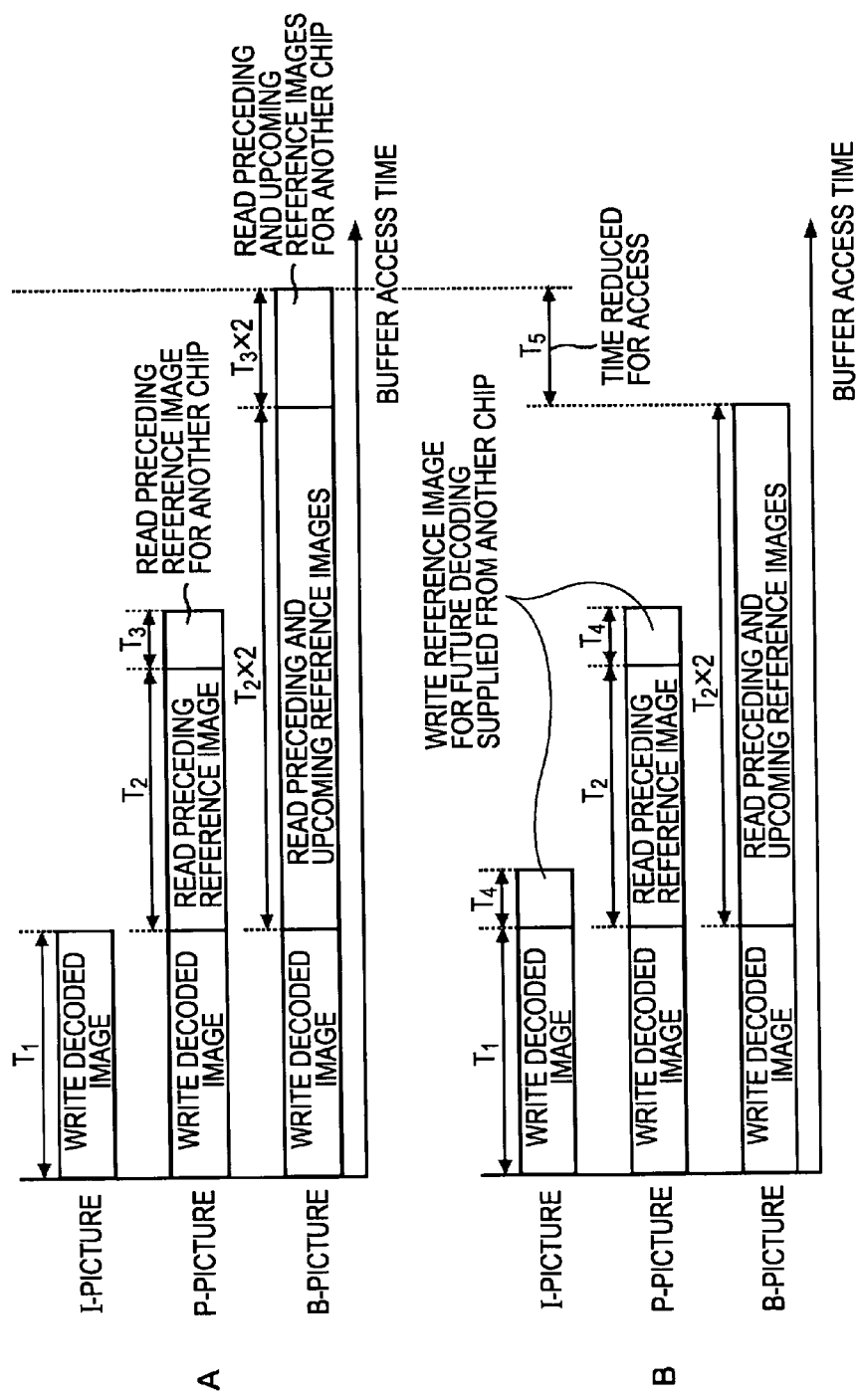

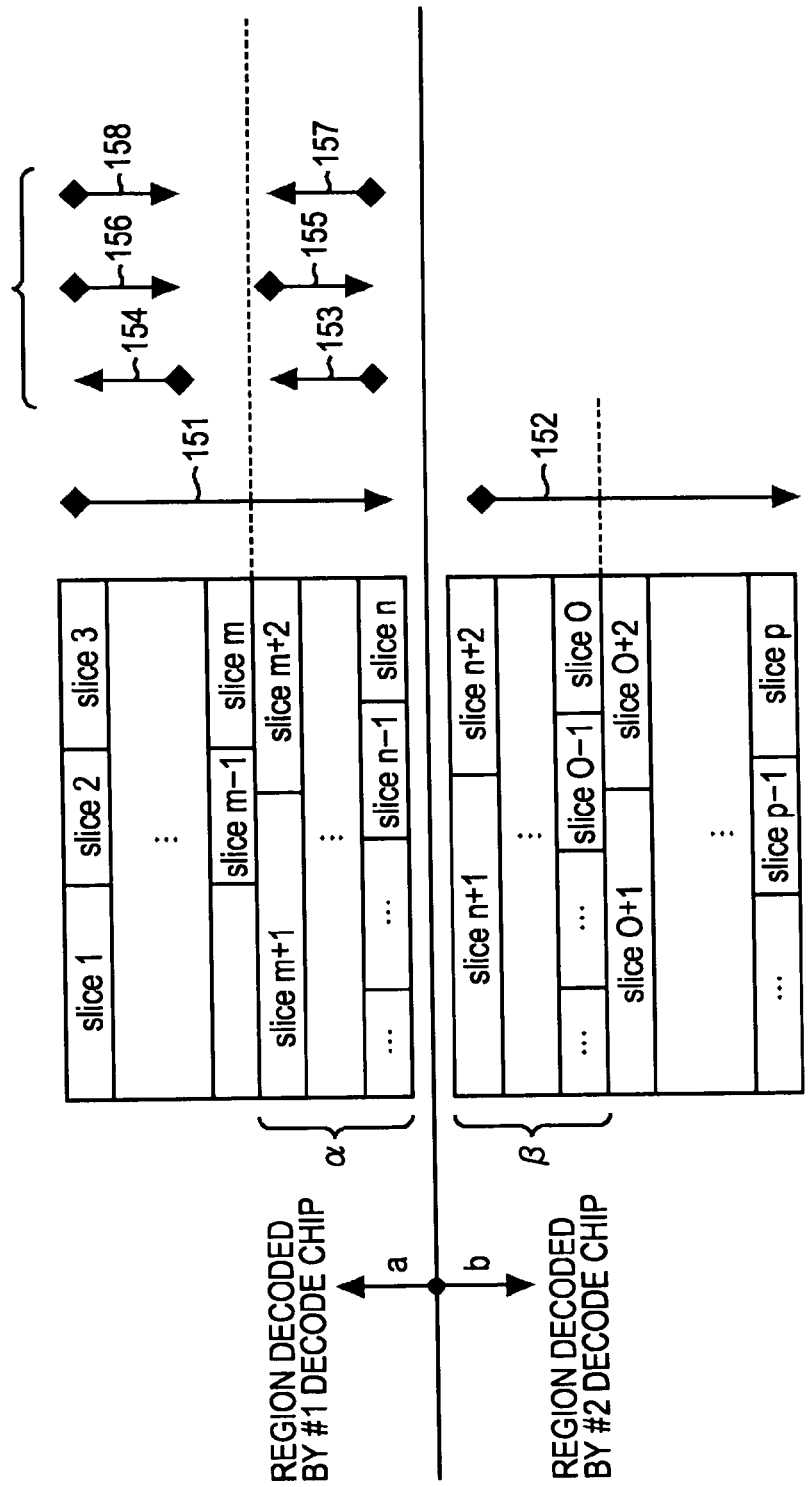

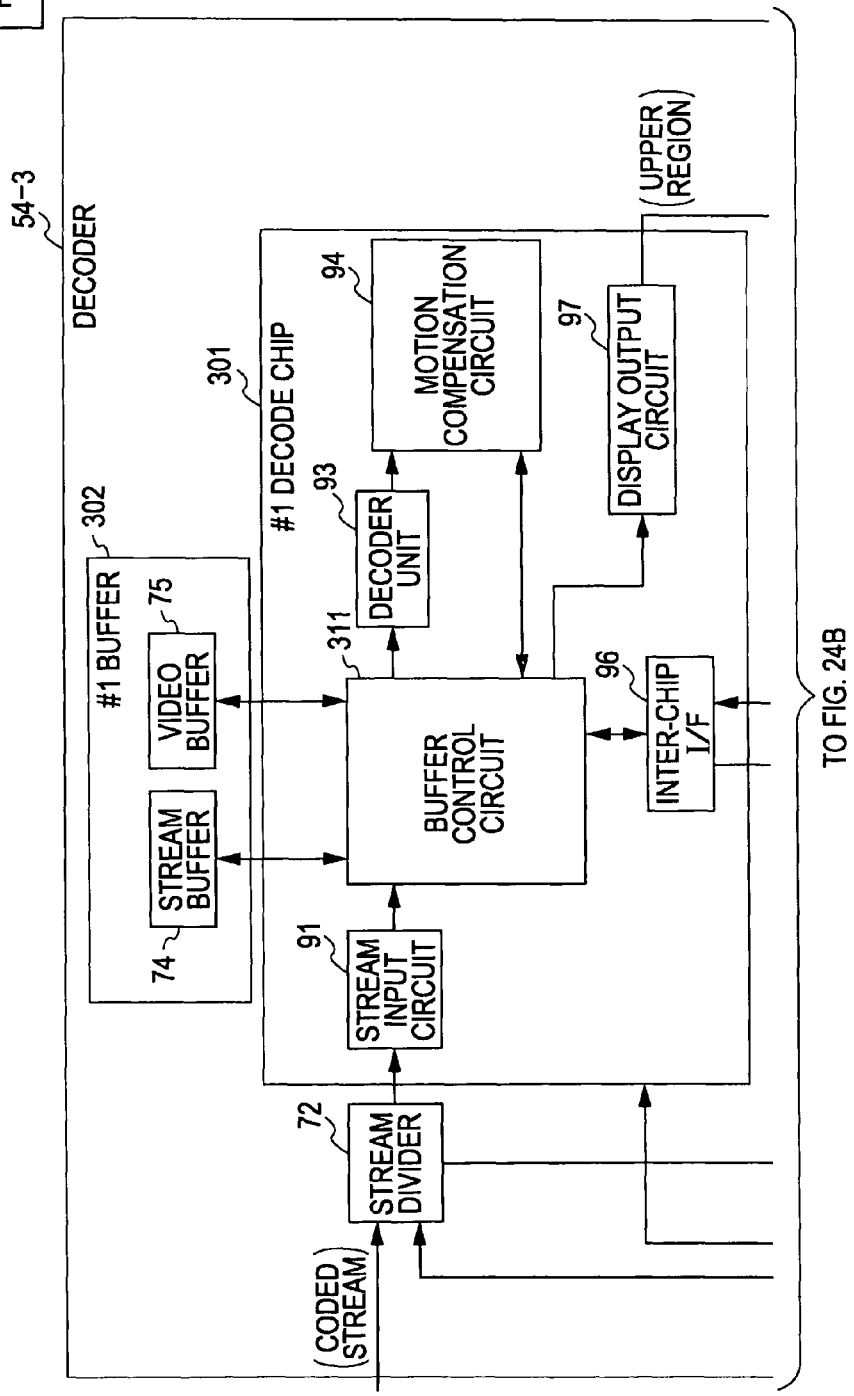

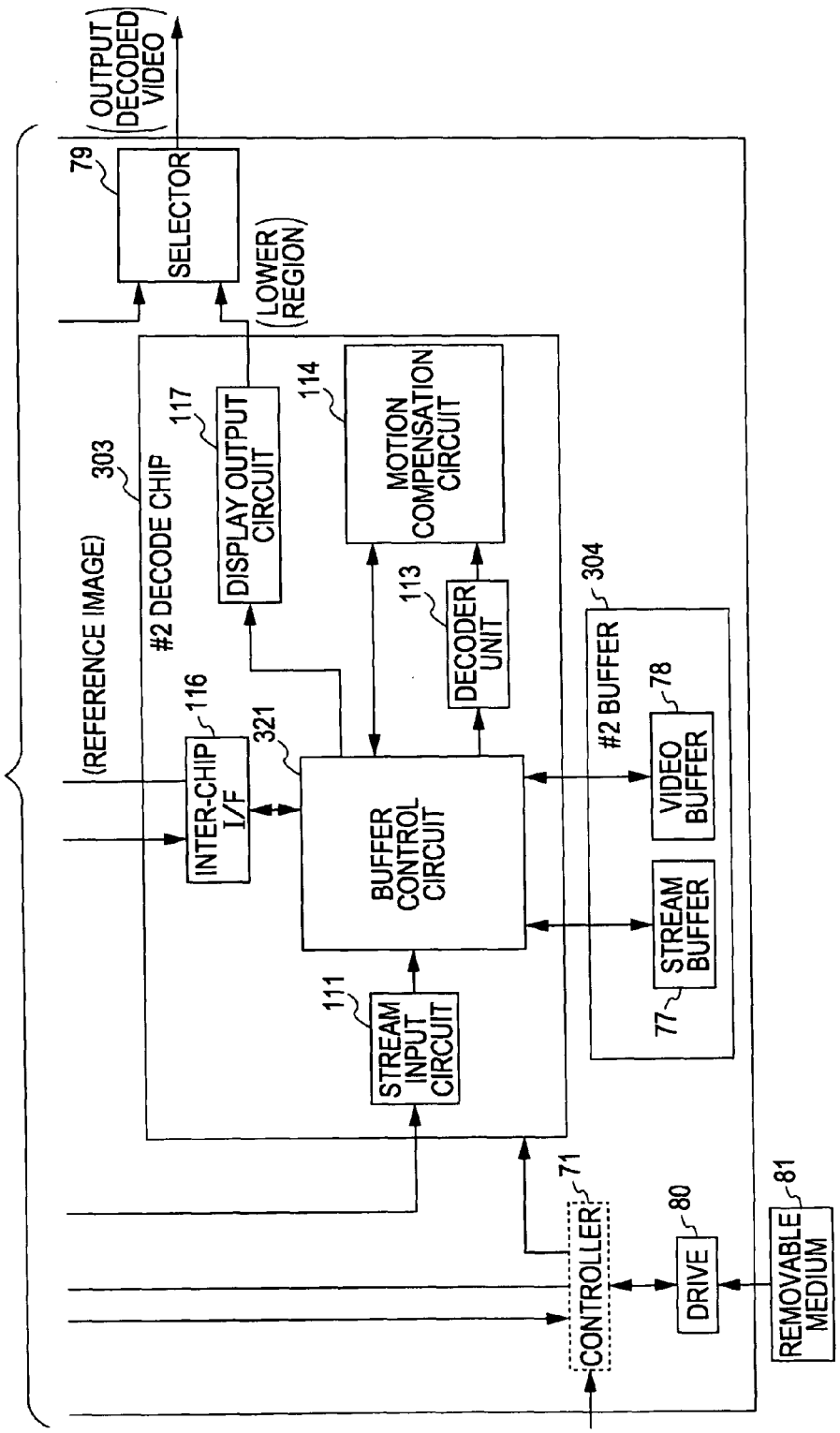

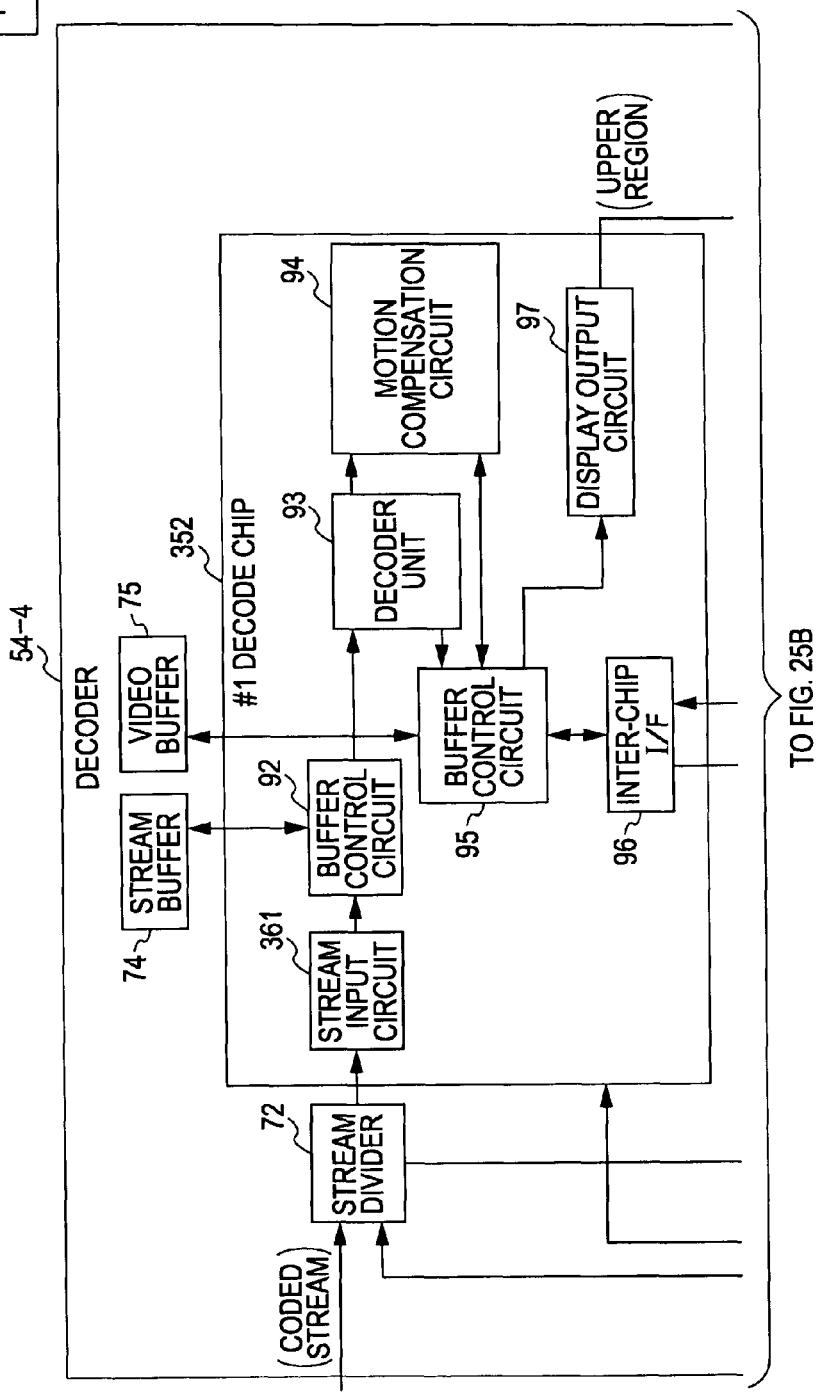

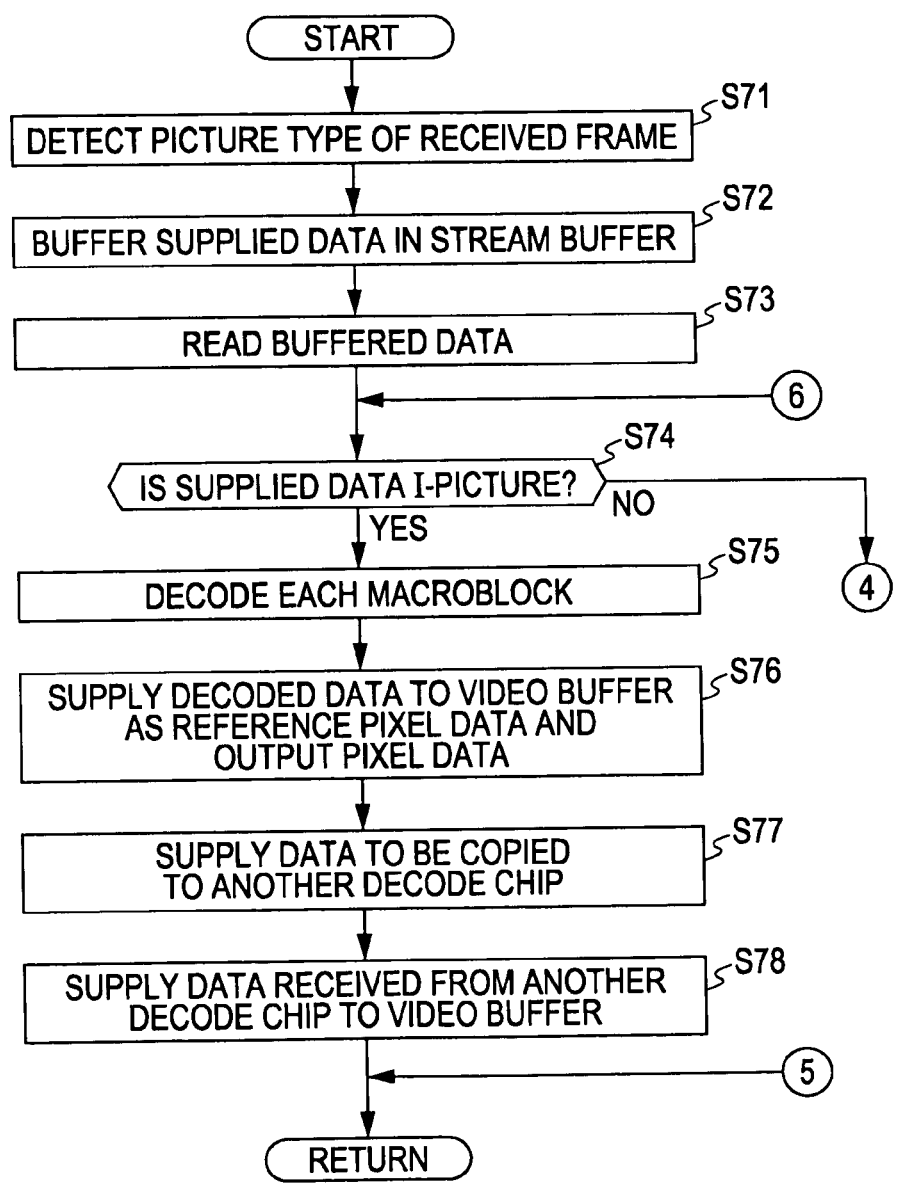

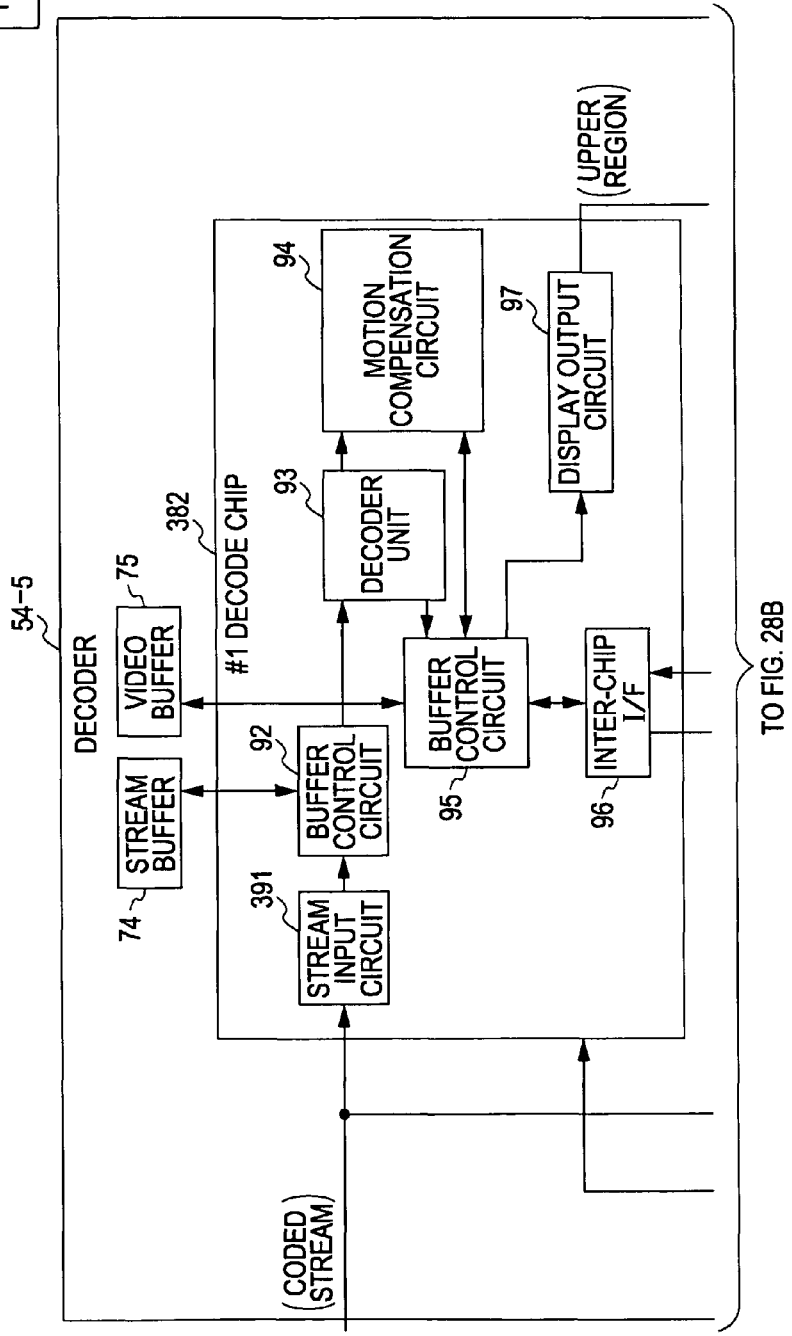

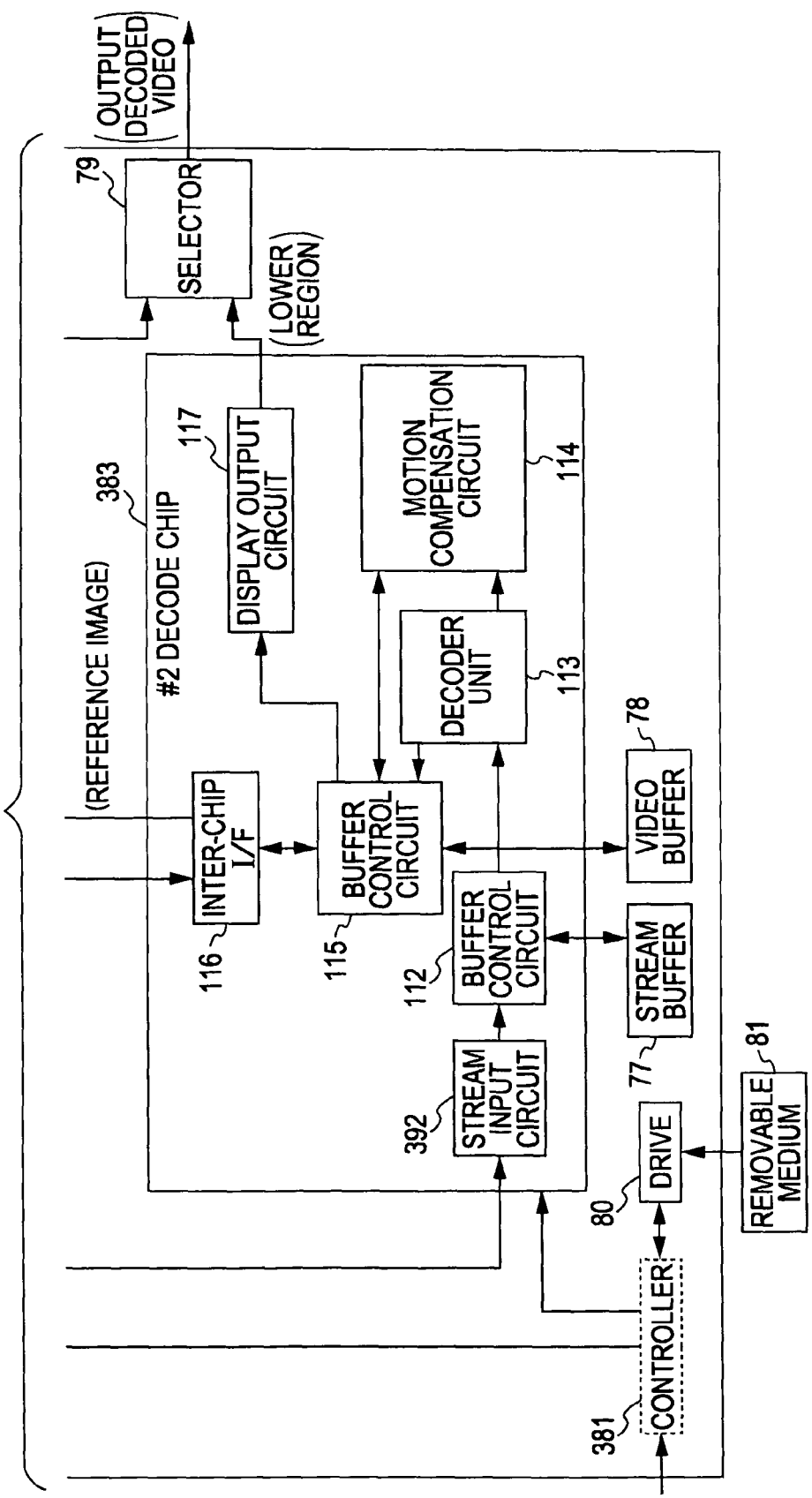

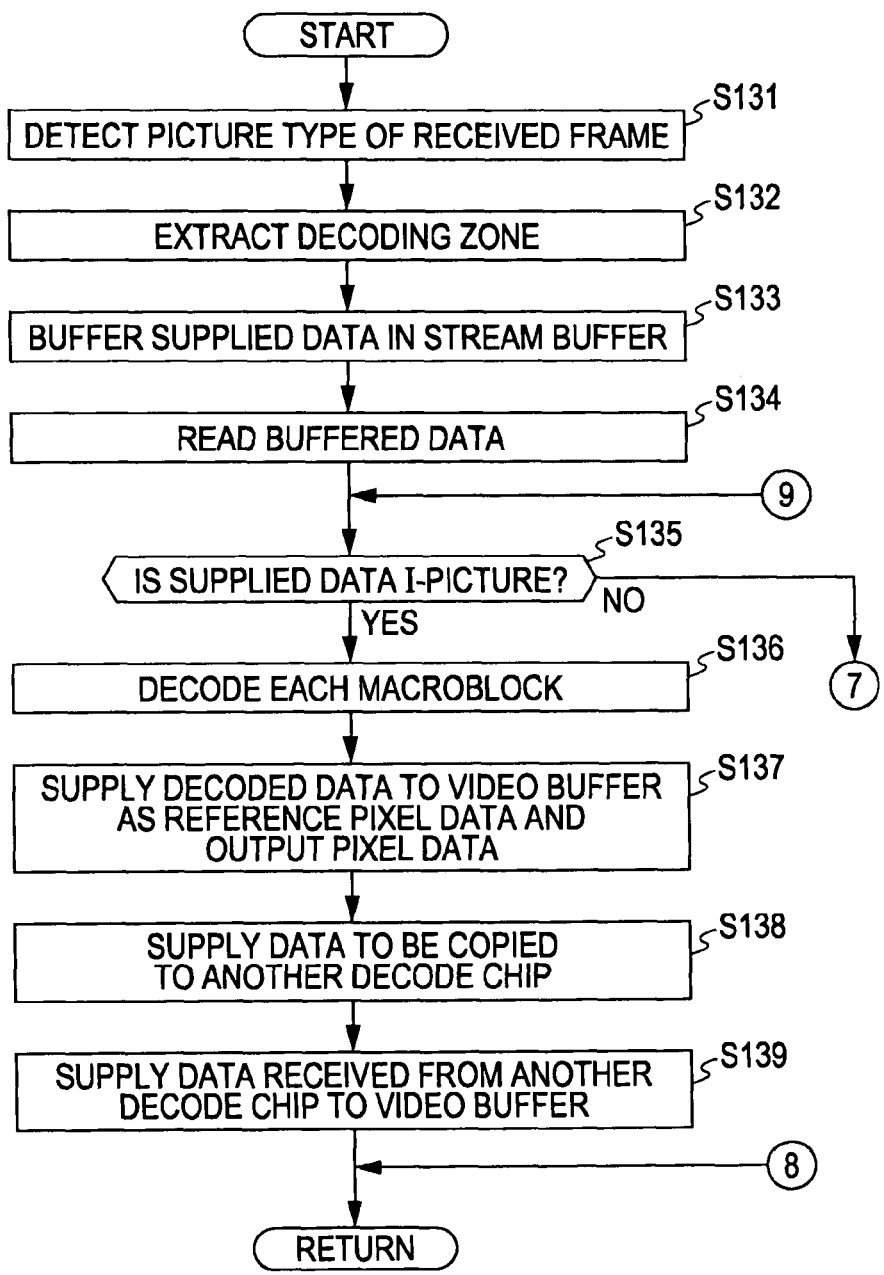

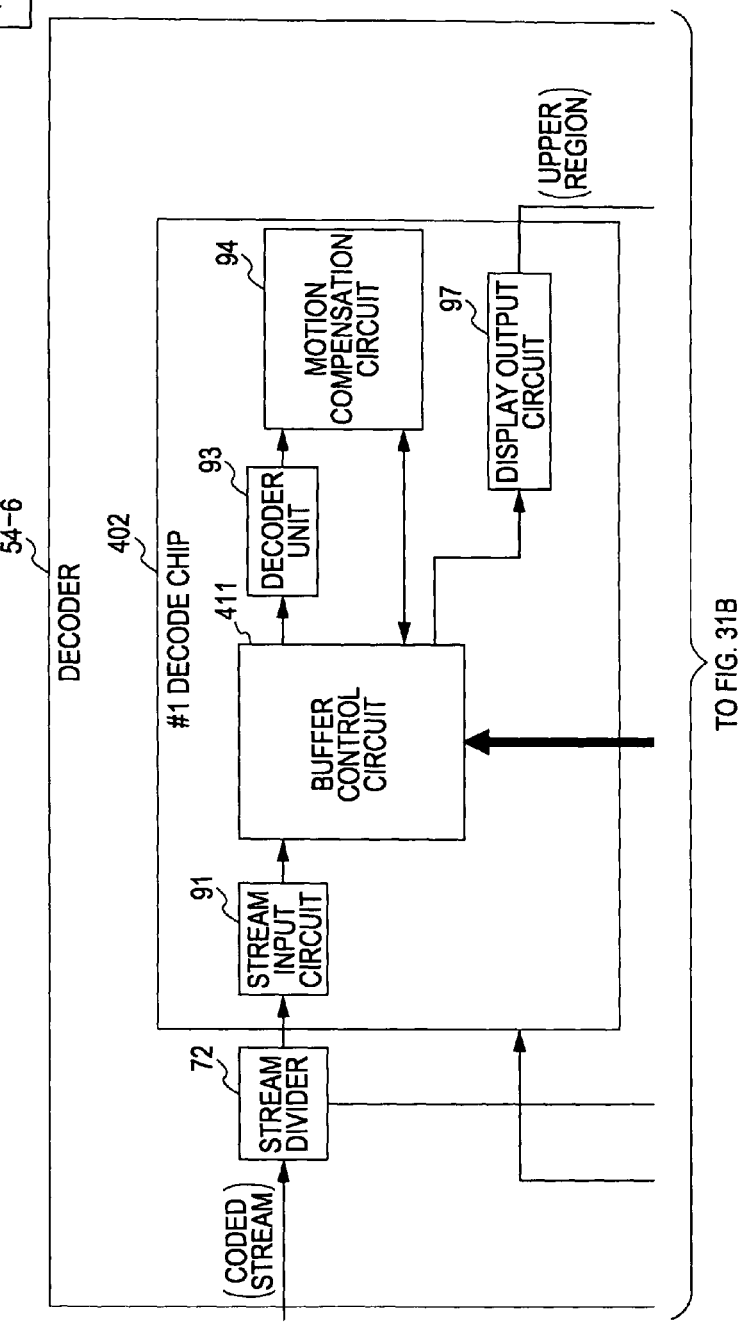

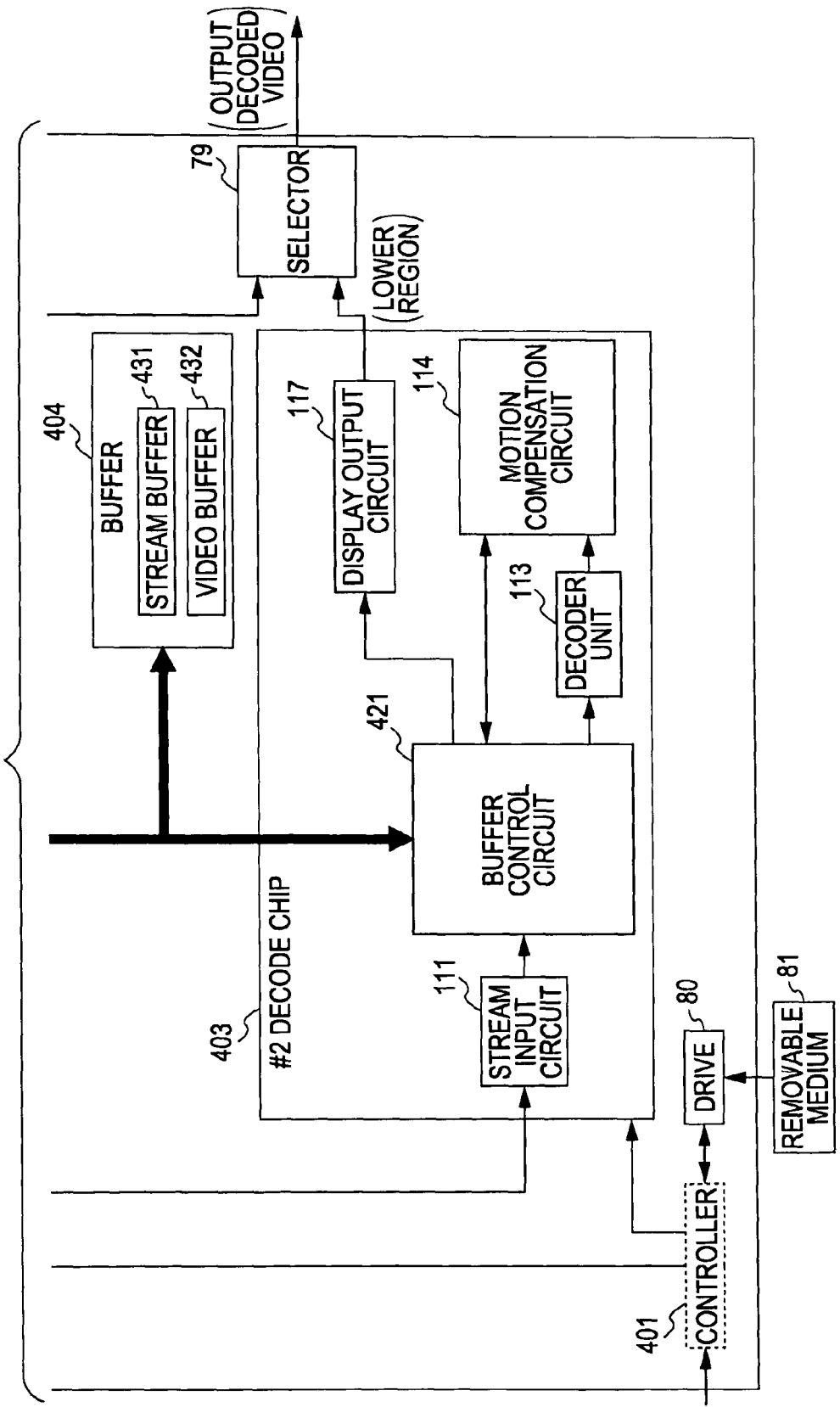

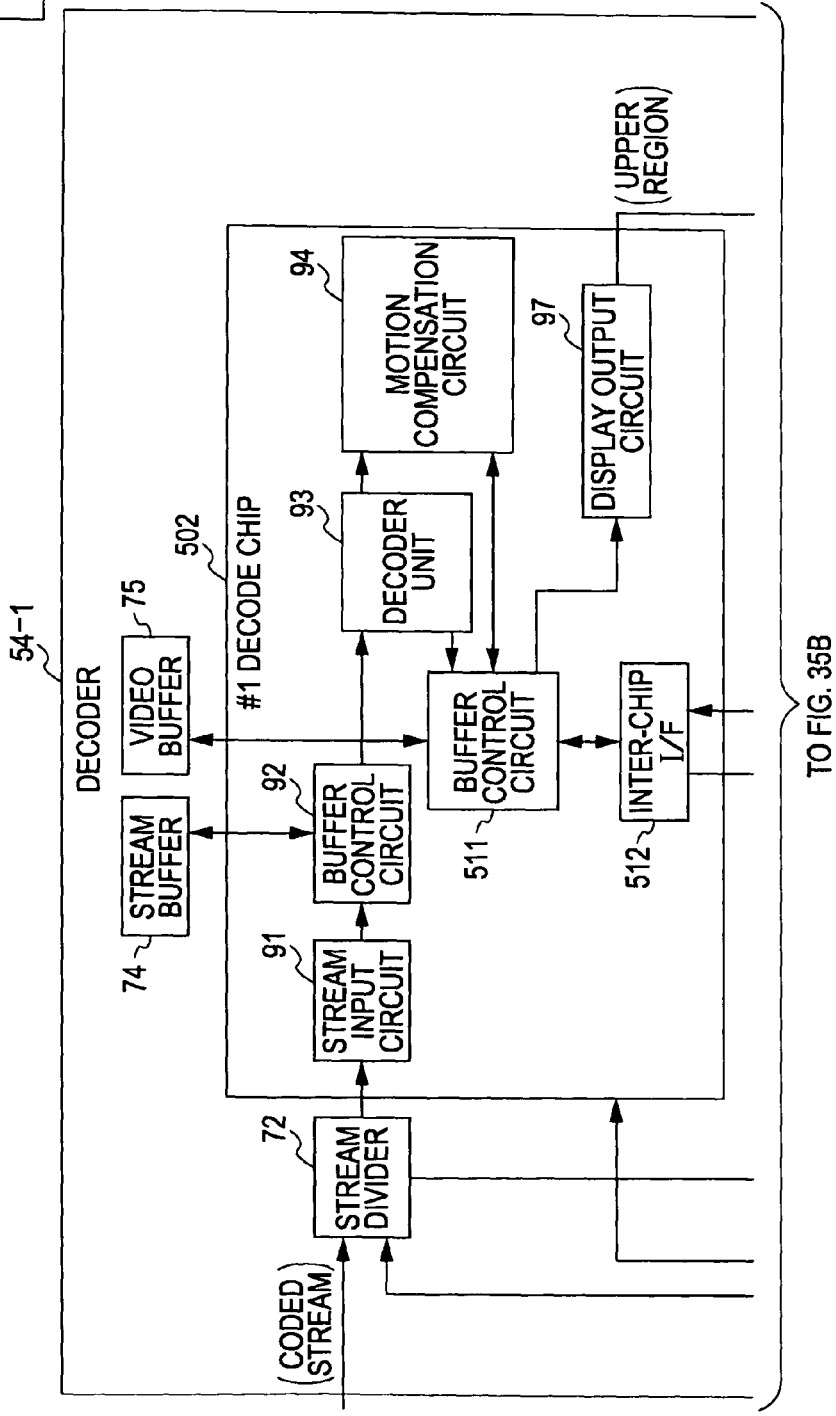

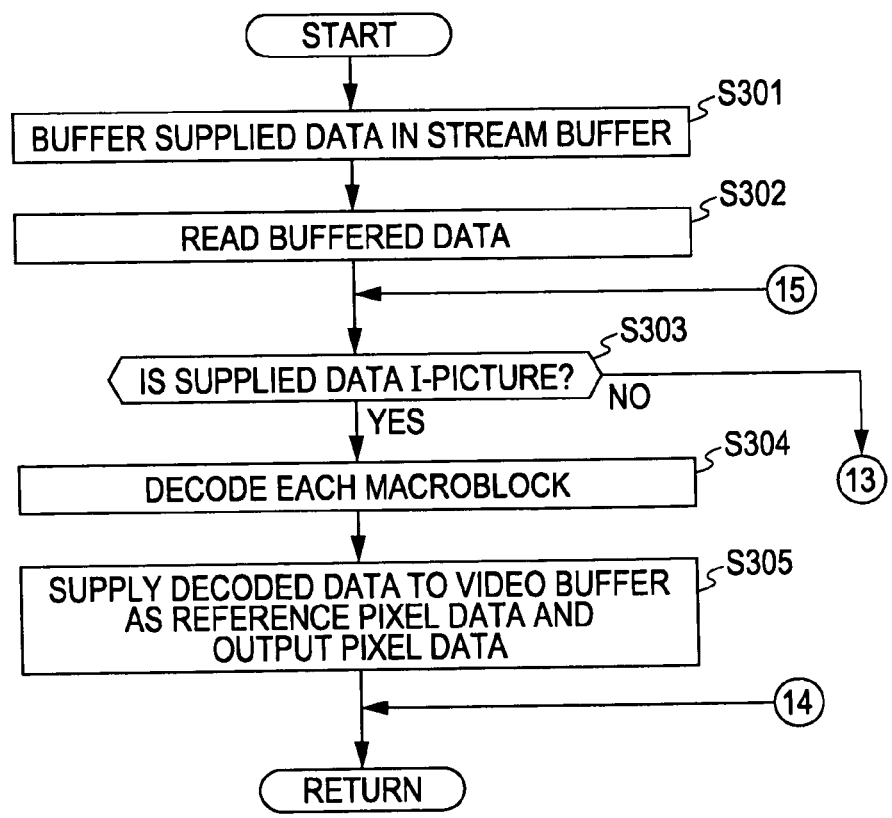

IMAGE PROCESSING APPARATUS, IMAGE PROCESSING METHOD, RECORDING MEDIUM, AND PROGRAM

CROSS REFERENCES TO RELATED APPLICATIONS

The present invention contains subject matter related to Japanese Patent Application JP 2005-245742 filed in the Japanese Patent Office on Aug. 26, 2005, the entire contents of which are incorporated herein by reference.

BACKGROUND OF THE INVENTION

1. Field of the Invention

The present invention generally relates to image processing apparatuses, image processing methods, recording media, and programs. More particularly, the invention relates to an image processing apparatus, an image processing method, a recording medium, and a program which are suitably used for decoding interframe prediction coded stream data.

2. Description of the Related Art

Moving Picture Experts Group2 (MPEG2) video is a high-efficiency coding method for video signals defined in International Standards Organization/International Electrotechnical Commission (ISO/IEC) 13818-2 and International Telecommunication Union-Telecommunication Sector (ITU-T) H.262 recommendations.

In MPEG, the coding efficiency is enhanced by determining motion-compensated differences between adjacent pixels by considering temporal redundancy of images. In an MPEG video decoder, concerning motion-compensated pixels, motion compensation is performed on a subject pixel which is currently decoded by adding reference picture data represented by the motion vector of the subject pixel to the subject pixel so that image data before being coded can be reconstructed.

An MPEG2 video stream has a hierarchical structure formed of layers, such as a sequence layer, a group-of-picture (GOP) layer, a picture layer, a slice layer, a macroblock layer, and a block layer.

A GOP includes a plurality of pictures. In MPEG2, an image is formed of three types of pictures, I-pictures (intra-coded pictures), P-pictures (predictive-coded pictures), and B-pictures (bidirectionally predictive-coded pictures). In I-pictures, all macroblocks are intra-coded (intraframe coding). P-pictures include intra-coded or inter-coded (forward (temporally preceding) interframe coded) macroblocks. B-pictures include intra-coded macroblocks, forward inter-coded macroblocks, backward (temporally upcoming) inter-coded macroblocks, or macroblocks subjected to interpolative interframe prediction coding performed by round-averaging forward inter-coded pixels and backward inter-coded pixels. Only I-pictures can be coded independently without reference to other pictures. Accordingly, operations that disturb chronological order of pictures, such as random access operations, can be easily implemented by accessing I-pictures.

The range of a GOP is from the GOP header to immediately before the next sequence header or the next GOP header. In a bit stream, the GOP header is inserted only immediately before an I-picture. Generally, since B-pictures are decoded by using bidirectional prediction, they are decoded with reference to preceding and upcoming I-pictures or P-pictures. If I-pictures or P-pictures referred to by a B-picture are located over adjacent GOPs, a GOP including such a B-picture is referred to as an "open GOP". If an open GOP is decoded singly, it is possible that some B-pictures are not decoded.

It is not always necessary, however, to perform bidirectional prediction coding on B-pictures, and the coding mode can be switched for each macroblock between bidirectional prediction, only forward prediction, only backward prediction, or without prediction. A GOP that can be decoded with reference to I-pictures or P-pictures within the same GOP is referred to as a "closed GOP". Closed GOPs can be decoded singly without preceding or upcoming GOPs.

The following technique is known. When playing back a video signal coded with a coding method for coding only a restricted number of frames at a rate of, for example, ×2 or ×3, a reproduced image presents natural motions (for example, the technique disclosed in U.S. Pat. No. 3,564,745).

SUMMARY OF THE INVENTION

A decoder that plays back an MPEG open GOP at ×2 by applying the technique disclosed in the above-described publication is described below with reference to FIGS. 1 and 2.

The above-described type of decoder is shown in FIG. 1. A decoder 1 decodes open GOP streams by performing parallel processing by using two decode chips, i.e., a #1 decode chip 11-1 and a #2 decode chip 11-2, each being capable of decoding streams at ×1.

Upon receiving a coded stream, the #1 decode chip 11-1 and the #2 decode chip 11-2 decode each picture of the coded stream at ×1 and supply the decoded image data to a selector 13. Buffers 12-1 and 12-2 buffer coded streams to be supplied to the #1 decode chip 11-1 and the #2 decode chip 11-2, respectively, or temporarily store decoded I-pictures or P-pictures used as reference pictures for decoding P-pictures or B-pictures.

The selector 13 selects, among the decoded image data supplied from the #1 decode chip 11-1 or the #2 decode chip 11-2, image data to be output as a decoded video signal, and outputs the selected image data.

In the decoder 1, the #1 decode chip 11-1 and the #2 decode chip 11-2 sequentially decode pictures forming one GOP. For example, when a fast playback operation is performed, GOPs are alternately decoded, such as GOP0 is decoded by the #1 decode chip 11-1, GOP1 is decoded by the #2 decode chip 11-2, GOP2 is decoded by the #1 decode chip 11-1, GOP3 is decoded by the #2 decode chip 11-2, and so on.

A description is now given, with reference to FIG. 2, of a case where the decoder 1 attempts to perform decoding processing at ×2.

For example, when decoding GOP1 by the #1 decode chip 11-1, for decoding two B-pictures at the head of GOP1, the #1 decode chip 11-1 should refer to the last P-picture of GOP0, and for decoding the last P-picture of GOP0, the #1 decode chip 11-1 should refer to the P-picture immediately before the last P-picture. In this manner, for decoding the two B-pictures at the head of GOP1, it is necessary to decode all I-pictures and P-pictures of GOP0 in advance.

Similarly, when decoding GOP2 by the #2 decode chip 11-2, for decoding two B-pictures at the head of GOP2, the #2 decode chip 11-2 should refer to the last P-picture of GOP1, and for decoding the last P-picture of GOP1, the #2 decode chip 11-2 should refer to the P-picture immediately before the last P-picture. In this manner, for decoding the two B-pictures at the head of GOP2, it is necessary to decode all I-pictures and P-pictures of GOP1 in advance.

That is, it is necessary that, before decoding a GOP assigned to the #1 decode chip 11-1 or the #2 decode chip 11-2, the #1 decode chip 11-1 or the #2 decode chip 11-2 decode I-pictures and P-pictures of the GOP immediately before the GOP to be decoded. Accordingly, when alternately decoding GOPs by the #1 decode chip 11-1 and the #2 decode chip 11-2 of the decoder 1 to output the decoded pictures at ×2, a delay occurs at the playback start time for GOP3 and subsequent pictures by the time necessary for decoding reference pictures, i.e., I-pictures and P-pictures of the GOP immediately before a GOP to be decoded. As a result, it is difficult to perform ×2 decoding processing.

When performing a ×2 playback operation by using a plurality of decode chips, each being capable of performing ×1 decoding, it is necessary to use, as shown in FIG. 3, in addition to the #1 decode chip 11-1, and the #2 decode chip 11-2, a third decode chip to perform parallel processing by using the three chips. With this configuration, the time necessary for decoding reference pictures, i.e., I-pictures and P-pictures of the GOP immediately before a GOP to be decoded, can be compensated for so that ×2 decoding can be performed.

If the time necessary for decoding GOP2 is represented by T, as shown in FIG. 4, and if the time $T_1$ necessary for decoding reference pictures, i.e., I-pictures and P-pictures of GOP1, for decoding GOP2 is shorter than T/2, as indicated by A in FIG. 4, it is possible to perform ×2 decoding by using three decode chips, as discussed above. If, however, the time $T_2$ necessary for decoding I-pictures and P-pictures of GOP1 for decoding GOP2 is longer than T/2, as indicated by B in FIG. 4, because, for example, the decoding times necessary for the individual pictures of GOP2 are different, it is difficult to perform ×2 decoding even by using three decode chips. It is thus necessary to add one more decode chip to decode such an open GOP at ×2.

If a stream is restricted to only closed GOPs, it is not necessary to decode I-pictures and P-pictures of the GOP immediately before a GOP to be decoded, as shown in FIG. 5, and thus, ×2 decoding processing can be performed by two decode chips. However, the coding mode, i.e., whether the stream is formed of open GOPs or closed GOPs, is determined not by the decoder 1, but by a coder when the stream is coded. Additionally, since, in closed GOPs, the reference pictures are included in the same GOP, the quality of the resulting image becomes lower than that by using open GOPs. Generally, therefore, closed GOPs are not used, except for special purposes, for example, for edited portions.

Also, in order to decode coded video streams having high frame frequencies, a plurality of decode chips, each having a ×1 decoding capacity, should be used or the clock frequency should be increased.

It is thus desirable to perform fast and high-performance decoding processing on interframe coded streams.

According to an embodiment of the present invention, there is provided an image processing apparatus for decoding a coded stream and outputting a decoded stream. The image processing apparatus includes a plurality of decoding means, each performing decoding processing on a predetermined region of each frame forming the coded stream, and output means for receiving a plurality of pixel data obtained as a result of the decoding processing performed by the plurality of decoding means and combining the plurality of pixel data into decoded image data and for outputting the decoded image data. Among the plurality of decoding means, a subject decoding means supplies, among pixel data obtained as a result of the decoding processing performed by the subject decoding means, pixel data necessary for the decoding processing performed by a different decoding means to the different decoding means, and also obtains, among pixel data obtained as a result of the decoding processing performed by the different decoding means, pixel data necessary for the decoding processing performed by the subject decoding means from the different decoding means. The subject decoding means performs the decoding processing by referring to the pixel data obtained as a result of the decoding processing performed by the subject decoding means and the pixel data obtained from the different decoding means.

The aforementioned image processing apparatus may further include a plurality of pixel data storage means, the number of pixel data storage means being the same number as the plurality of decoding means, for temporarily storing the pixel data obtained as a result of the decoding processing performed by each of the plurality of decoding means or pixel data necessary for the decoding processing performed by each of the plurality of decoding means. The subject decoding means may store the pixel data obtained as a result of the decoding processing performed by the subject decoding means and the pixel data obtained from the different decoding means in the pixel data storage means, and may perform the decoding processing by referring to the pixel data obtained as a result of the decoding processing performed by the subject decoding means and stored in the pixel data storage means and the pixel data obtained from the different decoding means and stored in the pixel data storage means.

In the aforementioned image processing apparatus, the pixel data necessary for the decoding processing performed by the different decoding means may be pixel data included in a motion vector search zone for a motion-compensation reference area included in a predetermined region decoded by the different decoding means, and the pixel data necessary for the decoding processing performed by the subject decoding means may be pixel data included in a motion vector search zone for a motion-compensation reference area included in a predetermined region decoded by the subject decoding means.

In the aforementioned image processing apparatus, each of the plurality of decoding means may be formed of one chip, and input/output terminals of the chips may be connected to each other so that the plurality of decoding means are connected to each other to send and receive the pixel data.

The aforementioned image processing apparatus may further include control means for controlling the decoding processing performed by the plurality of decoding means. The control means may detect the picture type of each picture forming the coded stream, and each of the plurality of decoding means may perform the decoding processing based on the picture type detected by the control means.

Each of the plurality of decoding means may detect the picture type of each picture forming the coded stream, and may perform the decoding processing based on the detected picture type.

The aforementioned image processing apparatus may further include stream dividing means for dividing the coded stream. Each of the plurality of decoding means may perform the decoding processing on a predetermined region of each frame forming the coded stream divided by the stream dividing means.

The stream dividing means may divide each frame forming the coded stream into the predetermined regions in units of slices, the number of slices being the same number as the plurality of decoding means.

Each of the plurality of decoding means may receive each frame forming the coded stream, divides the frame into the predetermined regions in units of slices, and extracts and decodes one of the predetermined regions, the number of slices being the same number as the plurality of decoding means.

Each of the plurality of decoding means may preferentially decode pixel data necessary for decoding processing performed by the different decoding means.

According to another embodiment of the present invention, there is provided an image processing method for an image processing apparatus for decoding a coded stream and outputting a decoded stream or a program allowing a computer to execute processing for decoding a coded stream and outputting a decoded stream. The image processing method or the program includes the steps of performing decoding processing on each predetermined region of each frame forming the coded stream by using a plurality of decoders, supplying, among pixel data obtained as a result of decoding processing performed by a subject decoder of the plurality of decoders, pixel data necessary for decoding processing performed by a different decoder to the different decoder, obtaining, among pixel data obtained as a result of the decoding processing performed by the different decoder, pixel data necessary for the decoding processing performed by the subject decoder from the different decoder, and receiving the pixel data obtained as a result of the decoding processing performed by the plurality of decoders and combining the received pixel data into decoded image data, and outputting the decoded image data. In the decoding processing, when the predetermined regions of an inter-frame prediction coded frame are decoded, the predetermined regions are decoded by referring to the pixel data obtained as a result of the decoding processing performed by the subject decoder and the pixel data necessary for the decoding processing performed by the subject decoder and obtained from the different decoder.

According to an embodiment of the present invention, a plurality of decoding means/decoders, each performs decoding processing on a predetermined region of each frame forming the coded stream. Among the plurality of decoding means/decoders, a subject decoding means/decoder supplies, among pixel data obtained as a result of the decoding processing performed by the subject decoding means/decoder, pixel data necessary for the decoding processing performed by a different decoding means/decoder to the different decoding means/decoder, and also obtains, among pixel data obtained as a result of the decoding processing performed by the different decoding means/decoder, pixel data necessary for the decoding processing performed by the subject decoding means/decoder from the different decoding means/decoder. The subject decoding means/decoder performs the decoding processing by referring to the pixel data obtained as a result of the decoding processing performed by the subject decoding means/decoder and the pixel data obtained from the different decoding means/decoder. Then, the pixel data obtained by the plurality of decoding means/decoders are combined and output.

As described above, according to an embodiment of the present invention, a coded stream can be decoded, and in particular, reference pixels can be sent and received among a plurality of decoding means/decoders. Thus, one frame can be divided, and fast and high-performance decoding on the divided frame regions can be performed.

BRIEF DESCRIPTION OF THE DRAWINGS

FIG. 6 is a block diagram illustrating a system that receives a coded stream, temporarily stores it, and decodes it while playing it back at high speed;

FIG. 15 is a flowchart illustrating decoding processing 1;

FIG. 17 illustrates access time for accessing video buffers;

FIGS. 18, 19, and 20 illustrate decoding processing orders and decoding processing rates;

FIG. 24, which is composed of FIGS. 24A and 24B, is a block diagram illustrating a third example of the configuration of a decoder according to an embodiment of the present invention;

FIG. 28, which is composed of FIGS. 28A and 28B, is a block diagram illustrating a fifth example of the configuration of a decoder according to an embodiment of the present invention;

FIG. 31, which is composed of FIGS. 31A and 31B, is a block diagram illustrating a sixth example of the configuration of a decoder according to an embodiment of the present invention;

DESCRIPTION OF THE PREFERRED EMBODIMENTS

Figure 1:
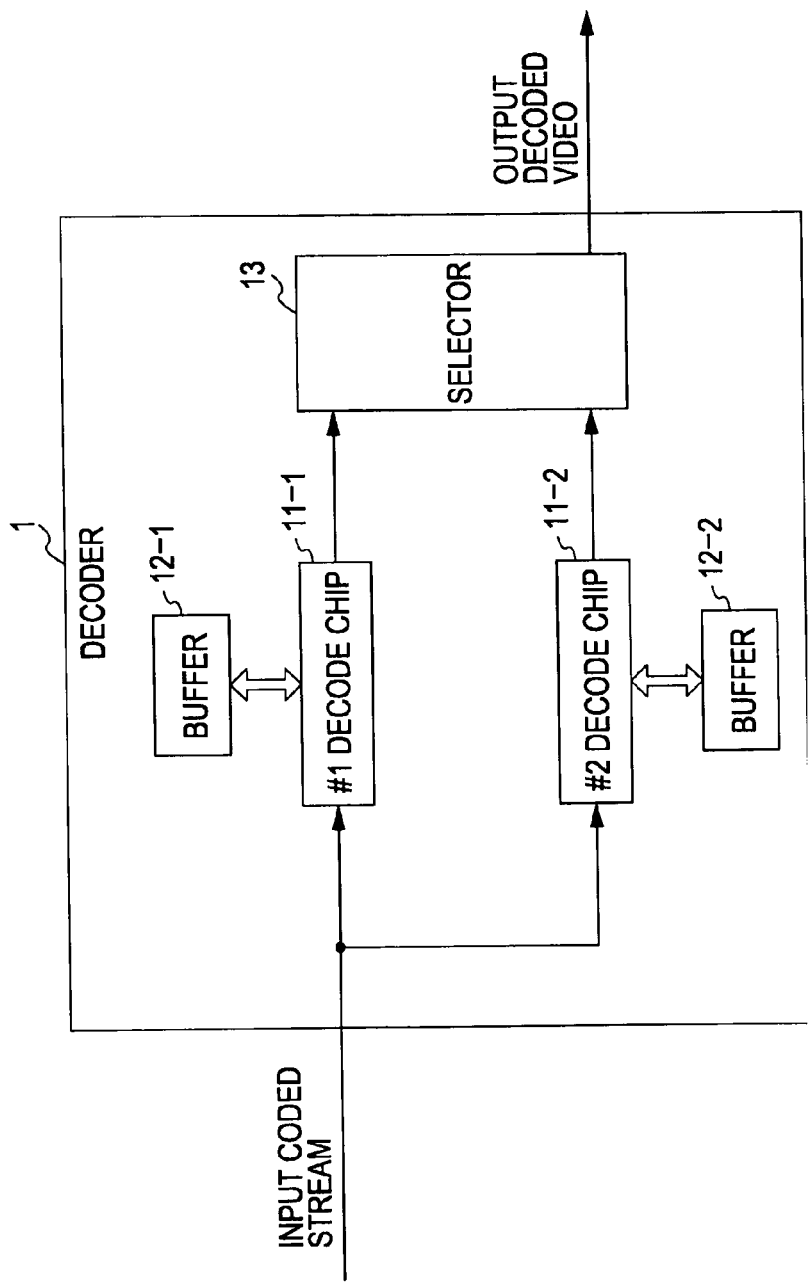
FIG. 1 is a block diagram illustrating the configuration of a known coder.
Figure 2:
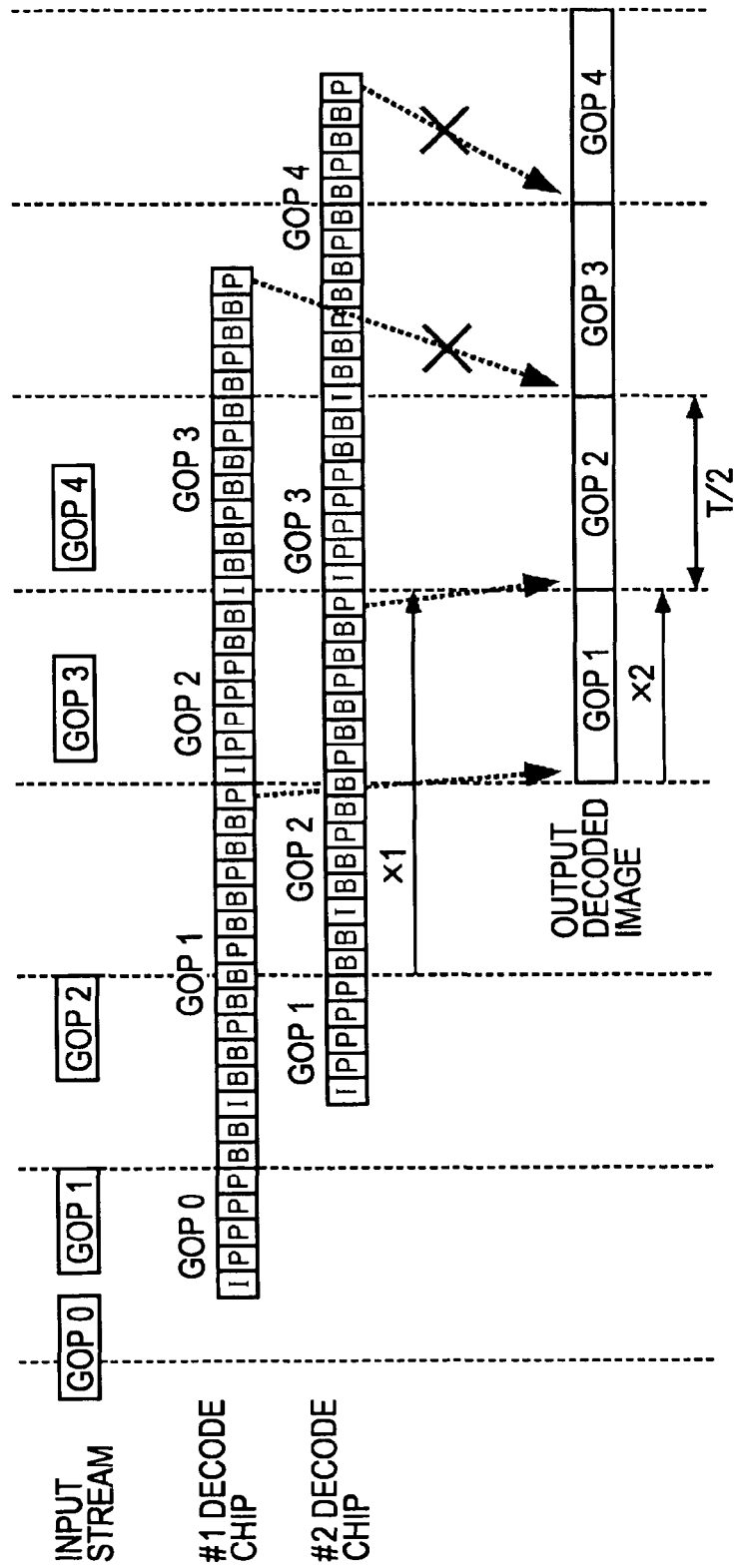
FIG. 2 illustrates a case where the known decoder shown in FIG. 1 attempts to perform decoding processing at ×2.
Figure 3:
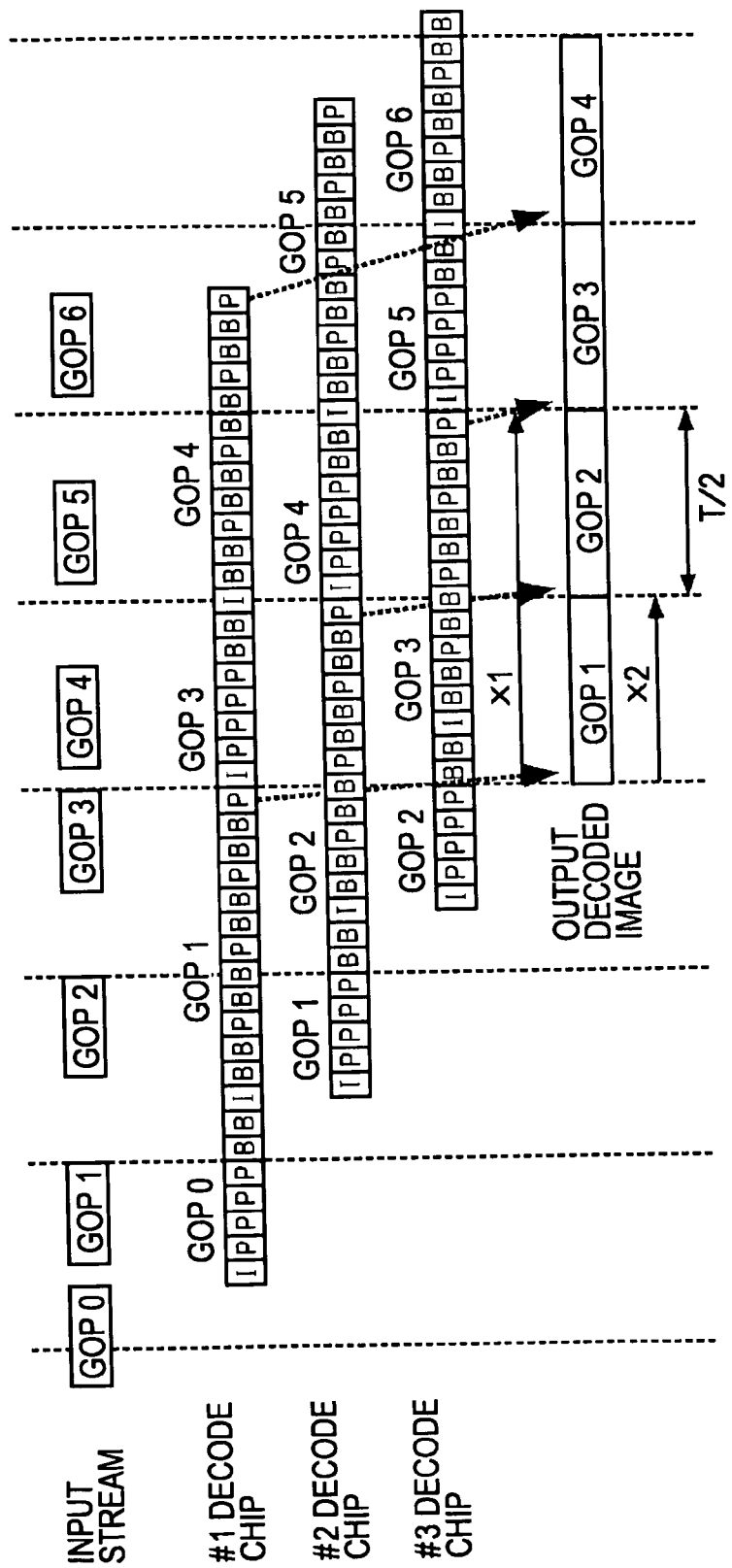
FIG. 3 illustrates processing performed by a decoder including three decode chips.
Figure 4:
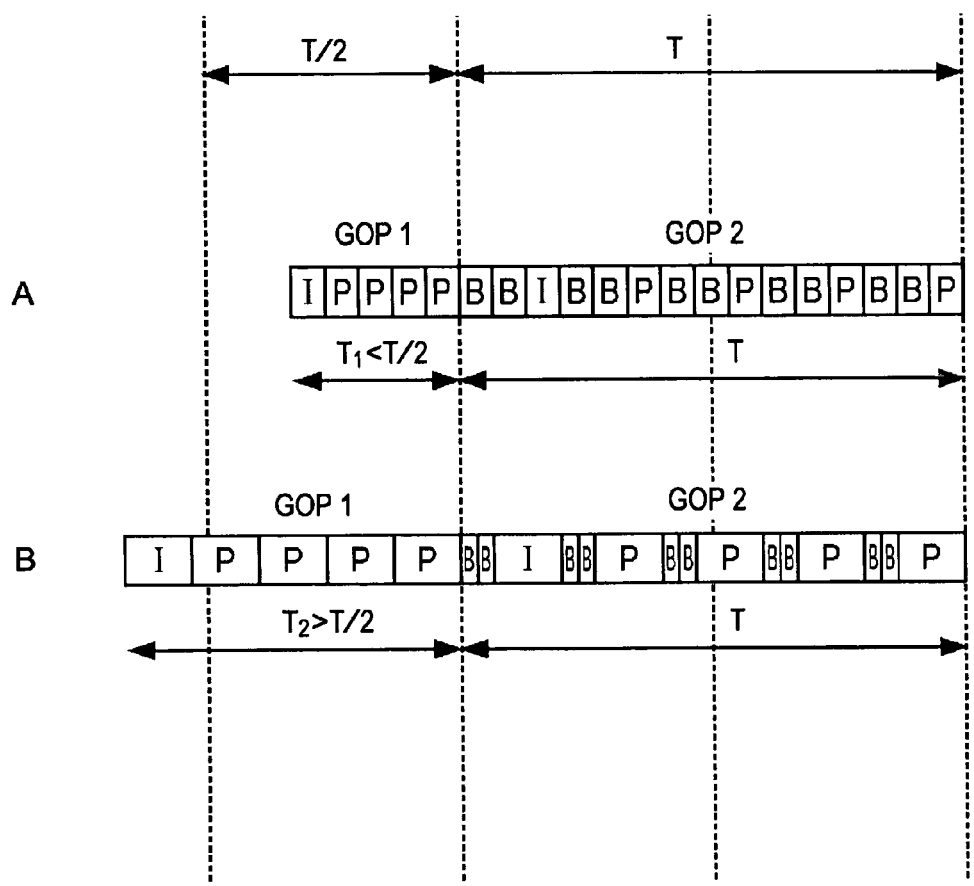
FIG. 4 illustrates a case where a decoder including three decode chips attempts to perform decoding processing at ×2.
Figure 5:
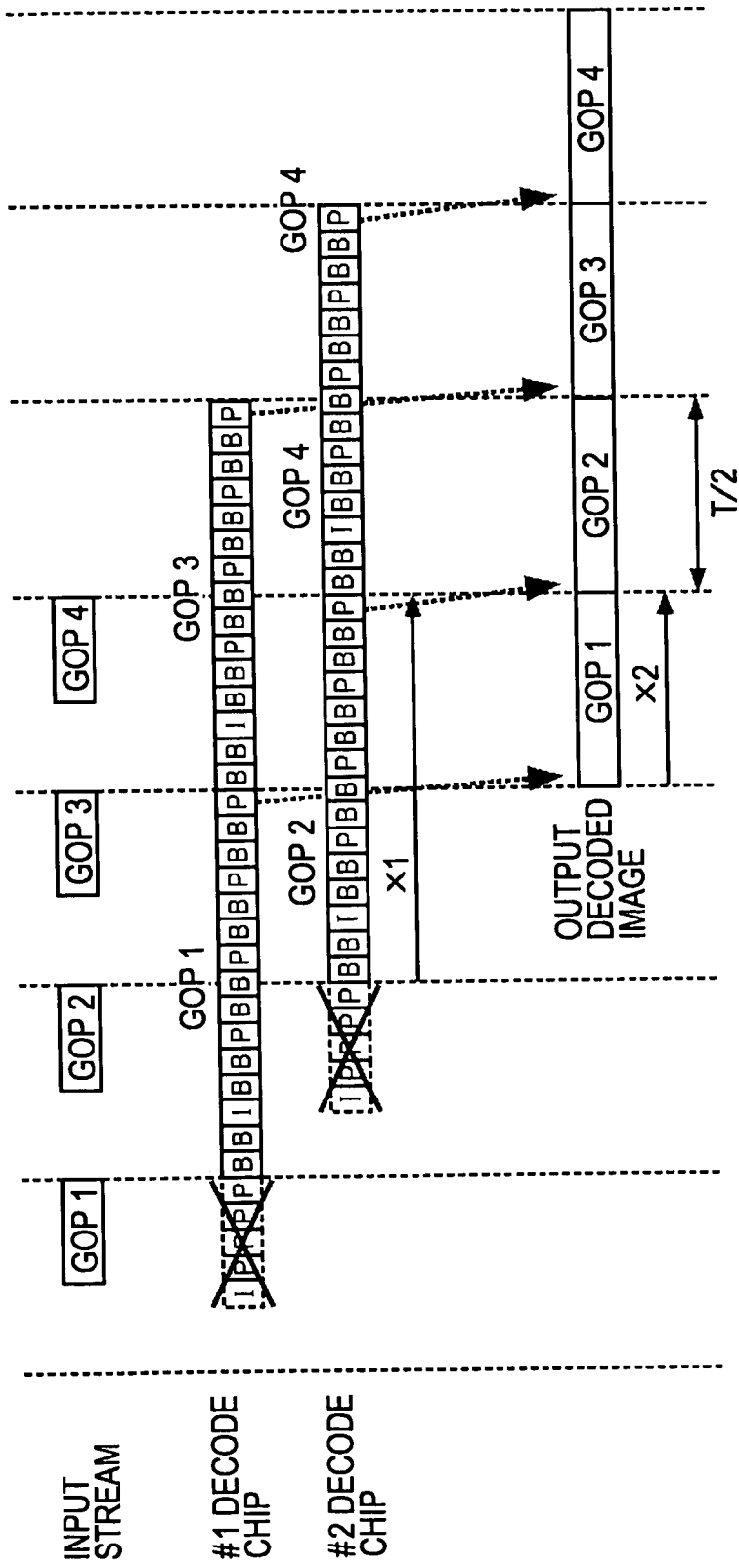
FIG. 5 illustrates processing when a known decoder decodes closed GOPs.

Before describing an embodiment of the present invention, the correspondence between the features of the claims and an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

The image processing apparatus (for example, a decoder 54-1 shown in FIG. 7, a decoder 54-2 shown in FIG. 21, a decoder 54-3 shown in FIG. 24, a decoder 54-4 shown in FIG. 25, or a decoder 54-5 shown in FIG. 28) according to an embodiment of the present invention is an image processing apparatus for decoding a coded stream and outputting a decoded stream. The image processing apparatus includes a plurality of decoding means (for example, a #1 decode chip 73 and a #2 decode chip 76 shown in FIG. 7, a #1 decode chip 203 and a #2 decode chip 205 shown in FIG. 21, a #1 decode chip 301 and a #2 decode chip 303 shown in FIG. 24, a #1 decode chip 352 and a #2 decode chip 353 shown in FIG. 25, or a #1 decode chip 382 and a #2 decode chip 383 shown in FIG. 28), each performing decoding processing on a predetermined region of each frame forming the coded stream, and output means (for example, a selector 79 shown in FIG. 7, 24, 25, or 28, or a selector 209 show in FIG. 21) for receiving a plurality of pixel data obtained as a result of the decoding processing performed by the plurality of decoding means and combining the plurality of pixel data into decoded image data and for outputting the decoded image data. Among the plurality of decoding means, a subject decoding means supplies, among pixel data obtained as a result of the decoding processing performed by the subject decoding means, pixel data (for example, pixel data in an area indicated by α or β in FIG. 10) necessary for the decoding processing performed by a different decoding means to the different decoding means, and also obtains, among pixel data obtained as a result of the decoding processing performed by the different decoding means, pixel data necessary for the decoding processing performed by the subject decoding means from the different decoding means. The subject decoding means performs the decoding processing by referring to the pixel data obtained as a result of the decoding processing performed by the subject decoding means and the pixel data obtained from the different decoding means.

The aforementioned image processing apparatus may further include a plurality of pixel data storage means (for example, video buffers 75 and 78 shown in FIG. 7, 24, 25, or 28, or a first buffer 204, a second buffer 206, and a third buffer 208 shown in FIG. 21), the number of pixel data storage means being the same number as the plurality of decoding means, for temporarily storing the pixel data obtained as a result of the decoding processing performed by each of the plurality of decoding means or pixel data necessary for the decoding processing performed by each of the plurality of decoding means. The subject decoding means may store the pixel data obtained as a result of the decoding processing performed by the subject decoding means and the pixel data obtained from the different decoding means in the pixel data storage means, and may perform the decoding processing by referring to the pixel data obtained as a result of the decoding processing performed by the subject decoding means and stored in the pixel data storage means and the pixel data obtained from the different decoding means and stored in the pixel data storage means.

The aforementioned image processing apparatus may further include control means (for example, a controller 71 shown in FIG. 7 or 24, a controller 201 shown in FIG. 21, a controller 351 shown in FIG. 25, or a controller 381 shown in FIG. 28) for controlling the decoding processing performed by the plurality of decoding means. The control means may detect the picture type of each picture forming the coded stream, and each of the plurality of decoding means may perform the decoding processing based on the picture type detected by the control means.

The aforementioned image processing apparatus may further include stream dividing means (a stream divider 72 shown in FIG. 7, 24, 25 or a stream divider 202 shown in FIG. 21) for dividing the coded stream. Each of the plurality of decoding means may perform the decoding processing on a predetermined region of each frame forming the coded stream divided by the stream dividing means.

Each of the plurality of decoding means may preferentially decode pixel data (for example, pixel data in an area indicated by α or β in FIG. 10) necessary for decoding processing performed by the different decoding means.

According to another embodiment of the present invention, there is provided an image processing method for an image processing apparatus (for example, a decoder 54-1 shown in FIG. 7, a decoder 54-2 shown in FIG. 21, a decoder 54-3 shown in FIG. 24, a decoder 54-4 shown in FIG. 25, or a decoder 54-5 shown in FIG. 28) for decoding a coded stream and outputting a decoded stream, and a program allowing a computer to execute processing for decoding a coded stream and outputting a decoded stream. The image processing method includes the steps of performing decoding processing (for example, step S24, S29, or S34 shown in FIG. 16) on each predetermined region of each frame forming the coded stream by using a plurality of decoders (for example, a #1 decode chip 72 and a #2 decode chip 76 shown in FIG. 7, a #1 decode chip 203 and a #2 decode chip 205 shown in FIG. 21, a #1 decode chip 301 and a #2 decode chip 303 shown in FIG. 24, a #1 decode chip 352 and a #2 decode chip 353 shown in FIG. 25, or a #1 decode chip 382 and a #2 decode chip 383 shown in FIG. 28), supplying (for example, step S26 or S31 shown in FIG. 16), among pixel data obtained as a result of decoding processing performed by a subject decoder of the plurality of decoders, pixel data (for example, pixel data in an area indicated by α or β in FIG. 10) necessary for decoding processing performed by a different decoder to the different decoder, obtaining (for example, step S27 or S32 shown in FIG. 16), among pixel data obtained as a result of the decoding processing performed by the different decoder, pixel data necessary for the decoding processing performed by the subject decoder from the different decoder, and receiving the pixel data obtained as a result of the decoding processing performed by the plurality of decoders and combining the received pixel data into decoded image data, and outputting the decoded image data (for example, step S6 shown in FIG. 15). In the decoding processing, when the predetermined regions of an inter-frame prediction coded frame are decoded, the predetermined regions are decoded by referring to the pixel data obtained as a result of the decoding processing performed by the subject decoder and the pixel data necessary for the decoding processing performed by the subject decoder and obtained from the different decoder.

An embodiment of the present invention is described in detail below with reference to the accompanying drawings.

In a system shown in FIG. 6, a coded stream which is coded by, for example, MPEG2 video, is input and is temporarily stored, and is then decoded while being played back at high speed.

Upon receiving a non-compressed video stream, a coder 51 codes it by using, for example, MPEG2, and supplies the coded stream to a recording/playback processor 52.

The recording/playback processor 52 records the coded stream in a hard disk drive (HDD) 53, or plays back coded stream recorded on the HDD 53 and supplies the coded stream to a decoder 54. The recording/playback processor 52 can perform playback operations, not only at ×1, but also at variable (including fast) speeds. That is, streams to be supplied from the recording/playback processor 52 to the decoder 54 are variable-rate playback streams.

The decoder 54 decodes the supplied variable-rate playback streams and outputs the decoded video data. The decoder 54 can perform fast playback operations on the supplied variable-rate playback streams (coded streams) by using a plurality of decode chips. The decoder 54 may be configured in various manners, though details thereof are given later.

Figure 7B:
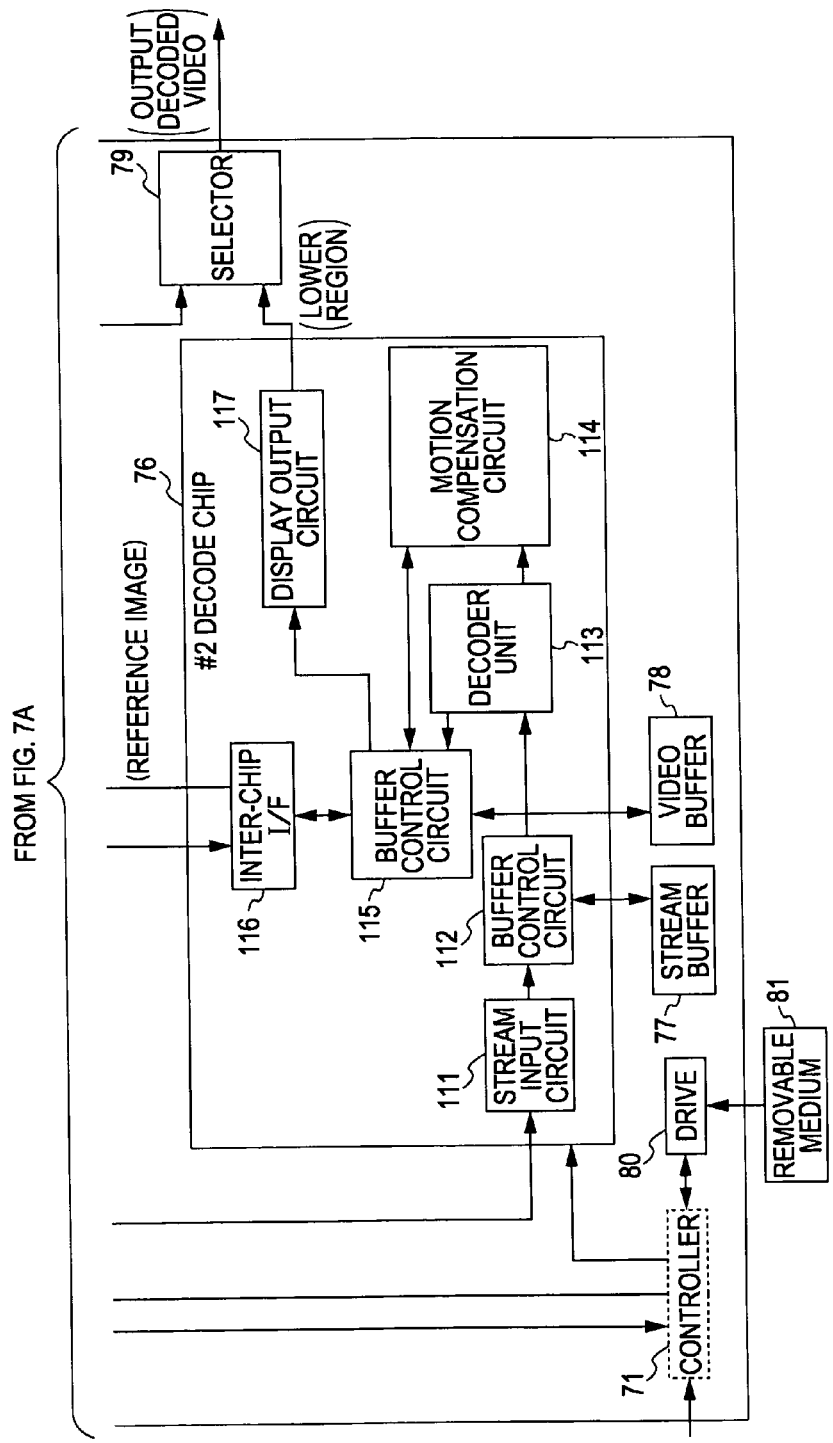
FIG. 7, which is composed of FIGS. 7A and 7B, is a block diagram illustrating a first example of the configuration of a decoder according to an embodiment of the present invention.

FIG. 7, including FIGS. 7A and 7B, is a block diagram illustrating the configuration of a decoder 54-1, which is a first example of the decoder 54. Upon receiving streams coded by MPEG2, the decoder 54-1 can decode the streams and output the decoded streams.

The decoder 54-1 includes a controller 71, a stream divider 72, a #1 decode chip 73, a stream buffer 74, a video buffer 75, a #2 decode chip 76, a stream buffer 77, a video buffer 78, and a selector 79. Although the decoder 54-1 may be provided with three or more decode chips, a description is given below, assuming that two decode chips, i.e., the #1 decode chip 73 and the #2 decode chip 76, are provided.

The controller 71 controls the overall operation of the decoder 54-1 based on the operation input from a user, a control signal supplied from an external device, or information supplied from the stream divider 72.

Figure 8A:
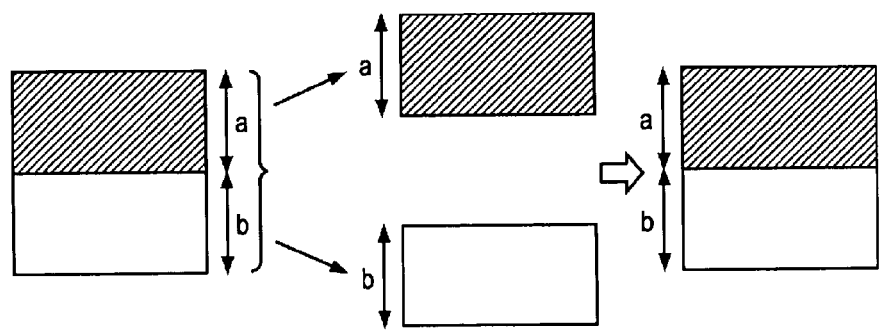
FIGS. 8A, 8B, and 8C illustrate manners of dividing frames.
Figure 8B:
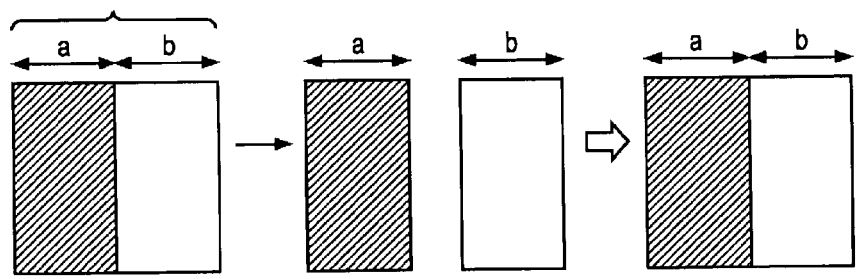
Figure 8C:
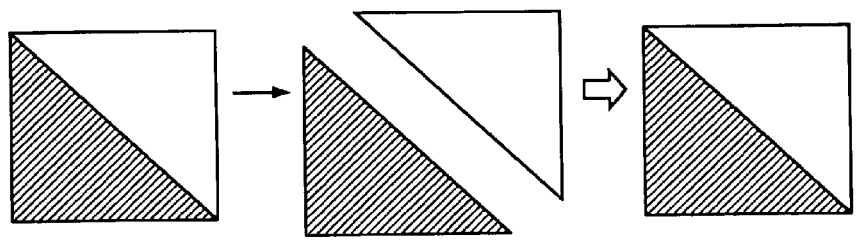

Under the control of the controller 71, the stream divider 72 decodes the sequence layer, the GOP layer, and the picture layer of a supplied coded stream, and divides each picture of the coded stream by the same number (in this case, two) as the decode chips, and allocates and supplies the divided picture regions to the #1 decode chip 73 and the #2 decode chip 76. Each picture of the input stream may be divided in the following manner, as shown in FIGS. 8A, 8B, and 8C. Each picture may be divided, as shown in FIG. 8A, in units of slices by the same number (in this case, two) as the decode chips. Alternatively, each picture may be divided vertically, as shown in FIG. 8B, by the same number (in this case, two) as the decode chips. Alternatively, each picture may be divided obliquely, as shown in FIG. 8C, by the same number (in this case, two) as the decode chips. If MPEG2 decoding is employed, dividing pictures vertically or obliquely may be more difficult than dividing pictures in units of slices.

In an MPEG2 video stream, a slice is formed of a sequence of macroblocks positioned in the same horizontal row, and the vertical position of each slice is indicated in slice_start_code. Accordingly, when dividing one picture in units of slices by the same number as decode chips, the stream divider 72 can divide each frame based on the slice start code.

The stream divider 72 also supplies information, such as the picture type, obtained as a result of decoding the sequence layer, the GOP layer, and the picture layer, of the supplied stream, to the controller 71.

The number of regions divided from each picture by the stream divider 72 may be greater than the number of decode chips, and then, the divided picture regions may be allocated to the decode chips. It is preferable, however, that the stream divider 72 divides each picture by the same number as decode chips, as shown in FIG. 8A, 8B, or 8C, and allocates one divided region to each chip decoder. With this configuration, when decoding a picture region, the area decoded by one decode chip and referred to by the other decode chip becomes smaller. This simplifies the processing for sending and receiving reference pixels between decode chips, which is described below.

A picture may be divided equally or unequally. The stream divider 72 may have the function of detecting the complexity of an image, and if the complexity of the image is very different among the picture regions, the stream divider 72 may determine the division ratio of regions (a and b in FIG. 8A or 8B) based on the complexity of the image (difficulty in coding).

The #1 decode chip 73 includes a stream input circuit 91, a buffer control circuit 92, a decoder unit 93, a motion compensation circuit 94, a buffer control circuit 95, an inter-chip interface (I/F) 96, and a display output circuit 97. Under the control of the controller 71, the #1 decode chip 73 decodes the divided picture region supplied from the stream divider 72. In this case, the #1 decode chip 73 supplies pixel data of an area contained in the picture region that may be necessary for decoding processing performed by the #2 decode chip 76 as reference picture data. The #1 decode chip 73 also receives decoded pixel data supplied from the #2 decode chip 76 and stores it in the video buffer 75, and performs decoding processing by referring to the stored pixel data if necessary.

The stream buffer 74, which is formed of, for example, a dynamic random access memory (DRAM), temporarily stores coded streams supplied to the #1 decode chip 73. The video buffer 75, which is formed of, for example, a DRAM, receives video signals (pixel data) decoded by the #1 decode chip 73 or decoded video signals (pixel data) supplied from the #2 decode chip 76, and temporarily stores such pixel data.

The #2 decode chip 76 includes a stream input circuit 111, a buffer control circuit 112, a decoder unit 113, a motion compensation circuit 114, a buffer control circuit 115, an inter-chip interface (I/F) 116, and a display output circuit 117. Under the control of the controller 71, the #2 decode chip 76 decodes the divided picture region supplied from the stream divider 72. In this case, the #2 decode chip 76 supplies pixel data of an area contained in the picture region that may be necessary for decoding processing performed by the #1 decode chip 73 as reference picture data. The #2 decode chip 76 also receives decoded pixel data supplied from the #1 decode chip 73 and stores it in the video buffer 78, and performs decoding processing by referring to the stored pixel data if necessary.

The stream buffer 77, which is formed of, for example, a DRAM, temporarily stores coded streams supplied to the #2 decode chip 76. The video buffer 78, which is formed of, for example, a DRAM, receives video signals (pixel data) decoded by the #2 decode chip 76 or decoded video signals (pixel data) supplied from the #1 decode chip 73, and temporarily stores such pixel data.

The selector 79 receives the decoded pixel data from the #1 decode chip 73 and the #2 decode chip 76, and outputs the decoded pixel data as decoded video data.

The decoder 54-1 may be provided with a drive 80, and the drive 80 is connected to the controller 71 to send and receive information to and from a removable medium 81 installed in the drive 80.

The configuration and operation of the #1 decode chip 73 are described below.

The stream input circuit 91 receives a coded stream divided by the stream divider 72 and supplies it to the buffer control circuit 92. The buffer control circuit 92 buffers the input coded stream in the stream buffer 74 based on a basic clock supplied from a clock generator circuit (not shown). The buffer control circuit 92 also reads a coded stream stored in the stream buffer 74 and outputs it to the decoder unit 93. The buffer control circuit 92 may read each slice of the coded stream in chronological order in which the slices are stored in the stream buffer 74, and outputs the read slice to the decoder unit 93. Alternatively, the buffer control circuit 92 may read each slice of the coded stream in a predetermined order, which is discussed below, and outputs the read slice to the decoder unit 93.

The decoder unit 93 decodes the input stream based on the MPEG syntax, and supplies the decoded stream to the motion compensation circuit 94. More specifically, the decoder unit 93 separates the slice layer into macroblocks to decode the macroblocks, and outputs the resulting prediction vectors and pixels to the motion compensation circuit 94.

The motion compensation circuit 94 reads decoded reference pixel data from the video buffer 75 through the buffer control circuit 95 according to whether macroblocks output from the decoder unit 93 are subjected to motion compensation, and then performs motion compensation on the macroblocks. The motion compensation circuit 94 then outputs the resulting pixel data to the buffer control circuit 95.

More specifically, if the macroblocks output from the decoder unit 93 are not subjected to motion compensation, the motion compensation circuit 94 stores the pixel data in the video buffer 75 through the buffer control circuit 95. The pixel data stored in the video buffer 75 is used as a display image and may be used as reference data for other pictures.

If the macroblocks output from the decoder unit 93 are subjected to motion compensation, the motion compensation circuit 94 reads reference pixel data from the video buffer 75 through the buffer control circuit 95 according to the prediction vectors output from the decoder unit 93. Then, the motion compensation circuit 94 performs motion compensation by adding the read reference pixel data to the pixel data supplied from the decoder unit 93. The motion compensation circuit 94 stores the motion-compensated pixel data in the video buffer 75 through the buffer control circuit 95. The pixel data stored in the video buffer 75 is used as a display image and may be used as reference data for other pictures.

The buffer control circuit 95 inputs the pixel data supplied from the motion compensation circuit 94 into the video buffer 75 according to the basic clock supplied from the clock generating circuit (not shown). The buffer control circuit 95 also inputs pixel data supplied from the #2 decode chip 76 through the inter-chip interface 96 into the video buffer 75. Additionally, the buffer control circuit 95 reads reference pixel data specified by the motion compensation circuit 94 from the pixel data stored in the video buffer 75, and supplies the reference pixel data to the motion compensation circuit 94. The buffer control circuit 95 reads pixel data stored in the video buffer 75 and supplies it to the display output circuit 97. The buffer control circuit 95 also reads, among the pixel data stored in the video buffer 75, pixel data in an area (motion vector search zone) used as reference pixels necessary for decoding processing performed by the #2 decode chip 76, and supplies the read pixel data to the #2 decode chip 76 through the inter-chip interface 96.

The display output circuit 97, which generates a synchronizing timing signal used for outputting decoded pixel data, reads the pixel data from the video buffer 75 through the buffer control circuit 95 based on the synchronizing timing signal, and outputs the pixel data as decoded video data.

The functions of the stream input circuit 111, the buffer control circuit 112, the decoder unit 113, the motion compensation circuit 114, the buffer control circuit 115, the inter-chip interface 116, and the display output circuit 117 of the #2 decode chip 76 are basically similar to the counterparts of the #1 decode chip 73, and the operation of the #2 decode chip 76 is also similar to that of the #1 decode chip 73, and thus, a detailed explanation of the #2 decode chip 76 is omitted.

The stream input circuit 111 receives a coded stream, and the buffer control circuit 112 inputs the supplied coded stream to the stream buffer 77, and also reads a coded stream stored in the stream buffer 77 and outputs the read coded stream to the decoder unit 113.

The decoder unit 113 decodes the input stream based on the MPEG syntax, and supplies the decoded stream to the motion compensation circuit 114. The motion compensation circuit 114 reads decoded reference pixel data from the video buffer 78 through the buffer control circuit 115 according to whether macroblocks output from the decoder unit 113 are subjected to motion compensation, and then performs motion compensation on the macroblocks. The motion compensation circuit 114 then outputs the resulting pixel data to the buffer control circuit 115.

If the macroblocks output from the decoder unit 113 are subjected to motion compensation, the motion compensation circuit 114 reads reference pixel data from the video buffer 78 through the buffer control circuit 115 according to the prediction vectors output from the decoder unit 113. Then, the motion compensation circuit 114 performs motion compensation by adding the read reference pixel data to the pixel data supplied from the decoder unit 113. The motion compensation circuit 114 stores the motion-compensated pixel data in the video buffer 78 via the buffer control circuit 115. The pixel data stored in the video buffer 78 is used as a display image and may be used as reference data for other pictures.

The buffer control circuit 115 inputs the pixel data supplied from the motion compensation circuit 114 into the video buffer 78, and also inputs pixel data supplied from the #1 decode chip 73 through the inter-chip interface 116 into the video buffer 78. Additionally, the buffer control circuit 115 reads reference pixel data specified by the motion compensation circuit 114 from the pixel data stored in the video buffer 78, and supplies the reference pixel data to the motion compensation circuit 114. The buffer control circuit 115 reads pixel data stored in the video buffer 78 and supplies it to the display output circuit 117. The buffer control circuit 115 also reads, among the pixel data stored in the video buffer 78, pixel data in an area (motion vector search zone) used as reference pixels necessary for decoding processing performed by the #1 decode chip 73, and supplies the read pixel data to the #1 decode chip 73 through the inter-chip interface 116. The display output circuit 117 reads the pixel data from the video buffer 78 through the buffer control circuit 115, and outputs the read pixel data as decoded video data.

For sending and receiving data between the inter-chip interface 96 of the #1 decode chip 73 and the inter-chip interface 116 of the #2 decode chip 76, it is preferable that an interface (dedicated line), for example, a data bus, for supplying data from the inter-chip interface 96 to the inter-chip interface 116, and an interface (dedicated line), for example, a data bus, for supplying data from the inter-chip interface 116 to the inter-chip interface 96, are separately provided so that one interface is used for only one-way communication without being used for the other-way communication.

If the two interfaces are independently provided without providing a common interface, such as a data bus, pixel data read from the video buffer 75 through the buffer control circuit 95 can be supplied to the inter-chip interface 116 through the inter-chip interface 96 regardless of whether data is being supplied from the inter-chip interface 116 to the inter-chip interface 96. Similarly, pixel data read from the video buffer 78 through the buffer control circuit 115 can be supplied to the inter-chip interface 96 through the inter-chip interface 116 regardless of whether data is being supplied from the inter-chip interface 96 to the inter-chip interface 116. That is, with this configuration, complicated address control accompanying data transfer, or timing control to determine when to occupy a common interface or when to send or receive data, which is necessary if a common interface is used, is not necessary. Additionally, the data transfer rate can be decreased compared to when a common interface is used.

More specifically, if a common interface is used, when sending or receiving data, a wait time is necessary if the common interface is occupied for sending and receiving other data. Additionally, before sending data from one decode chip to the other decode chip, it is necessary that a control signal for performing address control or timing control to determine when to occupy the common interface or when to transfer data be sent and received between the decode chips and that various settings for sending and receiving data be conducted based on the control signal. In contrast, if interfaces are separately provided, a wait time for sending or receiving other data is not necessary, and also, processing before sending and receiving data is not necessary. Accordingly, when sending the same amount of data within the same period of time from one decode chip to the other decode chip, the data transfer rate can be decreased compared to when a common interface is used.

The #1 decode chip 73 and the #2 decode chip 76 can be connected to each other by connecting input/output terminals of the two decode chips.

Sending and receiving decoded pixel data between the #1 decode chip 73 and the #2 decode chip 76 is described below with reference to FIGS. 9 through 14.

The stream divider 72 divides each frame of an input coded stream into two regions in units of slices, and supplies one region to the #1 decode chip 73 and the other region to the #2 decode chip 76. In this case, it is preferable that the frame is divided into only two solid regions without being fractionized, since the area decoded by one decode chip and referred to by the other decode chip when decoding P-pictures or B-pictures becomes smaller.

In the coded stream data supplied to the decoder 54, I-pictures are intra-coded without reference to other pictures, and P-pictures are coded with reference to preceding I-pictures or P-pictures (reference pictures), and B-pictures are coded with reference to preceding and upcoming I-pictures or P-pictures (reference pictures). In this case, for P-pictures and B-pictures, reference blocks that minimize errors between the corresponding macroblock contained in the reference picture and the macroblock to be decoded are searched for so that motion vectors, which indicate the displacement of the macroblock to be decoded from the reference macroblock, are determined. In this manner, the macroblock to be decoded is represented by the motion vectors, i.e., the difference.

Generally, in MPEG coding, a macroblock is composed of a 16×16 block. The decoder 54 in this embodiment may perform decoding processing on interframe coded streams other than MPEG interframe coded streams, and thus, the size of the motion-compensation base area is not restricted to a 16×16 block. The size of the motion-compensation base area may be selected from 16×16, 16×8, 8×16, 8×8, 8×4, 4×8, and 4×4, as defined in H.264. The motion-compensation base area may be based on a unit other than the block. The reference pictures referred to by macroblocks are based on motion vectors in units of half pixels, and the size of the reference pictures may vary, such as 16×16, 17×16, 16×17, 17×17, 16×8, 16×9, 17×9, or 17×8.

Figure 9:
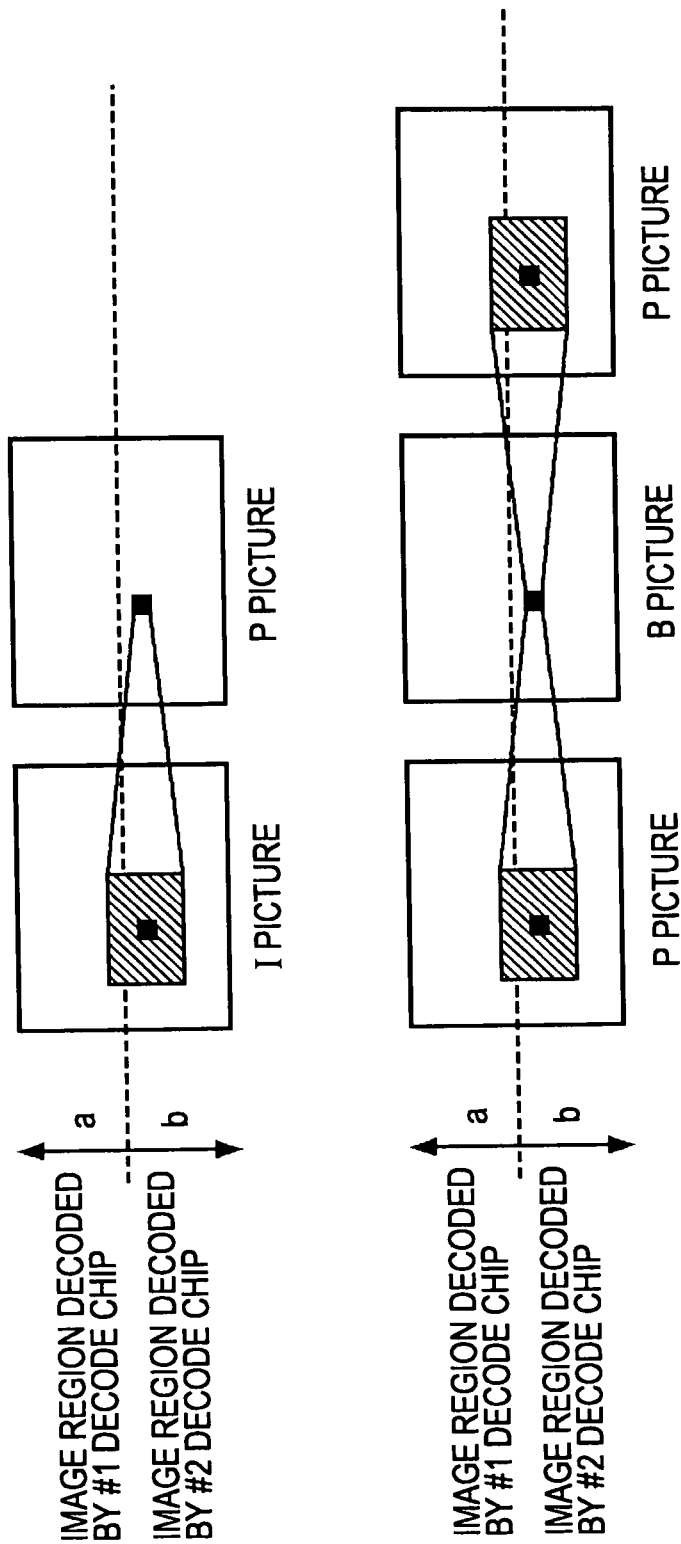
FIGS. 9 through 14 illustrate sending and receiving of reference pixels between two decode chips.

When decoding a predetermined macroblock contained in a P-picture or a B-picture by the #1 decode chip 73 or the #2 decode chip 76, information concerning the motion vector search zone for the macroblocks of a decoded reference picture is used. However, if a macroblock to be decoded by one decode chip is located near the boundary with the other decode chip, part of the motion vector search zone used as a reference picture data is included in the picture region to be decoded by the other decode chip. More specifically, when decoding a P-picture or a B-picture by the #2 decode chip 76, as shown in FIG. 9, if the macroblocks corresponding to the P-picture or B-picture in the picture region (whose vertical zone is indicated by b in FIG. 9) decoded by the #2 decode chip 76 are located near the picture region (whose vertical zone is indicated by a in FIG. 9) decoded by the #1 decode chip 73, part of the search zone for those macroblocks is included in the picture region decoded by the #1 decode chip 73.

Thus, in order to search the entire search zone including motion vectors necessary for the #1 decode chip 73 or the #2 decode chip 76, one decode chip supplies pixel data (decoded I-pictures and P-pictures) that may be contained in the motion vector search zone necessary for the other decode chip to the other decode chip in advance.

Figure 10:
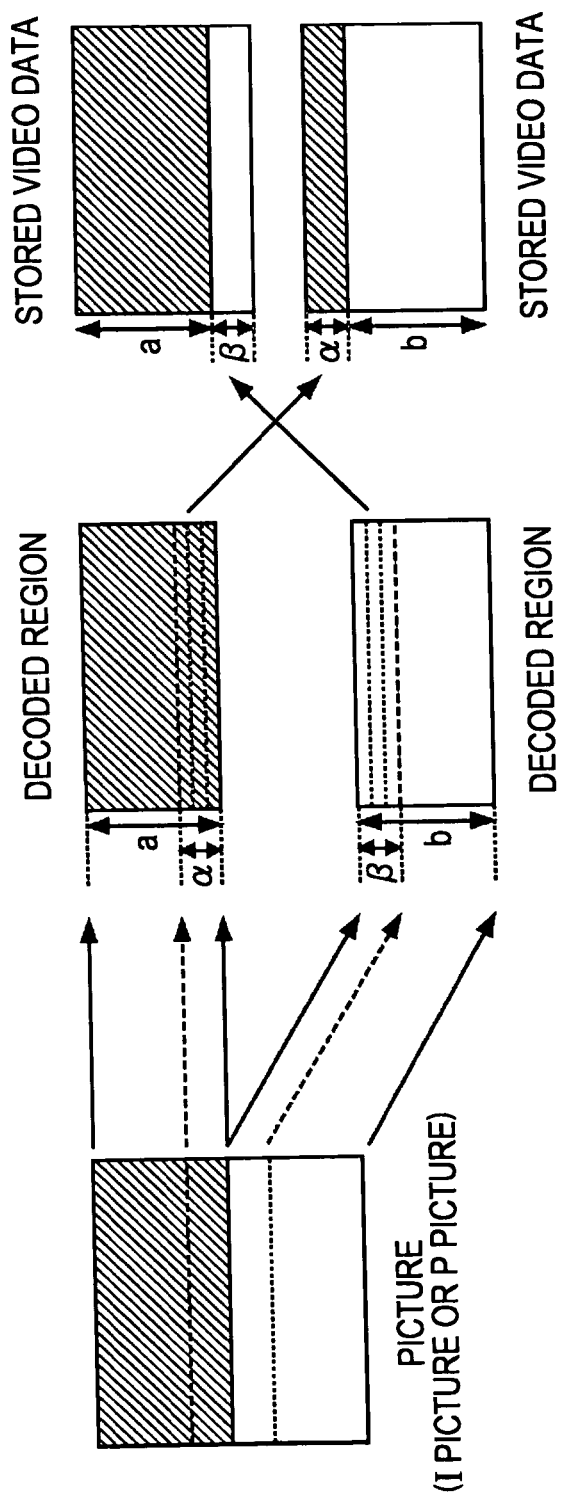

In the I-picture or P-picture decoded by the #1 decode chip 73, as shown in FIG. 10, among the picture region a decoded by the #1 decode chip 73, the picture area α (picture region close to the picture region b decoded by the #2 decode chip 76) is supplied to the #2 decode chip 76, and is stored in the video buffer 78, together with the picture region b decoded by the #2 decode chip 76, as stored video data. Similarly, in the I-picture or P-picture decoded by the #2 decode chip 76, as shown in FIG. 10, among the picture region b decoded by the #2 decode chip 76, the picture area β (picture region close to the picture region a decoded by the #1 decode chip 73) is supplied to the #1 decode chip 73, and is stored in the video buffer 75, together with the picture region a decoded by the #1 decode chip 73, as stored video data.

The area α or β shown in FIG. 10 is data that may be contained in the motion vector search zone necessary for decoding processing by the other decode chip when motion-compensation processing is performed. In interlace frame data having 1920 pixel columns and 1080 pixel rows, the motion vector search zone for motion compensation is defined as a zone having 1920 pixel columns (i.e., the maximum length) and 128 pixel rows according to the MPEG standards. Accordingly, if a coded stream decoded by the decoder 54 is interlace frame data having 1920 pixel columns and 1080 pixel rows as defined in MPEG standards, the number of rows corresponding to the width of the area α or β shown in FIG. 10, to be supplied (copied) to the other decode chip, is 128, which is defined in Table 8-8 in MPEG standards ISO/IEC13818-2 as parameter restrictions in response to levels. Since the number of rows of an area to be supplied (copied) is indicated by f_code for each picture, α and β may be determined by checking the number of rows defined in f_code.

Decoding processing for each picture, decoding processing performed by the #1 decode chip 73 and the #2 decode chip 76, and transferring decoded pixel data between the #1 decode chip 73 and the #2 decode chip 76 are specifically described below with reference to FIGS. 11 through 14. It is now assumed that, in each picture, a picture region decoded by the #1 decode chip 73 is referred to as a "first region", and a picture region decoded by the #2 decode chip 76 is referred to as a "second region".

Figure 11:
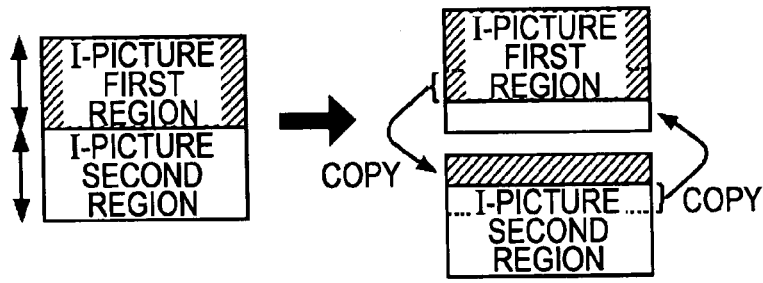

The first region and the second region divided from an I-picture, as shown in FIG. 11, are supplied to the #1 decode chip 73 and the #2 decode chip 76, respectively. The decoder unit 93 of the #1 decode chip 73 receives the I-picture first region through the buffer control circuit 92, and then decodes each slice contained in the I-picture first region. The buffer control circuit 95 supplies the decoded pixel data of the I-picture first region to the video buffer 75 and stores it therein. The buffer control circuit 95 also supplies, among the decoded pixel data of the I-picture first region, pixel data of an area (indicated by α in FIG. 10) contained in the motion-vector search area necessary for decoding processing by the #2 decode chip 76 to the inter-chip interface 96. The inter-chip interface 96 supplies the received pixel data to the inter-chip interface 116 of the #2 decode chip 76.

Meanwhile, the decoder unit 113 of the #2 decode chip 76 receives the I-picture second region through the buffer control circuit 112, and then decodes each slice contained in the I-picture second region. The buffer control circuit 115 supplies the decoded pixel data of the I-picture second region to the video buffer 78 and stores it therein. The buffer control circuit 115 also supplies, among the decoded pixel data of the I-picture second region, pixel data of an area (indicated by β in FIG. 10) contained in the motion-vector search area necessary for decoding processing by the #1 decode chip 73 to the inter-chip interface 116. The inter-chip interface 116 supplies the received pixel data to the inter-chip interface 96 of the #1 decode chip 73.

The inter-chip interface 116 of the #2 decode chip 76 supplies, among the pixel data supplied from the inter-chip interface 96 of the #1 decode chip 73, i.e., among the pixel data of the I-picture first region, the pixel data of the area (indicated by α in FIG. 10) contained in the motion vector search zone necessary for decoding processing by the #2 decode chip 76 to the buffer control circuit 115. The buffer control circuit 115 supplies the received pixel data to the video buffer 78. The inter-chip interface 96 of the #1 decode chip 73 supplies, among the pixel data supplied from the inter-chip interface 116 of the #2 decode chip 76, i.e., among the pixel data of the I-picture second region, the pixel data of the area (indicated by β in FIG. 10) contained in the motion vector search zone necessary for decoding processing by the #1 decode chip 73 to the buffer control circuit 95. The buffer control circuit 95 supplies the received pixel data to the video buffer 75.

That is, in the video buffer 75, the pixel data of the I-picture first region, and, among the pixel data of the I-picture second region, the pixel data of the area β contained in the motion vector search zone necessary for decoding processing by the #1 decode chip 73 are stored. In the video buffer 78, the pixel data of the I-picture second region, and, among the pixel data of the I-picture first region, the pixel data of the area α contained in the motion vector search zone necessary for decoding processing by the #2 decode chip 76 are stored.

Among the pixel data stored in the video buffer 75, the pixel data of the I-picture first region is read out by the buffer control circuit 95 and is supplied to the selector 79 through the display output circuit 97. Among the pixel data stored in the video buffer 78, the pixel data of the I-picture second region is read out by the buffer control circuit 115 and is supplied to the selector 79 through the display output circuit 117.

Figure 12:
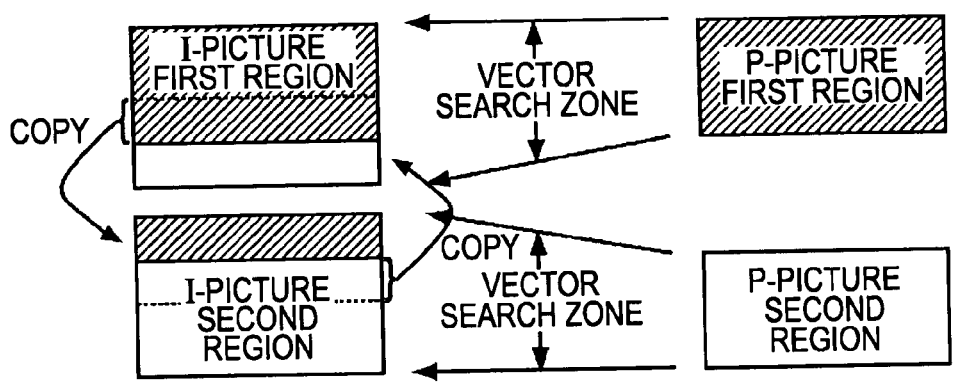

When decoding a P-picture, the pixel data of the I-picture first region stored in the video buffer 75 and, among the pixel data of the I-picture second region, the pixel data of the area contained in the motion vector search zone necessary for decoding processing by the #1 decode chip 73 stored in the video buffer 75 are read out to the buffer control circuit 95 and are used for motion compensation processing by the motion compensation circuit 94. Also, the pixel data of the I-picture second region stored in the video buffer 78 and, among the pixel data of the I-picture first region, the pixel data of the area contained in the motion vector search zone necessary for decoding processing by the #2 decode chip 76 stored in the video buffer 78 are read out to the buffer control circuit 115 and are used for motion compensation processing by the motion compensation circuit 114. That is, the motion vector search zone for each macroblock contained in the P-picture first region decoded by the #1 decode chip 73 corresponds to, as shown in FIG. 12, the I-picture first region and, among the I-picture second region, the area contained in the motion vector search zone necessary for decoding processing by the #1 decode chip 73. The motion vector search zone for each macroblock contained in the P-picture second region decoded by the #2 decode chip 76 corresponds to, as shown in FIG. 12, the I-picture second region and, among the I-picture first region, the area contained in the motion vector search zone necessary for decoding processing by the #2 decode chip 76.

The buffer control circuit 95 of the #1 decode chip 73 supplies the decoded pixel data of the P-picture first region to the video buffer 75 and stores it therein. The buffer control circuit 95 also supplies, among the decoded pixel data of the P-picture first region, the area indicated by α in FIG. 10 contained in the motion vector search zone necessary for decoding processing by the #2 decode chip 76 to the inter-chip interface 96. The inter-chip interface 96 then supplies the received pixel data to the inter-chip interface 116 of the #2 decode chip 76.

The buffer control circuit 115 of the #2 decode chip 76 supplies the decoded pixel data of the P-picture second region to the video buffer 78 and stores it therein. The buffer control circuit 115 also supplies, among the decoded pixel data of the P-picture second region, the area indicated by β in FIG. 10 contained in the motion vector search zone necessary for decoding processing by the #1 decode chip 73 to the inter-chip interface 116. The inter-chip interface 116 then supplies the received pixel data to the inter-chip interface 96 of the #1 decode chip 73.

The inter-chip interface 116 of the #2 decode chip 76 supplies the pixel data received from the inter-chip interface 96 of the #1 decode chip 73, i.e., among the pixel data of the P-picture first region, the area indicated by α in FIG. 10 contained in the motion vector search zone necessary for decoding processing by the #2 decode chip 76, to the buffer control circuit 115. The buffer control circuit 115 then supplies the received pixel data to the video buffer 78. Similarly, the inter-chip interface 96 of the #1 decode chip 73 supplies the pixel data received from the inter-chip interface 116 of the #2 decode chip 76, i.e., among the pixel data of the P-picture second region, the area indicated by β in FIG. 10 contained in the motion vector search zone necessary for decoding processing by the #1 decode chip 73, to the buffer control circuit 95. The buffer control circuit 95 then supplies the received pixel data to the video buffer 75.

Figure 13:
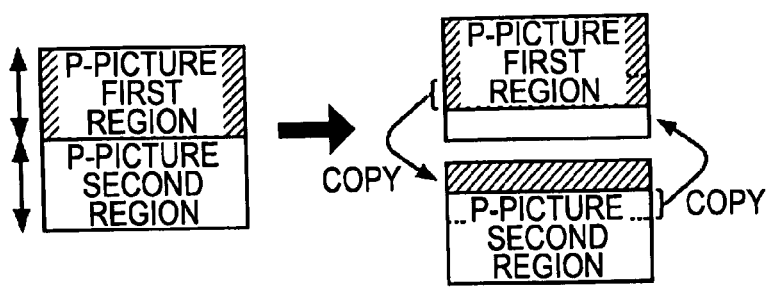

That is, as shown in FIG. 13, in the video buffer 75, the pixel data of the P-picture first region and, among the pixel data of the P-picture second region, the area β contained in the motion vector search zone necessary for decoding processing by the #1 decode chip 73, are stored. In the video buffer 78, the pixel data of the P-picture second region and, among the pixel data of the P-picture first region, the area α contained in the motion vector search zone necessary for decoding processing by the #2 decode chip 76, are stored.

Figure 14:
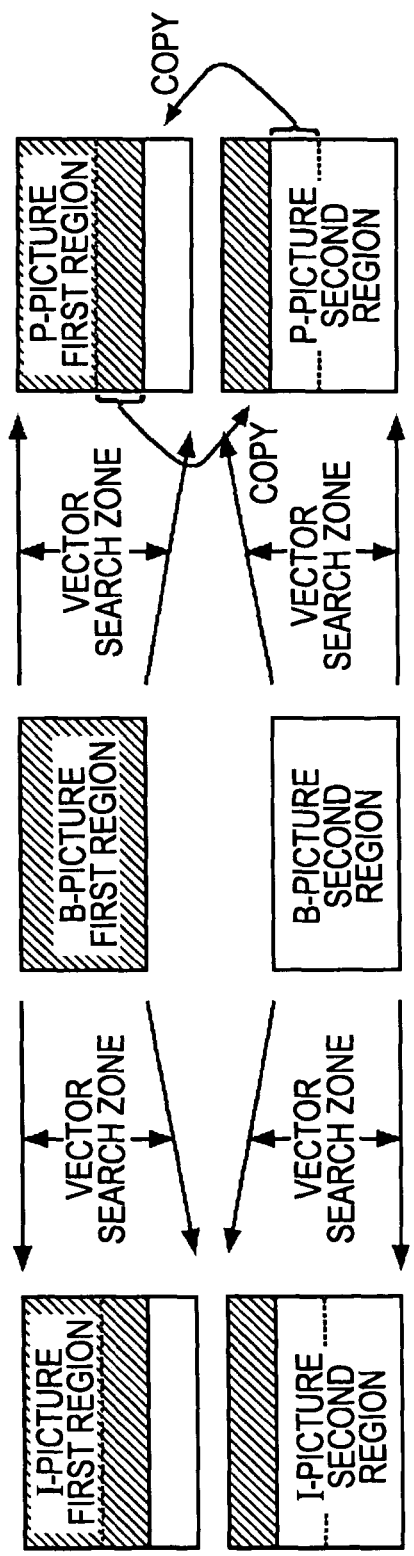

When decoding a B-picture, the pixel data of the first region of the preceding and upcoming I-pictures or P-pictures stored in the video buffer 75, and among the pixel data of the preceding and upcoming I-picture or P-picture second region, the pixel data of an area contained in the motion vector search zone necessary for decoding processing by the #1 decode chip 73, are read out to the buffer control circuit 95 and are used for motion compensation processing by the motion compensation circuit 94. The pixel data of the second region of the preceding and upcoming I-pictures or P-pictures stored in the video buffer 78, and among the pixel data of the preceding and upcoming I-picture or P-picture first region, the pixel data of an area contained in the motion vector search zone necessary for decoding processing by the #2 decode chip 76, are read out to the buffer control circuit 115 and are used for motion compensation processing by the motion compensation circuit 114. That is, as shown in FIG. 14, the motion vector search zone for each macroblock contained in the B-picture first region decoded by the #1 decode chip 73 corresponds to the preceding and upcoming I-picture or P-picture first region and, among the pixel data of the preceding and upcoming I-picture or P-picture second region, the area contained in the motion vector search zone necessary for decoding processing by the #1 decode chip 73. The motion vector search zone for each macroblock contained in the B-picture second region decoded by the #2 decode chip 76 corresponds to the preceding and upcoming I-picture or P-picture second region and, among the pixel data of the preceding and upcoming I-picture or P-picture first region, the area contained in the motion vector search zone necessary for decoding processing by the #2 decode chip 76.

The buffer control circuit 95 of the #1 decode chip 73 supplies the decoded pixel data of the B-picture first region to the video buffer 75 and stores it therein. Since B-pictures are not used as reference pictures for other pictures, it is not necessary to supply (copy) the B picture decoded by the #1 decode chip 73 to the #2 decode chip 76.

The buffer control circuit 115 of the #2 decode chip 76 supplies the decoded pixel data of the B-picture second region to the video buffer 78 and stores it therein. Since B-pictures are not used as reference pictures for other pictures, it is not necessary to supply (copy) the B picture decoded by the #2 decode chip 76 to the #1 decode chip 73.

As described above, after decoding an I-picture or a P-picture by one decode chip, the pixel data of an area contained in the decoded I-picture or P-picture used as reference pixel data when decoding a P-picture or a B-picture by the other decode chip is supplied to the other decode chip and is copied into the video buffer of the other decode chip. Accordingly, when decoding a P-picture or a B-picture by the other decode chip, the pixel data used as reference pixel data stored in the video buffer is available.

Decoding processing 1 executed by the decoder 54-1 discussed with reference to FIG. 7 is described below with reference to the flowchart in FIG. 15.

In step S1, the stream divider 72 receives the input of stream data.

In step S2, the controller 71 detects the picture type of each frame of the stream data and supplies a control signal indicating the picture type to the #1 decode chip 73 and the #2 decode chip 76.

In step S3, the stream divider 72 divides the received frame under the control of the controller 71, and allocates and supplies the divided frame regions to the #1 decode chip 73 and the #2 decode chip 76.

Figure 16B:
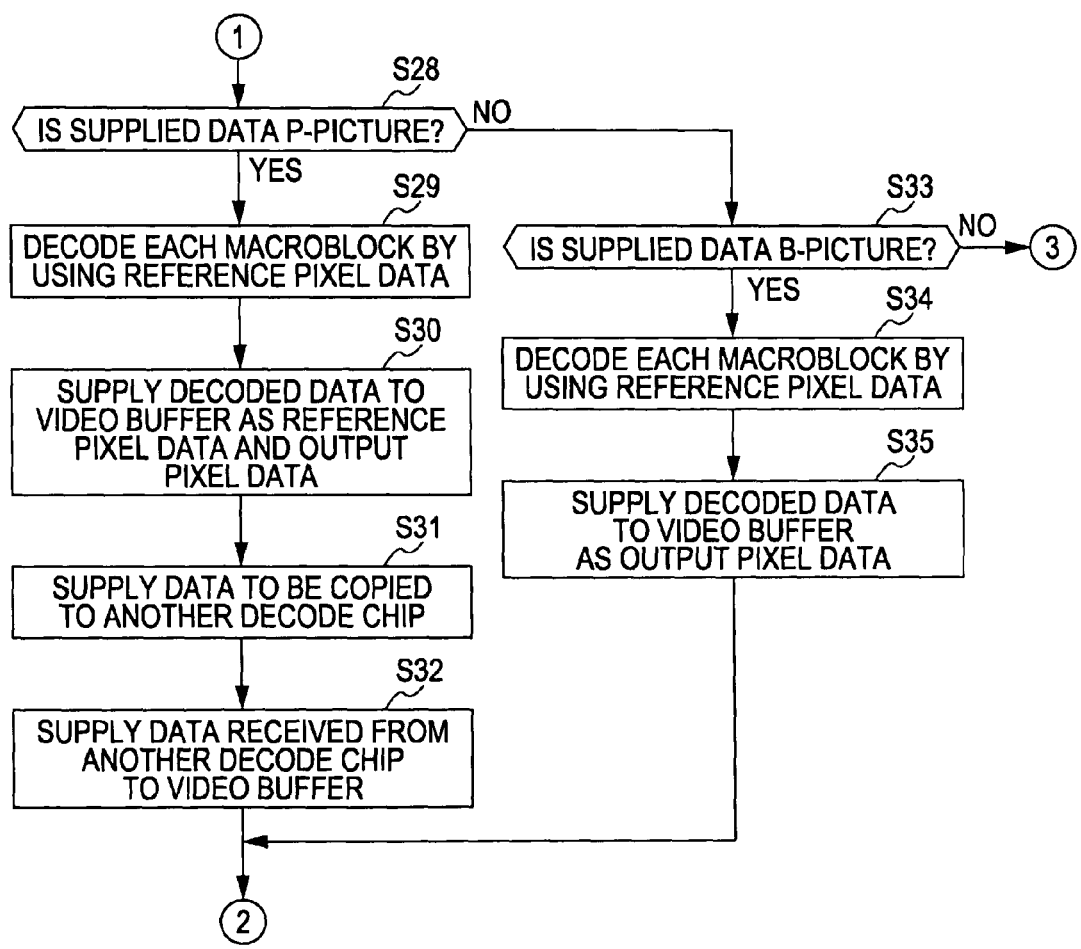
FIG. 16, which is composed of FIGS. 16A and 16B, is a flowchart illustrating divided frame decoding processing 1.

In step S4, divided frame decoding processing 1, which is described in detail below with reference to FIG. 16, which is composed of FIGS. 16A and 16B, is executed.

In step S5, the display output circuit 97 of the #1 decode chip 73 generates a synchronizing timing signal for outputting image data formed of the decoded pixel data, and based on the timing signal, the display output circuit 97 reads out, through the buffer control circuit 95, among the pixel data buffered in the video buffer 75, image data (indicated by a in FIG. 10) decoded by the decoder unit 93 to the selector 97 as decoded video data. Meanwhile, the display output circuit 117 of the #2 decode chip 76 generates a synchronizing timing signal for outputting image data formed of the decoded pixel data, and based on the timing signal, the display output circuit 117 reads out, through the buffer control circuit 115, among the pixel data buffered in the video buffer 78, image data (indicated by b in FIG. 10) decoded by the decoder unit 113 to the selector 97 as decoded video data.

In step S6, the selector 79 receives the image data decoded by the #1 decode chip 73 and the #2 decode chip 76 and combines the divided image data into one frame. The processing is then completed.

According to the above-described processing, the decoder 54-1 shown in FIG. 7 can divide one frame and decode divided frame regions by using the #1 decode chip 73 and the #2 decode chip 76. For example, if each of the decoder unit 93 of the #1 decode chip 73 and the decoder unit 113 of the #2 decode chip 76 has the capacity to decode data at ×1 and if the stream divider 72 divides one frame into two picture regions so that the coding difficulties of the resulting picture regions are equal to each other, the decoder 54-1 shown in FIG. 7 can decode data at ×2.

With this configuration, ×2 decoding processing can be performed, as stated above. Additionally, if decoding processing is performed at the same rate as that performed by a known decoder, it is possible to decrease the circuit scale of the decoder (processing performance of each decode chip can be decreased). Moreover, coded streams having high frame frequencies, which are difficult to be handled by one decode chip, can be decoded by using a plurality of decode chips. More specifically, by using two decode chips, each being capable of processing 1920×1080/30P, coded streams having 1920×1080/60P can be decoded. By using two decode chips, each being capable of processing 1920×1080/60i, coded streams having 1920×1080/60P can be decoded. By using two decode chips, each being capable of processing 1920×1080/60i, coded streams having 1920×1080/120i can be decoded.

If it is desired that a playback operation be started from a predetermined picture, fast decoding processing can be performed even if there are a plurality of reference pictures necessary for decoding the predetermined picture, and thus, a fast random playback operation can be implemented.

Divided frame decoding processing 1 executed in step S4 in FIG. 15 is described below with reference to the flowchart in FIG. 16, which is composed of FIGS. 16A and 16B. Divided frame decoding processing 1 is executed in parallel in the #1 decode chip 73 and the #2 decode chip 76.

In step S21, the stream input circuit 91 of the #1 decode chip 73 receives data divided by the stream divider 72 and supplies it to the buffer control circuit 92. The buffer control circuit 92 buffers the supplied data in the stream buffer 74. Meanwhile, the stream input circuit 111 of the #2 decode chip 76 receives data divided by the stream divider 72 and supplies it to the buffer control circuit 112. The buffer control circuit 112 buffers the supplied data in the stream buffer 77.

In step S22, the buffer control circuit 92 reads out data buffered in the stream buffer 74 to the decoder unit 93. The buffer control circuit 112 reads out data buffered in the stream buffer 77 to the decoder unit 113.

In step S23, the decoder unit 93 or 113 determines based on a control signal supplied from the controller 71 whether the supplied data is an I-picture. If it is determined in step S23 that the supplied data is not an I-picture, the process proceeds to step S28.

If the supplied data is found to be an I-picture in step S23, the process proceeds to step S24 in which the decoder unit 93 or 113 decodes each macroblock contained in the supplied coded data.

In step S25, the buffer control circuit 95 receives the decoded data from the decoder unit 93, and supplies the decoded pixel data (corresponding to the I-picture first region in FIG. 11) to the video buffer 75 as a reference picture and as an output picture. The buffer control circuit 115 receives the decoded data from the decoder unit 113, and supplies the decoded pixel data (corresponding to the I-picture second region in FIG. 11) to the video buffer 78 as a reference picture and as an output picture.

In step S26, the buffer control circuit 95 supplies, among the decoded data supplied from the decoder unit 93, data in an area (indicated by α in FIG. 10) to be copied into the #2 decode chip 76, which is necessary for decoding processing by the #2 decode chip 76, to the inter-chip % interface 96. The inter-chip interface 96 supplies the received pixel data to the inter-chip interface 116 of the #2 decode chip 76. The buffer control circuit 115 supplies, among the decoded data supplied from the decoder unit 113, data in an area (indicated by β in FIG. 10) to be copied into the #1 decode chip 73, necessary for decoding processing by the #1 decode chip 73, to the inter-chip interface 116. The inter-chip interface 116 supplies the received pixel data to the inter-chip interface 96 of the #1 decode chip 73.

In this case, it is preferable that interfaces connecting the #1 decode chip 93 and the #2 decode chip 96, that is, an interface for supplying data from the inter-chip interface 96 to the inter-chip interface 116 and an interface for supplying data from the inter-chip interface 116 to the inter-chip interface 96, are independent of each other without using a common interface, such as a data bus. Then, complicated address control accompanying data transfer, or timing control to determine when to occupy a common interface or when to send or receive data, which is necessary if a common interface is used, is not necessary. Additionally, the data transfer rate can be decreased compared to when a common interface is used.

The #1 decode chip 73 and the #2 decode chip 76 can be connected to each other by connecting input/output terminals of the two decode chips.

In step S27, the inter-chip interface 96 of the #1 decode chip 73 supplies the pixel data received from the #2 decode chip 76 to the buffer control circuit 95. The buffer control circuit 95 then supplies the received pixel data to the video buffer 75. The inter-chip interface 116 of the #2 decode chip 76 supplies the pixel data received from the #1 decode chip 73 to the buffer control circuit 115. The buffer control circuit 115 then supplies the received pixel data to the video buffer 78. That is, as discussed with reference to FIG. 11, in the video buffer 75, the pixel data of the I-picture first region and, among the pixel data of the I-picture second region, the pixel data of an area indicated by β in FIG. 10 contained in the motion vector search zone necessary for decoding processing by the #1 decode chip 73 are stored. In the video buffer 78, the pixel data of the I-picture second region and, among the pixel data of the I-picture first region, the pixel data of an area indicated by α in FIG. 10 contained in the motion vector search zone necessary for decoding processing by the #2 decode chip 76 are stored. The process then returns to step S4 in FIG. 15 and proceeds to step S5.

If it is determined in step S23 that the supplied data is not an I-picture, the process proceeds to step S28 to determine based on the control signal supplied from the controller 71 whether the supplied data is a P-picture. If it is determined in step S28 that the supplied data is not a P-picture, the process proceeds to step S33, which is discussed later.

If the supplied data is found to be a P-picture in step S28, the process proceeds to step S29. In step S29, the decoder unit 93 or 113 decodes each macroblock by using reference pixel data. More specifically, since macroblocks contained in a P-picture use motion compensation, the decoder unit 93 separates the slice layer into macroblocks and outputs the resulting prediction vectors and pixels to the motion compensation circuit 94. The motion compensation circuit 94 reads out the reference pixel data from the video buffer 75 through the buffer control circuit 95 in accordance with the prediction vectors output from the decoder unit 93 and adds the read reference pixel data to the pixel data supplied from the decoder unit 93, thereby performing motion compensation. In the video buffer 75, all pixels of reference pictures necessary for decoding the divided P-picture are already stored in step S27 or step S32, which is discussed below. The decoder unit 113 separates the slice layer into macroblocks and outputs the resulting prediction vectors and pixels to the motion compensation circuit 114. The motion compensation circuit 114 reads out the reference pixel data from the video buffer 78 through the buffer control circuit 115 in accordance with the prediction vectors output from the decoder unit 113 and adds the read reference pixel data to the pixel data supplied from the decoder unit 113, thereby performing motion compensation. In the video buffer 78, all pixels of reference pictures necessary for decoding the divided P-picture are already stored in step S27 or step S32, which is discussed below.

In step S30, the buffer control circuit 95 receives the decoded data (corresponding to the pixel data of the P-picture first region in FIG. 13) from the decoder unit 93 and supplies it to the video buffer 75 as a reference picture or an output picture. The buffer control circuit 115 receives the decoded data (corresponding to the pixel data of the P-picture second region in FIG. 13) from the decoder unit 113 and supplies it to the video buffer 78 as a reference picture or an output picture.

In step S31, the buffer control circuit 95 supplies, among the decoded data supplied from the decoder unit 93, data in an area indicated by α in FIG. 10 to be copied into the #2 decode chip 76, which is necessary for decoding processing by the #2 decode chip 76, to the inter-chip interface 116 of the #2 decode chip 76. The buffer control circuit 115 supplies, among the decoded data supplied from the decoder unit 113, data in an area indicated by β in FIG. 10 to be copied into the #1 decode chip 73, which is necessary for decoding processing by the #1 decode chip 73, to the inter-chip interface 96 of the #1 decode chip 73.

In step S32, the inter-chip interface 96 of the #1 decode chip 73 supplies the pixel data received from the #2 decode chip 76 to the buffer control circuit 95. The buffer control circuit 95 then supplies the received pixel data to the video buffer 75. The inter-chip interface 116 of the #2 decode chip 76 supplies the pixel data received from the #1 decode chip 73 to the buffer control circuit 115. The buffer control circuit 115 then supplies the received pixel data to the video buffer 78. That is, as discussed with reference to FIG. 13, in the video buffer 75, the pixel data of the P-picture first region, and among the P-picture second region, the pixel data of an area indicated by β contained in the motion vector search zone, which is necessary for decoding processing by the #1 decode chip 73, are stored. In the video buffer 78, the pixel data of the P-picture second region, and among the P-picture first region, the pixel data of an area indicated by α contained in the motion vector search zone, which is necessary for decoding processing by the #2 decode chip 76, are stored. The process then returns to step S4 in FIG. 15 and proceeds to step S5.

If it is determined in step S28 that the supplied data is not a P-picture, the process proceeds to step S33 to determine based on the control signal supplied from the controller 71 whether the supplied data is a B-picture. If it is determined in step S33 that the supplied data is not a B-picture, the process returns to step S23.

If the pixel data is found to be a B-picture in step S33, the process proceeds to step S34. In step S34, the decoder unit 93 or 113 decodes each macroblock by using reference pixel data. More specifically, since the macroblocks contained in a B-picture use motion compensation, the decoder unit 93 separates the slice layer into macroblocks and decodes each macroblock to output the resulting prediction vectors and pixels to the motion compensation circuit 94. The motion compensation circuit 94 then reads the reference pixel data from the video buffer 75 through the buffer control circuit 95 in accordance with the prediction vectors output from the decoder unit 93 and adds the read reference pixel data to the pixel data supplied from the decoder unit 93, thereby performing motion compensation. In the video buffer 75, all pixels of reference pictures necessary for decoding the divided B-picture are already stored in step S27 or step S32. Meanwhile, the decoder unit 113 separates the slice layer into macroblocks and decodes each macroblock to output the resulting prediction vectors and pixels to the motion compensation circuit 114. The motion compensation circuit 114 then reads the reference pixel data from the video buffer 78 through the buffer control circuit 115 in accordance with the prediction vectors output from the decoder unit 113 and adds the read reference pixel data to the pixel data supplied from the decoder unit 113, thereby performing motion compensation. In the video buffer 78, all pixels of reference pictures necessary for decoding the divided B-picture are already stored in step S27 or step S32.

In step S35, the buffer control circuit 95 receives the decoded data (corresponding to the B-picture first region in FIG. 14) from the decoder unit 93, and supplies it to the video buffer 75 as an output image. The buffer control circuit 115 receives the decoded data (corresponding to the B-picture second region in FIG. 14) from the decoder unit 113, and supplies it to the video buffer 78 as an output image. The process then returns to step S4 in FIG. 15 and proceeds to step S5.

According to the above-described processing, decoding processing is performed by each of the #1 decode chip 73 and the #2 decode chip 76 based on the picture type detected by the controller 71. In this case, in each of the #1 decode chip 73 and the #2 decode chip 76, pixel data to be used as a reference picture by the other decode chip is supplied to the other decode chip, and also, a reference picture supplied from the other decode chip is stored in the video buffer and can be used as a reference picture.

According to the above-described processing, after finishing decoding an I-picture, pixel data which is referred to by the other decode chip when decoding another picture later, i.e., a P-picture or a B-picture, is supplied to the other decode chip, and after finishing decoding a P-picture, pixel data which is referred to by the other decode chip when decoding another picture, i.e., a P-picture or a B-picture, is supplied to the other decode chip. With this configuration, the total access time necessary for accessing the video buffer 75 or 78 can be decreased compared to a case where decoded pixel data necessary for the other decode chip is copied to the other decode chip when decoding the corresponding picture, and more specifically, a case where, when decoding an I-picture, I-picture or P-picture pixel data necessary for decoding the I-picture is obtained from the other decode chip, or a case where, when decoding a B-picture, I-picture or P-picture pixel data necessary for decoding the B-picture is obtained from the other decode chip.

The access time necessary for accessing the video buffer 75 or 78 in the above-described two cases is more specifically discussed with reference to FIG. 17. If decoded pixel data is exchanged and copied between decode chips when decoding the corresponding picture, as shown in A in FIG. 17, the access time necessary for accessing the video buffer 75 or 78 when decoding an I-picture is only time $T_1$ for writing a decoded image corresponding to the I-picture, and the access time necessary for accessing the video buffer 75 or 78 when decoding a P-picture is time $T_1$ for writing a decoded image corresponding to the P-picture, time $T_2$ for reading a preceding reference picture, and time $T_3$ for reading a reference picture used by decoding processing by the other decode chip. Read time $T_2$ is longer than or equal to write time $T_1$. The access time necessary for accessing the video buffer 75 or 78 when decoding a B-picture is time $T_1$ for writing a decoded image corresponding to the B-picture, time $T_2 \times 2$ for reading preceding and upcoming reference pictures, and time $T_3 \times 2$ for reading preceding and upcoming reference pictures used for decoding processing by the other decode chip.

In contrast, if pixel data used for decoding a P-picture or B-picture by the other decode chip is supplied to the other decode chip when finishing decoding an I-picture, or if pixel data used for decoding a P-picture or B-picture by the other decode chip is supplied to the other decode chip when finishing decoding a P-picture, as indicated by B in FIG. 17, the access time necessary for accessing the video buffer 75 or 78 when decoding an I-picture is time $T_1$ for writing a decoded image corresponding to the I-picture and time $T_4$ for writing a reference picture supplied from the other decode chip and used for decoding a P-picture or B-picture in the future. The access time necessary for accessing the video buffer 75 or 78 when decoding a P-picture is time $T_1$ for writing a decoded image corresponding to the P-picture, time $T_2$ for reading a preceding reference picture, and time $T_4$ for writing a reference picture supplied from the other decode chip and used for decoding a P-picture or B-picture in the future. The access time necessary for accessing the video buffer 75 or 78 when decoding a B-picture is time $T_1$ for writing a decoded image corresponding to the B-picture and time $T_2 \times 2$ for reading preceding and upcoming reference pictures.

Regardless of whether decoded pixel data is exchanged and copied between decode chips when decoding the corresponding picture, as indicated by A in FIG. 17, or necessary pixel data is supplied to the other decode chip in advance when finishing decoding an I-picture or a P-picture, as indicated by B in FIG. 17, the time necessary for decoding a B-picture is longer than that for decoding other picture types. However, by supplying necessary reference pictures to the other decode chip in advance, the maximum access time necessary for accessing the video buffer 75 or 78 when decoding one picture can be reduced by the time indicated by $T_5$ in FIG. 17.

Accordingly, the total decoding processing time can be reduced. In other words, faster decoding processing can be performed, and at the same decoding rate, it is possible to reduce the data transfer rate between decode chips and video buffers.

In this case, as stated above, it is preferable that interfaces connecting the #1 decode chip 93 and the #2 decode chip 96, that is, an interface for supplying data from the inter-chip interface 96 to the inter-chip interface 116 and an interface for supplying data from the inter-chip interface 116 to the inter-chip interface 96 are independent of each other without using a common interface, such as a data bus. Then, complicated address control accompanying data transfer, or timing control to determine when to occupy a common interface or when to send or receive data, which is necessary if a common interface is used, is not necessary. Additionally, the data transfer rate can be decreased compared to when a common interface is used.

The decoding processing time can further be reduced, in other words, faster decoding processing can be implemented, depending on from which slice decoding processing performed by each of the #1 decode chip 73 and the #2 decode chip 76 is started.

The decoding processing order and processing rate is described below with reference to FIGS. 18 through 20.

FIG. 18 illustrates a plurality of patterns for the decoding order of decoding processing executed by each of the #1 decode chip 73 and the #2 decode chip 76.

In an MPEG stream, after picture_header, a plurality of slices forming a frame indicated by picture_data are sequentially supplied. In this case, slices are supplied in the order from slices located at the top left of a picture to slices located at the bottom right of the picture. In the normal decoding order, therefore, in each of the #1 decode chip 73 and the #2 decode chip 76, decoding processing is performed in the order from the top to the bottom in each divided picture, as indicated by the arrows 151 and 152 in FIG. 18. Accordingly, the reference pixels indicated by α in FIG. 18 to be decoded by the #1 decode chip 73 and transferred to the #2 decode chip 76 are decoded last.

Thus, when decoding a B-picture followed by a P-picture, even if decoding processing for the P-picture decoded by the #2 decode chip 76 is finished, decoding processing for the B-picture cannot be started until the area indicated by α in FIG. 18 decoded by the #1 decode chip 73 is supplied to the #2 decode chip 76 and is stored in the video decoder 78.

In order to reduce the wait time for decoding processing to wait for copying (transferring) a reference picture to the other decode chip, the transfer rate of reference pictures between decode chips should be increased.

Accordingly, in the decoder 54 in this embodiment, the decoding processing order in the #1 decode chip 73 is different from that indicated by the arrow 151.

That is, in the decoder 54-1 shown in FIG. 7, a coded stream supplied to the #1 decode chip 73 is stored in the stream buffer 74. The buffer control circuit 92 first reads the reference picture in the area indicated by α in FIG. 18 and supplies it to the decoder unit 93. More specifically, in the area indicated by α, slices may be sequentially supplied to the decoder unit 93 starting from the slice located at the bottom right (which is close to the region decoded by the #2 decode chip 76), as indicated by the arrow 153 in FIG. 18, and then, in the remaining area decoded by the #1 decode chip 73, slices may be sequentially supplied to the decoder unit 93 starting from the slice located at the bottom right, as indicated by the arrow 154. Alternatively, in the area indicated by α, slices may be sequentially supplied to the decoder unit 93 starting from the slice located at the top left, as indicated by the arrow 155, and then, in the remaining area decoded by the #1 decode chip 73, slices may be sequentially supplied to the decoder unit 93 starting from the slice located at the top left, as indicated by the arrow 156. Alternatively, in the area indicated by α, slices may be sequentially supplied to the decoder unit 93 starting from the slice located at the bottom right, as indicated by the arrow 157, and then, in the remaining area decoded by the #1 decode chip 73, slices may be sequentially supplied to the decoder unit 93 starting from the slice located at the top left, as indicated by the arrow 158.

If the reference pixels in the area indicated by α are first read out to the decoder unit 93, in any of the above-described patterns, the reference pixels in the area indicated by α are decoded and supplied to the #2 decode chip 76 before finishing decoding all pictures in the region decoded by the #2 decode chip 76. As a result, the wait time for decoding processing to wait for copying (transferring) reference pictures to the other decode chip can be eliminated.

Figure 19:
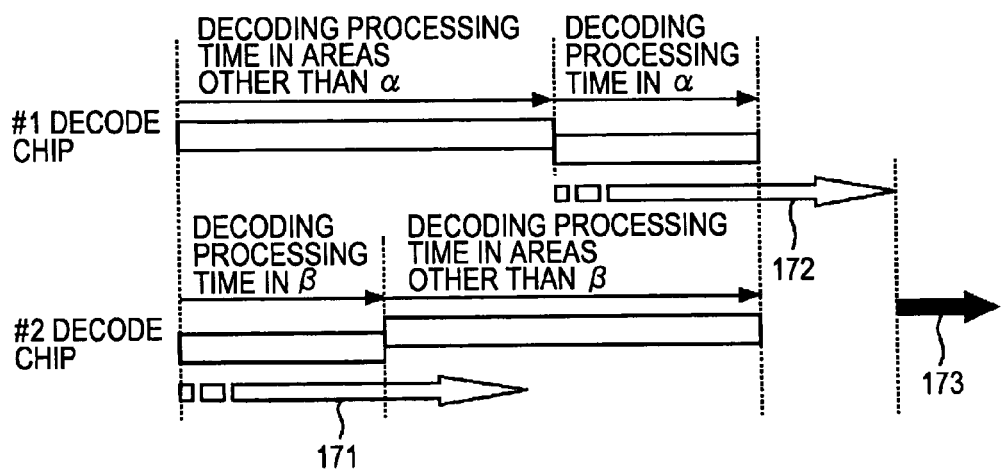

More specifically, if decoding processing is performed in the order from the top to the bottom of each divided picture, as indicated by the arrows 151 and 152 in FIG. 18, data transfer indicated by the arrow 172 in FIG. 19 is not finished before decoding processing in the region decoded by the #2 decode chip 76 is finished, as shown in FIG. 19, even if decoding processing for the area indicated by α is started by the #1 decode chip 73 and the decoded reference pixels are sequentially supplied to the #2 decode chip 76. That is, decoding processing for the subsequent picture, as indicated by the arrow 173, cannot be started until the reference pixels in the area indicated by a are supplied to the #2 decode chip 76 and are stored in the video decoder 78.

Figure 20:
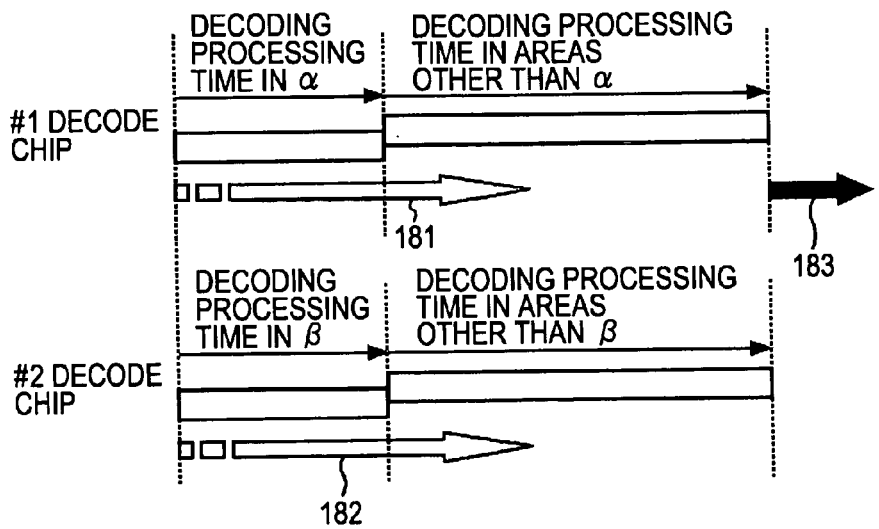

In contrast, if the coded stream in the area indicated by α is first read out to the decoder unit 93, as indicated by the arrows 153 through 158 in FIG. 18, decoding processing for the area indicated by α in the #1 decode chip 73 can be started first, as shown in FIG. 20, and while decoded reference pixels are being sequentially supplied to the #2 decode chip 76, decoding processing for the areas other than α is executed. Accordingly, before finishing decoding processing for the region decoded by the #2 decode chip 76, data transfer indicated by the arrows 181 and 182 is finished. That is, immediately after finishing decoding processing for the region by the #2 decode chip 76, decoding processing for the subsequent picture can be started, as indicated by the arrow 183.

As discussed above, in each decode chip, decoding processing for an area to be supplied to the other decode chip is preferentially performed, and thus, data transfer can be finished while the other decode chip is decoding the other areas without the need to significantly increase the transfer rate.

Figure 21:
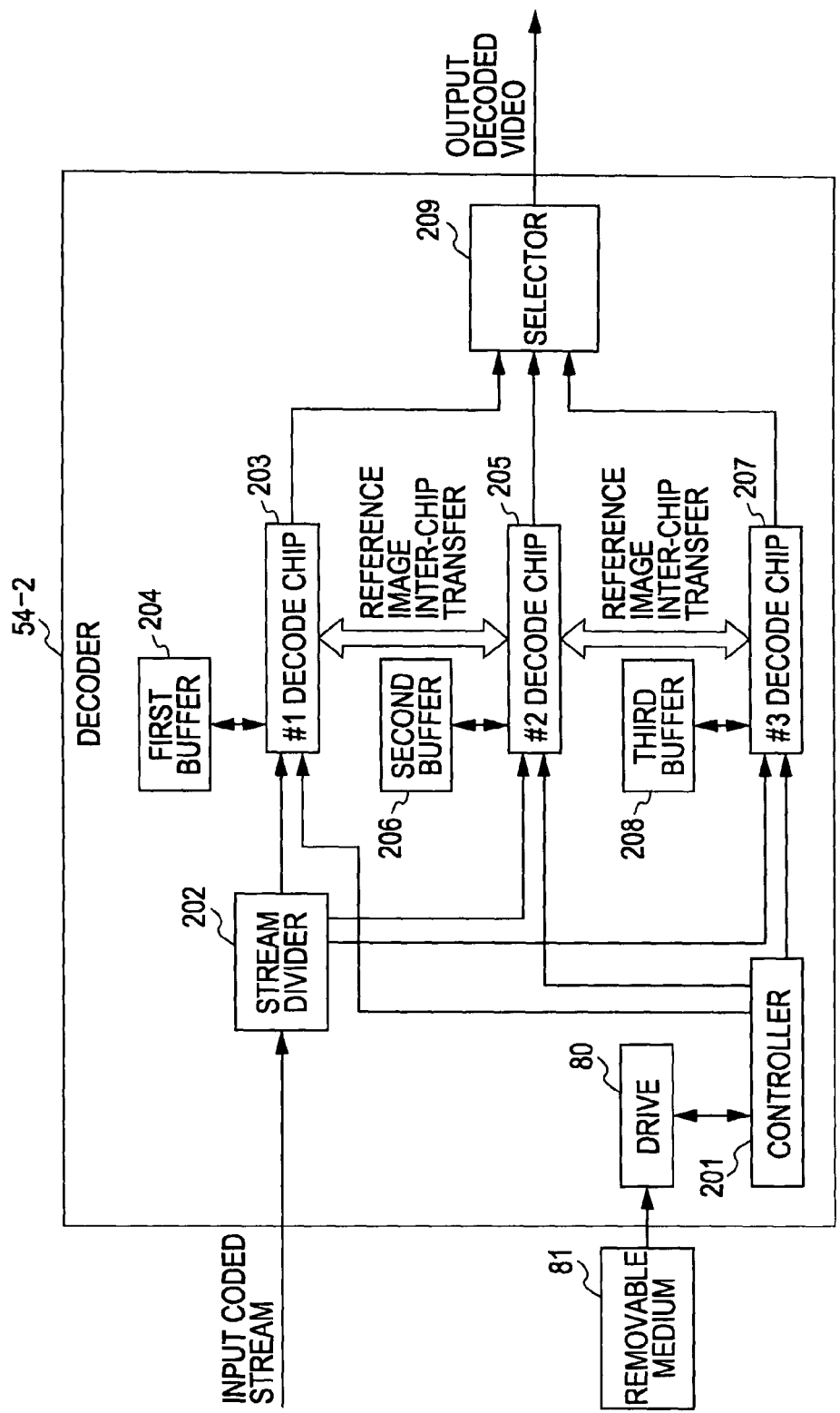
FIG. 21 is a block diagram illustrating a second example of the configuration of a decoder according to an embodiment of the present invention.

FIG. 21 is a block diagram illustrating the configuration of a decoder 54-2, which is a second example of the decoder 54. The decoder 54-2 can decode coded streams by using three decode chips.

The decoder 54-2 includes a controller 201, a stream divider 202, a #1 decode chip 203, a first buffer 204, a #2 decode chip 205, a second buffer 206, a #3 decode chip 207, a third buffer 208, and a selector 209. Although the decoder 54-2 may be provided with four or more decode chips, a description is given below, assuming that three decoders, i.e., the #1 decode chip 203, the #2 decode chip 205, and the #3 decode chip 207, are provided. Each of the first buffer 204, the second buffer 206, and the third buffer 208 includes a stream buffer and a video buffer. The stream buffer and the video buffer may be provided separately.

The controller 201 controls the overall operation of the decoder 54-2 based on the operation input from a user, a control signal supplied from an external device, or information supplied from the stream divider 202.

Under the control of the controller 201, the stream divider 202 decodes the sequence layer, the GOP layer, and the picture layer of a supplied coded stream, and divides each picture of the coded stream by the same number (in this case, three) as the decode chips, and allocates and supplies the divided picture regions to the #1 decode chip 203, the #2 decode chip 205, and the #3 decode chip 207. Each picture may be divided in units of slices by the same number (in this case, three) as the decode chips. Alternatively, each picture may be divided vertically or obliquely by the same number (in this case, three) as the decode chips. If MPEG2 decoding is employed, dividing pictures vertically or obliquely may be more difficult than dividing pictures in units of slices. The stream divider 202 can divide one picture, for example, in units of slices, based on the slice start code.

The stream divider 202 also supplies information, such as the picture type, obtained as a result of decoding the sequence layer, the GOP layer, and the picture layer, of the supplied stream, to the controller 201.

The number of regions divided from each picture by the stream divider 202 may be greater than the number of decode chips, and then, the divided picture regions may be allocated to the decode chips. It is preferable, however, that the stream divider 202 divides each picture by the same number as decode chips and allocates one solid divided region to each chip decoder because the processing for sending and receiving reference pixels between decode chips can be simplified.

A picture may be divided equally or unequally. The stream divider 202 may have the function of detecting the complexity of an image, and if the complexity of the image is very different among the picture regions, the stream divider 202 may determine the division ratio of a picture based on the complexity of the image (difficulty in coding).

The #1 decode chip 203 decodes the divided picture supplied from the stream divider 202 under the control of the controller 201. In this case, the #1 decode chip 203 supplies pixel data in an area that may be necessary as reference pixels for decoding processing by the #2 decode chip 205 to the #2 decode chip 205, and also stores the decoded pixel data supplied from the #2 decode chip 205 in the first buffer 204 and performs decoding processing by referring to the stored pixel data if necessary.

The first buffer 204, which is formed of, for example, a DRAM, temporarily stores coded streams supplied to the #1 decode chip 203, video signals (pixel data) decoded by the #1 decode chip 203, and decoded video signals (pixel data) supplied from the #2 decode chip 205.

The #2 decode chip 205 decodes the divided picture supplied from the stream divider 202 under the control of the controller 201. In this case, the #2 decode chip 205 supplies pixel data in an area that may be necessary as reference pixels for decoding processing by the #1 decode chip 203 to the #1 decode chip 203, and also supplies pixel data in an area that may be necessary as reference pixels for decoding processing by the #3 decode chip 207 to the #3 decode chip 207. The #2 decode chip 205 also stores the decoded pixel data supplied from the #1 decode chip 203 or the #3 decode chip 207 in the second buffer 206 and performs decoding processing by referring to the stored pixel data if necessary.

The second buffer 206, which is formed of, for example, a DRAM, temporarily stores coded streams supplied to the #2 decode chip 205, video signals (pixel data) decoded by the #2 decode chip 205, and decoded video signals (pixel data) supplied from the #1 decode chip 203 or from the #3 decode chip 207.

The #3 decode chip 207 decodes the divided picture supplied from the stream divider 202 under the control of the controller 201. In this case, the #3 decode chip 207 supplies pixel data in an area that may be necessary as reference pixels for decoding processing by the #2 decode chip 205 to the #2 decode chip 205, and also stores the decoded pixel data supplied from the #2 decode chip 205 in the third buffer 208 and performs decoding processing by referring to the stored pixel data if necessary.

The third buffer 208, which is formed of, for example, a DRAM, temporarily stores coded streams supplied to the #3 decode chip 207, video signals (pixel data) decoded by the #3 decode chip 207, and the decoded video signals (pixel data) supplied from the #2 decode chip 205.

The selector 209 receives the decoded pixel data from the #1 decode chip 203, the #2 decode chip 205, and the #3 decode chip 207 and outputs the pixel data as decoded video data.

The decoder 54-2 may be provided with the drive 80, and the drive 80 is connected to the controller 201 to send and receive information to and from the removable medium 81 installed in the drive 80.

Decoding processing performed by the decoder 54-2 by using three decode chips, i.e., the #1 decode chip 203, the #2 decode chip 205, and the #3 decode chip 207, is basically similar to that performed by the decoder 54-1 by using the two decode chips.

Figure 22:
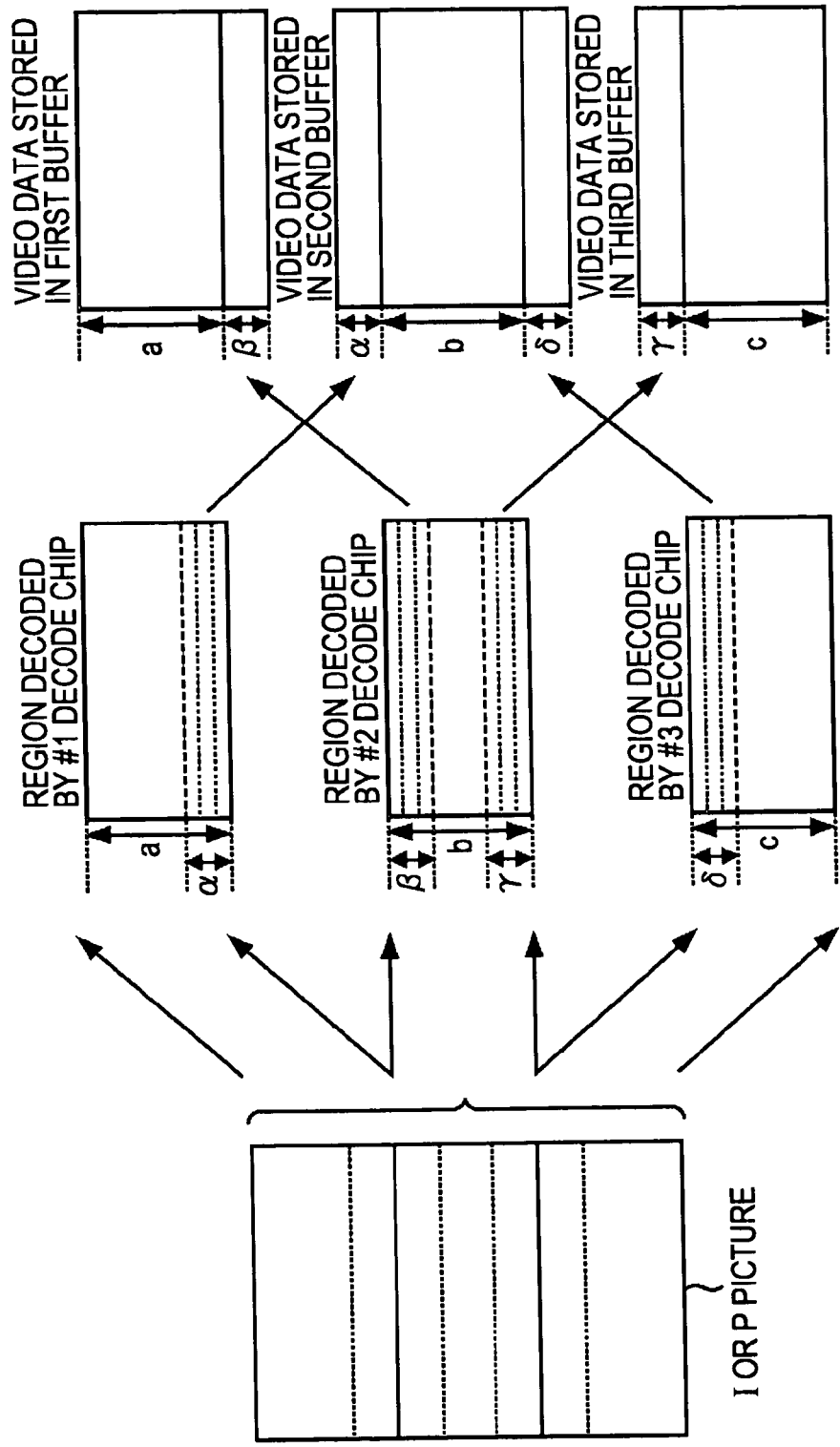
FIG. 22 illustrates sending and receiving of reference pixels among three decode chips.

More specifically, as shown in FIG. 22, among the region (indicated by a in FIG. 22) decoded by the #1 decode chip 203, pixel data in an area (indicated by $\alpha$ in FIG. 22) necessary as a reference picture for decoding processing by the #2 decode chip 205 is supplied to the #2 decode chip 205. Among the region (indicated by b in FIG. 22) decoded by the #2 decode chip 205, pixel data in an area (indicated by $\beta$ in FIG. 22) necessary as a reference picture for decoding processing by the #1 decode chip 203 is supplied to the #1 decode chip 203, and also, pixel data in an area (indicated by $\gamma$ in FIG. 22) necessary as a reference picture for decoding processing by the #3 decode chip 207 is supplied to the #3 decode chip 207. Then, among the region (indicated by c in FIG. 22) decoded by the #3 decode chip 207, pixel data in an area (indicated by $\delta$ in FIG. 22) necessary as a reference picture for decoding processing by the #2 decode chip 205 is supplied to the #2 decode chip 205.

Figure 23:
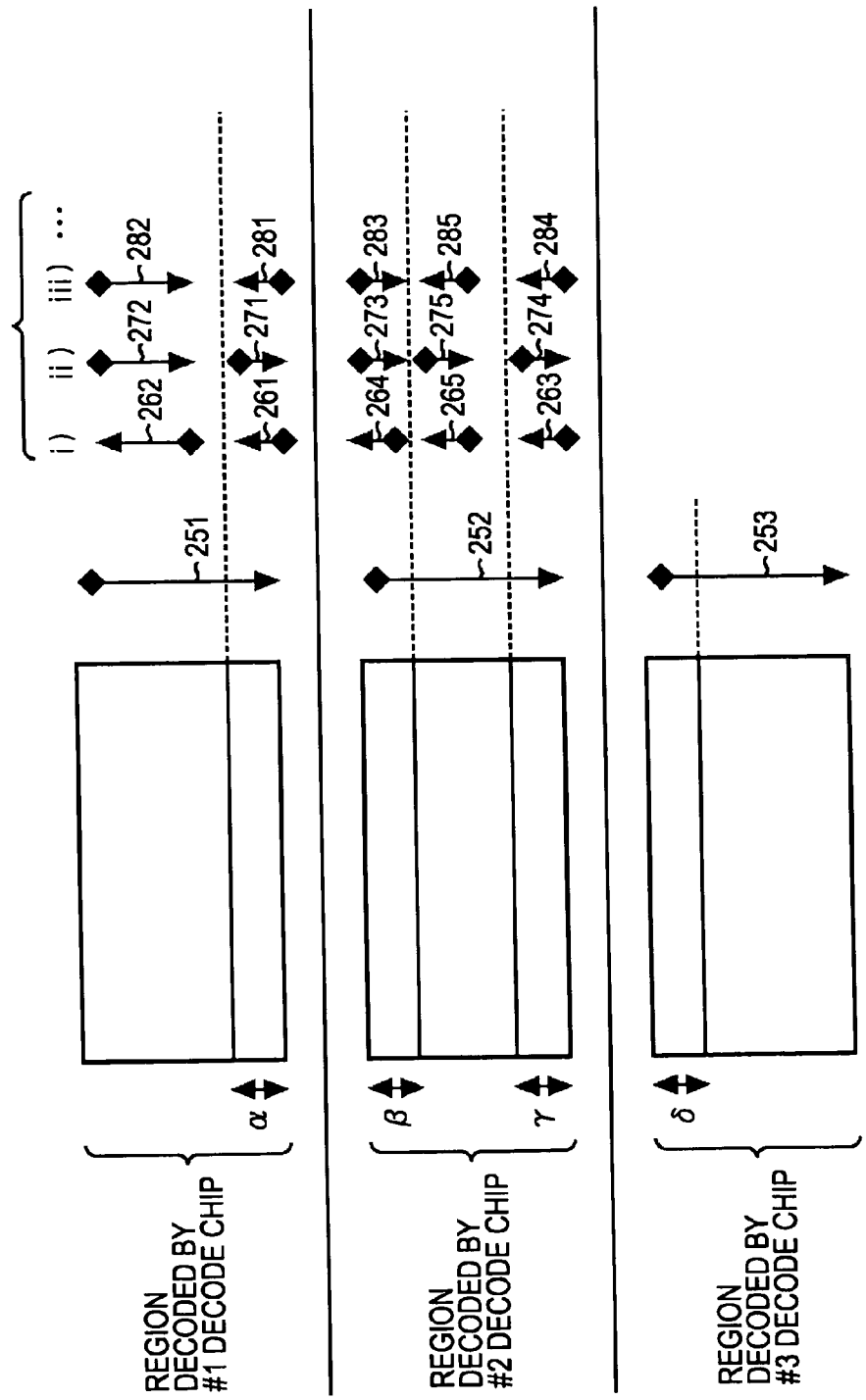
FIG. 23 illustrates decoding processing orders and decoding processing rates.

In the #1 decode chip 203, the #2 decode chip 205, and the #3 decode chip 207, slices may be divided in chronological order in which the slices are supplied from the stream divider 202, as indicated by the arrows 251 through 253 in FIG. 23. It is preferable, however, that particularly in the #1 decode chip 203 and the #2 decode chip 205, decoding processing is started from slices necessary to be transferred to other decode chips, as indicated by the three decoding patterns i), ii), and iii) in FIG. 23, represented by the arrows 261 through 285, to prevent a delay in decoding processing due to data transfer.

More specifically, in the #1 decode chip 203, in the area indicated by $\alpha$ in FIG. 23, slices located at the bottom right (close to the region decoded by the #2 decode chip 205) are sequentially decoded, as indicated by the arrow 261, and then, in the remaining areas decoded by the #1 decode chip 203, slices located at the bottom right may be sequentially decoded, as indicated by the arrow 262. Alternatively, in the area indicated by $\alpha$ in FIG. 23, slices located at the top left are sequentially decoded first, as indicated by the arrow 271, and then, in the remaining areas decoded by the #1 decode chip 203, slices located at the top left may be sequentially decoded, as indicated by the arrow 272. Alternatively, in the area indicated by $\alpha$ in FIG. 23, slices located at the bottom right are sequentially decoded first, as indicated by the arrow 281, and then, in the remaining areas decoded by the #1 decode chip 203, slices located at the top left may be sequentially decoded, as indicated by the arrow 282.

In the #2 decode chip 205, in the area indicated by γ in FIG. 23, slices located at the bottom right (close to the region decoded by the #3 decode chip 207) are sequentially decoded first, as indicated by the arrow 263, and in the area indicated by β in FIG. 23, slices located at the bottom right are sequentially decoded first, as indicated by the arrow 264. Then, in the remaining areas decoded by the #2 decode chip 205, slices located at the bottom right may be sequentially decoded, as indicated by the arrow 265. Alternatively, in the area indicated by β in FIG. 23, slices located at the top left (close to the region decoded by the #1 decode chip 203) are sequentially decoded first, as indicated by the arrow 273, and in the area indicated by γ in FIG. 23, slices located at the top left are sequentially decoded first, as indicated by the arrow 274, and then, in the remaining areas decoded by the #2 decode chip 205, slices located at the top left may be sequentially decoded, as indicated by the arrow 275. Alternatively, in the area indicated by β in FIG. 23, slices located at the top left (close to the region decoded by the #1 decode chip 203) are sequentially decoded first, as indicated by the arrow 283, and in the area indicated by γ in FIG. 23, slices located at the bottom right (close to the region decoded by the #3 decode chip 207) are sequentially decoded first, as indicated by the arrow 284, and then, in the remaining areas decoded by the #2 decode chip 205, slices located at the bottom right may be sequentially decoded, as indicated by the arrow 285.

FIG. 24, which is composed of FIGS. 24A and 24B, is a block diagram illustrating the configuration of a decoder 54-3, which is a third example of the decoder 54. In FIG. 24, elements corresponding to those in FIG. 7 are designated with like reference numerals, and a detailed explanation thereof is thus omitted.

The configuration of the decoder 54-3 shown in FIG. 24 is basically similar to that of the decoder 54-1 shown in FIG. 7, except that a #1 decode chip 301 and a #2 decode chip 303 are provided instead of the #1 decode chip 73 and the #2 decode chip 76, respectively, and a #1 buffer 302 including the stream buffer 74 and the video buffer 75 and a #2 buffer 304 including the stream buffer 77 and the video buffer 78 are provided. The configuration of the #1 decode chip 301 is basically similar to that of the #1 decode chip 73, except that a buffer control circuit 311 for controlling reading and writing of data from and into the #1 buffer 302 is provided instead of the buffer control circuits 92 and 95. The configuration of the #2 decode chip 303 is basically similar to that of the #2 decode chip 76, except that a buffer control circuit 321 for controlling reading and writing of data from and into the #2 buffer 304 is provided instead of the buffer control circuits 112 and 115.

The processing performed by the decoder 54-3 shown in FIG. 24 is basically similar to that indicated in the flowcharts in FIGS. 15 and 16, except that the buffer control circuit 311 performs processing executed by the buffer control circuits 92 and 95, and the buffer control circuit 321 performs processing executed by the buffer control circuits 112 and 115. In the decoder 54-3 shown in FIG. 24, as in the decoding order in one frame discussed with reference to FIG. 18 or 23, the pixel data contained in an area to be supplied to another decode chip is preferentially decoded so that decoding processing can be accelerated.

In the above-described decoders 54-1 through 54-3, the controller 71 or 201 detects the picture type of supplied stream data and supplies a control signal indicating the picture type to the decode chips. Alternatively, the picture type may be detected by each decode chip.

Figure 25B:
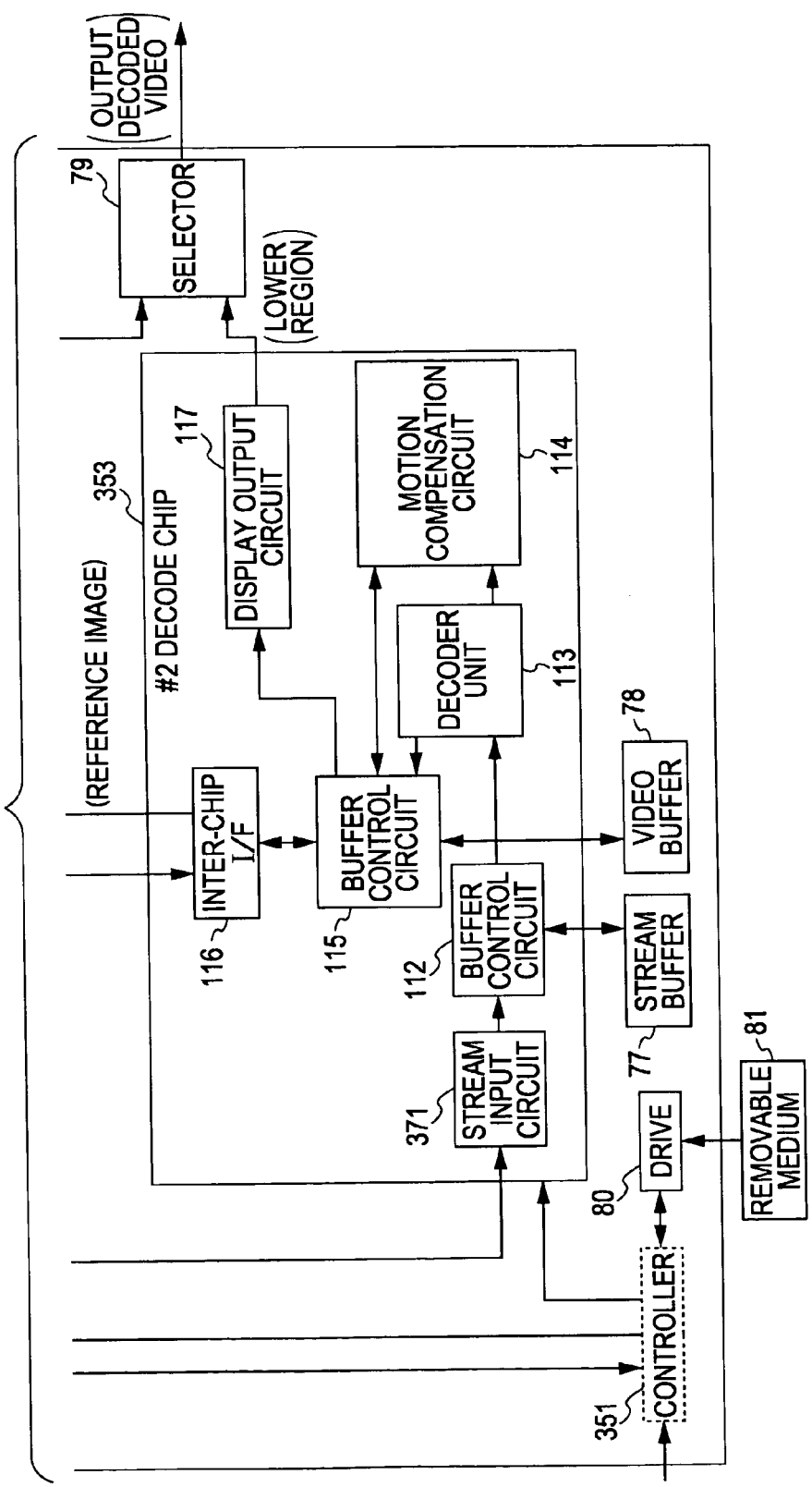
FIG. 25, which is composed of FIGS. 25A and 25B, is a block diagram illustrating a fourth example of the configuration of a decoder according to an embodiment of the present invention.

FIG. 25, which is composed of FIGS. 25A and 25B, is a block diagram illustrating the configuration of a decoder 54-4, which is a fourth example of the decoder 54. The decoder 54-4 can detect the picture type of supplied stream data. In FIG. 25, elements corresponding to those shown in FIG. 7 are designated with like reference numerals, and a detailed explanation thereof is thus omitted.

The configuration of the decoder 54-4 shown in FIG. 25 is basically similar to that of the decoder 54-1 shown in FIG. 7, except that a controller 351 is provided instead of the controller 71 and that a #1 decode chip 352 and a #2 decode chip 353 are provided instead of the #1 decode chip 73 and the #2 decode chip 76, respectively. In the decoder 54-4, even if only one buffer, i.e., the #1 buffer 302 or the #2 buffer 304, is provided for each decode chip, and even if only one buffer control circuit is provided for each decode chip, as in the decoder 54-3 shown in FIG. 24, processing of such a decoder is basically similar to that of the decoder 54-4 having two buffers, i.e., a stream buffer and a video buffer, in each decode chip. Accordingly, details of the configuration and processing of such a decoder is omitted here.

The configuration of the #1 decode chip 352 is basically similar to that of the #1 decode chip 73, except that a stream input circuit 361 that can detect the picture type of supplied stream data is provided instead of the stream input circuit 91. The configuration of the #2 decode chip 353 is basically similar to the #1 decode chip 76, except that a stream input circuit 371 that can detect the picture type of supplied stream data is provided instead of the stream input circuit 111.

Decoding processing 2 executed by the decoder 54-4 shown in FIG. 25 is described below with reference to the flowchart in FIG. 26.

In step S51, the stream divider 72 receives the input of stream data.

In step S52, the stream divider 72 divides the received frame under the control of the controller 351, and allocates and supplies the divided frame regions to the #1 decode chip 352 and the #2 decode chip 353.

Figure 27B:
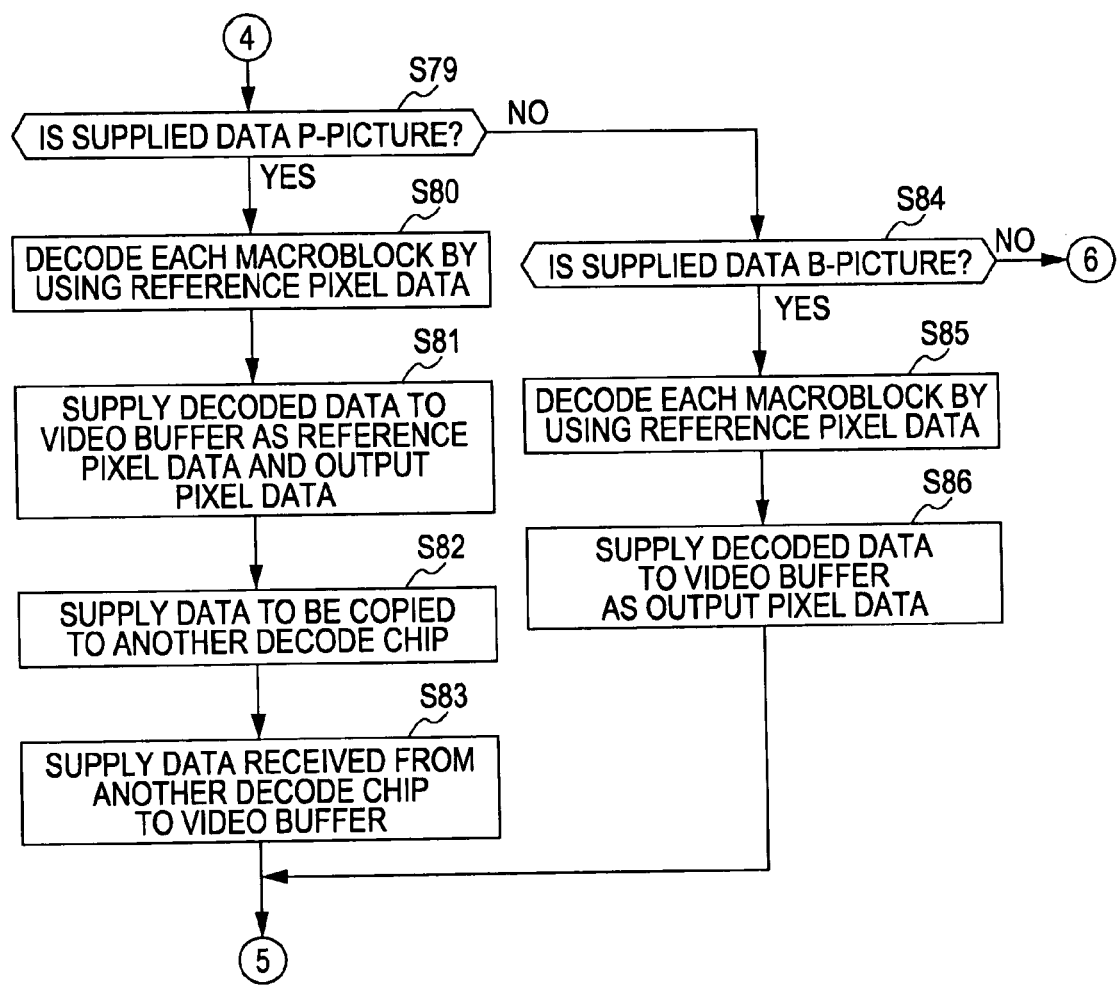
FIG. 27, which is composed of FIGS. 27A and 27B, is a flowchart illustrating divided frame decoding processing 2.

In step S53, divided frame decoding processing 2, which is described in detail below with reference to FIG. 27, which is composed of FIGS. 27A and 27B, is executed.

In step S54, the display output circuit 97 of the #1 decode chip 352 generates a synchronizing timing signal for outputting image data formed of the decoded pixel data, and based on the timing signal, the display output circuit 97 reads out, through the buffer control circuit 95, among the pixel data buffered in the video buffer 75, image data (indicated by a in FIG. 10) decoded by the decoder unit 93 to the selector 97 as decoded video data. Meanwhile, the display output circuit 117 of the #2 decode chip 353 generates a synchronizing timing signal for outputting image data formed of the decoded pixel data, and based on the timing signal, the display output circuit 117 reads out, through the buffer control circuit 115, among the pixel data buffered in the video buffer 78, image data (indicated by b in FIG. 10) decoded by the decoder unit 113 to the selector 97 as decoded video data.

In step S55, the selector 79 receives the image data decoded by the #1 decode chip 352 and the #2 decode chip 353 and combines the divided image data into one frame. The processing is then completed.

According to the above-described processing, the decoder 54-4 shown in FIG. 25 can divide one frame and decode divided frame regions by using the #1 decode chip 352 and the #2 decode chip 353. For example, if each of the decoder unit 93 of the #1 decode chip 352 and the decoder unit 113 of the

2 decode chip 353 has the capacity to decode data at ×1 and if the stream divider 72 divides one frame into two picture regions so that the coding difficulties of the resulting picture regions are equal to each other, the decoder 54-4 shown in FIG. 25 can decode data at ×2.

With this configuration, ×2 decoding processing can be performed, as stated above. Additionally, if decoding processing is performed at the same rate as that performed by a known decoder, it is possible to decrease the circuit scale of the decoder (processing performance of each decode chip can be decreased). Moreover, coded streams having high frame frequencies, which are difficult to be handled by one decode chip, can be decoded by using a plurality of decode chips.

If it is desired that a playback operation be started from a predetermined picture, fast decoding processing can be performed even if there are a plurality of reference pictures necessary for decoding the predetermined picture, and thus, a fast random playback operation can be implemented.

Figure 26:
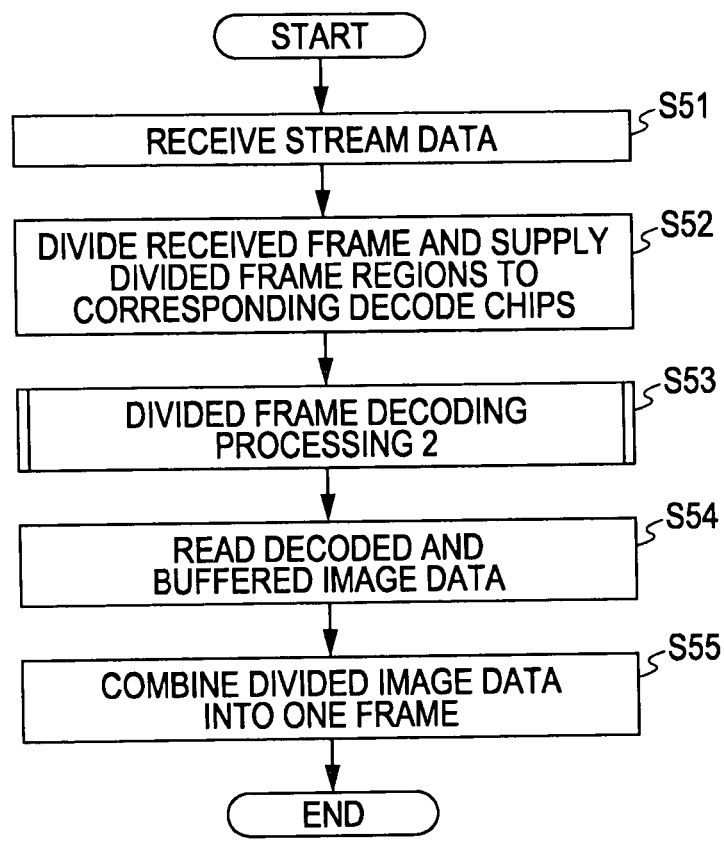
FIG. 26 is a flowchart illustrating decoding processing 2.

Divided frame decoding processing 2 executed in step S53 in FIG. 26 is described below with reference to the flowchart in FIG. 27, which is composed of FIGS. 27A and 27B. Divided frame decoding processing 2 is executed in parallel in the #1 decode chip 352 and the #2 decode chip 353.

In step S71, the stream input circuit 361 of the #1 decode chip 352 receives data divided by the stream divider 72 and detects the picture type of the supplied frame. The stream input circuit 371 of the #2 decode chip 353 receives data divided by the stream divider 72 and detects the picture type of the supplied frame.

In step S72, the stream input circuit 361 of the #1 decode chip 352 supplies the received frame to the buffer control circuit 92. The buffer control circuit 92 buffers the supplied data in the stream buffer 74. Meanwhile, the stream input circuit 371 of the #2 decode chip 353 supplies the received frame to the buffer control circuit 112. The buffer control circuit 112 buffers the supplied data in the stream buffer 77.

In step S73, the buffer control circuit 92 reads out data buffered in the stream buffer 74 to the decoder unit 93. The buffer control circuit 112 reads out data buffered in the stream buffer 77 to the decoder unit 113. In this case, as stated above, it is preferable that macroblocks in an area that is necessary to be supplied to the other decode chip as reference pixels be preferentially supplied to the decoder unit.

In step S74, the decoder unit 93 or 113 determines based on the picture type determined in step S71 whether the supplied data is an I-picture. If it is determined in step S23 that the supplied data is not an I-picture, the process proceeds to step S79.

If the supplied data is found to be an I-picture in step S74, the process proceeds to step S75, and steps S75 through S78 similar to steps S24 through S27, respectively, in FIG. 16 are executed. More specifically, the decoder unit 93 or 113 decodes each macroblock contained in the supplied coded data, and the decoded data is supplied to the video buffer 75 or 78 as a reference picture and an output picture. Then, among the decoded data, an area (indicated by α or β in FIG. 10) to be copied to the other decode chip and necessary for decoding processing by the other decode chip is supplied to the other decode chip through the inter-chip interfaces. Upon receiving the pixel data, the other decode chip stores it in the video buffer. The process then returns to step S53 in FIG. 26 and proceeds to step S54.

If it is determined in step S74 that the supplied data is not an I-picture, the process proceeds to step S79 to determine based on the picture type determined in step S71 whether the supplied data is a P-picture. If it is determined in step S79 that the supplied data is not a P-picture, the process proceeds to step S84, which is discussed later.

If the supplied data is found to be a P-picture in step S79, the process proceeds to step S80, and steps S80 through S83 similar to steps S29 through S32, respectively, in FIG. 16 are executed. More specifically, the decoder unit 93 or 113 decodes each macroblock contained in the supplied coded data, and the decoded data is supplied to the video buffer 75 or 78 as a reference picture and an output picture. Then, among the decoded data, an area (indicated by α or β in FIG. 10) to be copied to the other decode chip and necessary for decoding processing by the other decode chip is supplied to the other decode chip through the inter-chip interfaces. Upon receiving the pixel data, the other decode chip stores it in the video buffer 75 or 78. The process then returns to step S53 in FIG. 26 and proceeds to step S54.

If it is determined in step S79 that the supplied data is not a P-picture, the process proceeds to step S84 to determine based on the picture type determined in step S71 whether the supplied data is a B-picture. If it is determined in step S84 that the supplied data is not a B-picture, the process returns to step S74.

If the pixel data is found to be a B-picture in step S84, the process proceeds to step S85. Steps S85 and S86 similar to steps S34 and S35, respectively, in FIG. 16 are executed. More specifically, the decoder unit 93 or 113 decodes each macroblock by using reference pixel data, and decoded pixel data is supplied to the video buffer 75 or 78 and stored therein. The process returns to step S53 in FIG. 26 and proceeds to step S54.

According to the above-described processing indicated in the flowcharts in FIG. 27, decoding processing is performed by each of the #1 decode chip 352 and the #2 decode chip 353 based on the picture type detected by the corresponding decode chip. In this case, in each of the #1 decode chip 352 and the #2 decode chip 353, pixel data to be used as a reference picture by the other decode chip is supplied to the other decode chip, and also, pixel data of a reference picture supplied from the other decode chip is stored in the video buffer 75 or 78 and can be used as a reference picture.

In the decoder 54-4, the number of decode chips may be three or more, in which case, each decode chip can detect the picture type and performs decoding processing similarly.

In the above-described decoders 54-1 through 54-4, supplied stream data is divided into picture regions by the same number as decode chips by the stream divider 72, and the divided picture regions are allocated and supplied to the corresponding decode chips. Alternatively, the entire stream data may be supplied to each decode chip without being divided, and each decode chip may decode only a predetermined portion of the supplied stream data frame under the control of the controller.

FIG. 28, which is composed of FIGS. 28A and 28B, is a block diagram illustrating the configuration of a decoder 54-5, which is a fifth example of the decoder 54. In the decoder 54-5, the entire stream data is supplied to each decode chip, and each decode chip decodes only a predetermined portion of the stream data under the control of the controller.

In FIG. 28, elements corresponding to those in FIG. 7 are designated with like reference numerals, and a detailed explanation thereof is thus omitted.

The configuration of the decoder 54-5 shown in FIG. 28 is basically similar to that of the decoder 54-1 discussed with reference to FIG. 7, except that the stream divider 72 is not provided and that a controller 381 is substituted for the controller 71 and a #1 decode chip 382 and a #2 decode chip 383 are substituted for the #1 decode chip 73 and the #2 decode chip 76, respectively. In the decoder 54-5, even if only one buffer is provided for each decode chip and even if only one buffer control circuit is provided for each decode chip, as discussed with reference to FIG. 24, the processing of such a decoder is basically the same as that of the decoder 54-5, and thus, a detailed explanation of the configuration and processing of such a decoder is not given here.

The configuration of the #1 decode chip 382 is basically similar to that of the #1 decode chip 73, except that, instead of the stream input circuit 91, a stream input circuit 391 that can select only a predetermined portion of a supplied stream data frame and supplies the selected portion to the buffer control circuit 92 under the control of the controller 381 is disposed. The configuration of the #2 decode chip 383 is basically similar to that of the #2 decode chip 76, except that, instead of the stream input circuit 111, a stream input circuit 392 that can select only a predetermined portion of a supplied stream data frame and supplies the selected portion to the buffer control circuit 112 under the control of the controller 381 is disposed.

Decoding processing 3 executed by the decoder 54-5 shown in FIG. 28 is described below with reference to the flowchart in FIG. 29.

In step S111, the decoder 54-5 receives the input of stream data. In step S112, the input stream data is supplied to the #1 decode chip 382 and the #2 decode chip 383.

Figure 30B:
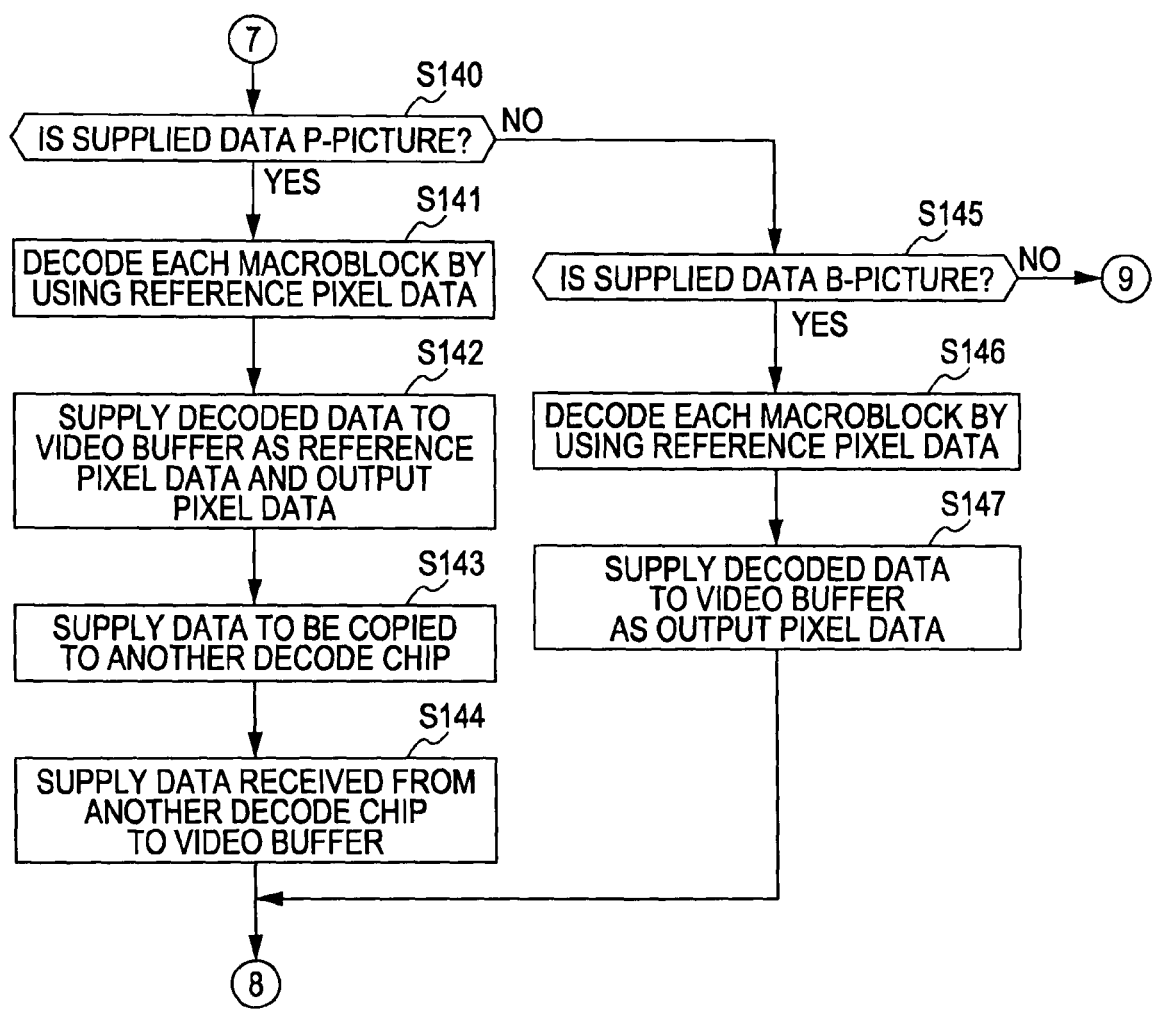
FIG. 30, which is composed of FIGS. 30A and 30B, is a flowchart illustrating divided frame decoding processing 3.

In step S113, divided frame decoding processing 3, which is described in detail below with reference to FIG. 30, which is composed of FIGS. 30A and 30B, is executed.

In step S114, the display output circuit 97 of the #1 decode chip 382 generates a synchronizing timing signal for outputting image data formed of the decoded pixel data, and based on the timing signal, the display output circuit 97 reads out, through the buffer control circuit 95, among the pixel data buffered in the video buffer 75, image data (indicated by a in FIG. 10) decoded by the decoder unit 93 to the selector 97 as decoded video data. Meanwhile, the display output circuit 117 of the #2 decode chip 383 generates a synchronizing timing signal for outputting image data formed of the decoded pixel data, and based on the timing signal, the display output circuit 117 reads out, through the buffer control circuit 115, among the pixel data buffered in the video buffer 78, image data (indicated by b in FIG. 10) decoded by the decoder unit 113 to the selector 97 as decoded video data.

In step S115, the selector 79 receives the image data decoded by the #1 decode chip 382 and the #2 decode chip 383 and combines the divided image data into one frame. The processing is then completed.

According to the above-described processing, the decoder 54-5 shown in FIG. 28 can divide one frame and decode divided frame regions by using the #1 decode chip 382 and the #2 decode chip 383. For example, if each of the decoder unit 93 of the #1 decode chip 382 and the decoder unit 113 of the #2 decode chip 383 has the capacity to decode data at ×1 and if each of the #1 decode chip 382 and the #2 decode chip 383 selects the half of one frame, the decoder 54-5 shown in FIG. 28 can decode data at ×2.

With this configuration, ×2 decoding processing can be performed, as stated above. Additionally, if decoding processing is performed at the same rate as that performed by a known decoder, it is possible to decrease the circuit scale of the decoder (processing performance of each decode chip can be decreased). Moreover, coded streams having high frame frequencies, which are difficult to be handled by one decode chip, can be decoded by using a plurality of decode chips.

If it is desired that a playback operation be started from a predetermined picture, fast decoding processing can be performed even if there are a plurality of reference pictures necessary for decoding the predetermined picture, and thus, a fast random playback operation can be implemented.

Figure 29:
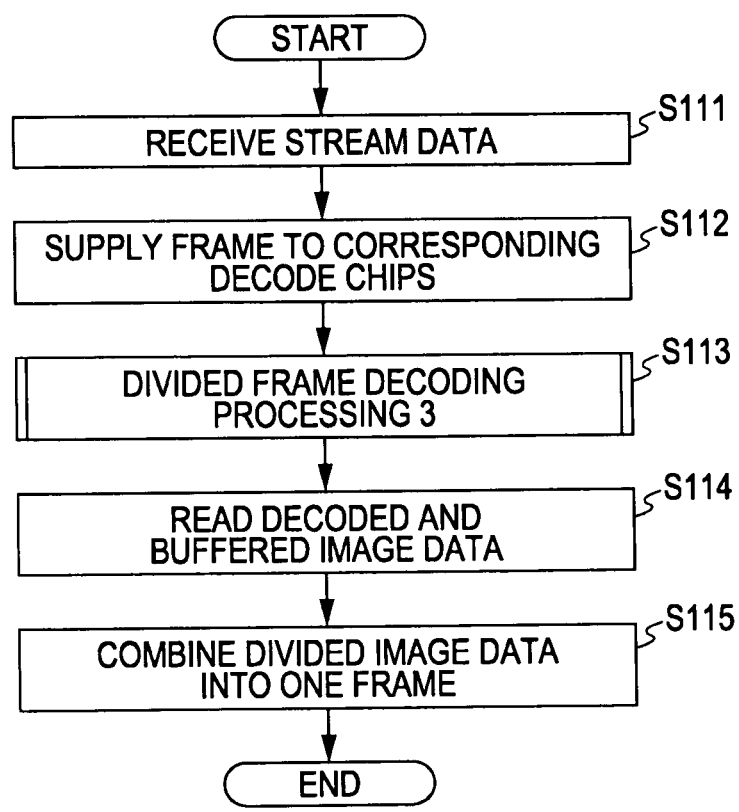
FIG. 29 is a flowchart illustrating decoding processing 3.

Divided frame decoding processing 3 executed in step S113 in FIG. 29 is described below with reference to the flowchart in FIG. 30, which is composed of FIGS. 30A and 30B. Divided frame decoding processing 3 is executed in parallel in the #1 decode chip 382 and the #2 decode chip 383.

In step S131, the stream input circuit 391 of the #1 decode chip 382 receives stream data and detects the picture type of the supplied frame. The stream input circuit 392 of the #2 decode chip 383 receives stream data and detects the picture type of the supplied frame.

In step S132, the stream input circuit 391 of the #1 decode chip 382 and the stream input circuit 392 of the #2 decode chip 383 select and extract, under the control of the controller 381, decoding zones from the supplied frame in a manner similar to manners of dividing frames discussed with reference to FIGS. 8A through 8C.

In step S133, the stream input circuit 391 of the #1 decode chip 382 supplies the extracted decoding zone to the buffer control circuit 92. The buffer control circuit 92 then buffers the supplied data in the stream buffer 74. The stream input circuit 392 of the #2 decode chip 383 supplies the extracted decoding zone to the buffer control circuit 112. The buffer control circuit 112 then buffers the supplied data in the stream buffer 77.

In step S134, the buffer control circuit 92 reads out data buffered in the stream buffer 74 to the decoder unit 93. The buffer control circuit 112 reads out data buffered in the stream buffer 77 to the decoder unit 113. In this case, as stated above, it is preferable that macroblocks in an area that is necessary to be supplied to the other decode chip as reference pixels be preferentially supplied to the decoder unit.

In step S135, the decoder unit 93 or 113 determines based on the picture type determined in step S131 whether the supplied data is an I-picture. If it is determined in step S135 that the supplied data is not an I-picture, the process proceeds to step S140.

If the supplied data is found to be an I-picture in step S135, the process proceeds to step S136, and steps S136 through S139 similar to steps S24 through S27, respectively, in FIG. 16 are executed. More specifically, the decoder unit 93 or 113 decodes each macroblock contained in the supplied coded data, and the decoded data is supplied to the video buffer 75 or 78 as a reference picture and an output picture. Then, among the decoded data, an area (indicated by α or β in FIG. 10) to be copied to the other decode chip and necessary for decoding processing by the other decode chip is supplied to the other decode chip through the inter-chip interfaces. Upon receiving the pixel data, the other decode chip stores it in the video buffer 75 or 78. The process then returns to step S113 in FIG. 29 and proceeds to step S114.

If it is determined in step S135 that the supplied data is not an I-picture, the process proceeds to step S140 to determine based on the picture type determined in step S131 whether the supplied data is a P-picture. If it is determined in step S140 that the supplied data is not a P-picture, the process proceeds to step S145, which is discussed later.

If the supplied data is found to be a P-picture in step S140, the process proceeds to step S141, and steps S141 through S144 similar to steps S29 through S32, respectively, in FIG. 16 are executed. More specifically, the decoder unit 93 or 113 decodes each macroblock by using the reference pixel data, and the decoded data is supplied to the video buffer 75 or 78 as a reference picture and an output picture. Then, among the decoded data, an area (indicated by α or β in FIG. 10) to be copied to the other decode chip and necessary for decoding processing by the other decode chip is supplied to the other decode chip through the inter-chip interfaces. Upon receiving the pixel data, the other decode chip stores it in the video buffer 75 or 78. The process then returns to step S113 in FIG. 29 and proceeds to step S114.

If it is determined in step S140 that the supplied data is not a P-picture, the process proceeds to step S145 to determine based on the picture type determined in step S131 whether the supplied data is a B-picture. If it is determined in step S145 that the supplied data is not a B-picture, the process returns to step S135.

If the pixel data is found to be a B-picture in step S145, the process proceeds to step S146. Steps S146 and S147 similar to steps S34 and S35, respectively, in FIG. 16 are executed. More specifically, the decoder unit 93 or 113 decodes each macroblock by using reference pixel data, and decoded pixel data is supplied to the video buffer 75 or 78 and stored therein. The process returns to step S113 in FIG. 29 and proceeds to step S114.

According to the above-described processing, all frames of stream data are supplied to the #1 decode chip 382 and the #2 decode chip 383. Then, a decoding zone of each frame is selected and extracted, the picture type of detected, and decoding processing is performed on macroblocks in the extracted decoding zone based on the detected picture type. In this case, in each of the #1 decode chip 382 and the #2 decode chip 383, pixel data to be used as a reference picture by the other decode chip is supplied to the other decode chip, and also, pixel data of a reference picture supplied from the other decode chip is stored in the video buffer and can be used as a reference picture.

In the processing discussed with reference to FIGS. 29 and 30, the picture type of a supplied frame is detected by each of the #1 decode chip 382 and the #2 decode chip 383. Alternatively, the controller 381 may detect the picture type of the supplied frame.

In the decoder 54-5, the number of decode chips may be three or more, in which case, each decode chip can detect the picture type, select a decoding zone, and perform decoding processing similarly.

Although in the above-described decoders 54-1 through 54-5 a buffer is provided for each decode chip, only one buffer may be provided and used for all decode chips.

FIG. 31, which is composed of FIGS. 31A and 31B, is a block diagram illustrating the configuration of a decoder 54-6, which is a sixth example of the decoder 54. In the decoder 54-6, only one common buffer is provided for all decode chips. In FIG. 31, elements corresponding to those in FIG. 7 are designated with like reference numerals, and a detailed explanation thereof is thus omitted.

The decoder 54-6 includes the stream divider 72, the selector 79, a controller 401, a #1 decode chip 402, a #2 decode chip 403, and a buffer 404. The buffer 404 includes a stream buffer 431 and a video buffer 432. Although the decoder 54-6 may be provided with three or more decode chips, a description is given below, assuming that two decode chips, i.e., the #1 decode chip 402 and the #2 decode chip 403, are provided.

The controller 401 controls the overall operation of the decoder 54-6 based on the operation input from a user, a control signal supplied from an external device, or information supplied from the stream divider 202.

Under the control of the controller 401, the stream divider 72 decodes the sequence layer, the GOP layer, and the picture layer of a supplied coded stream, and divides each picture of the coded stream by the same number (in this case, two) as the decode chips in a manner similar to manners of dividing frames discussed with reference to FIGS. 8A through 8C, and allocates and supplies the divided picture regions to the #1 decode chip 402 and the #2 decode chip 403.

The stream divider 72 also supplies information, such as the picture type, obtained as a result of decoding the sequence layer, the GOP layer, and the picture layer, of the supplied stream, to the controller 401.

The number of regions divided from each picture by the stream divider 72 may be greater than the number of decode chips, and then, the divided picture regions are allocated to the decode chips. It is preferable, however, that the stream divider 72 divides each picture by the same number as decode chips, as shown in FIG. 8A, 8B, or 8C, and allocates one solid divided region to each chip decoder because the processing for sending and receiving reference pixels between decode chips can be simplified.

A picture may be divided equally or unequally. The stream divider 72 may have the function of detecting the complexity of an image, and if the complexity of the image is very different among the picture regions, the stream divider 72 may determine the division ratio based on the complexity of the image (difficulty in coding).

The #1 decode chip 402 includes the stream input circuit 91, the decoder unit 93, the motion compensation circuit 94, the display output circuit 97, and a buffer control circuit 411. Under the control of the controller 401, the #1 decode chip 402 decodes the divided picture region supplied from the stream divider 72. In this case, the #1 decode chip 402 supplies the decoded pixel data to the video buffer 432 of the buffer 404, and also reads out reference pixel data from the video buffer 432 to perform decoding processing by referring to the read reference pixel data.

The #2 decode chip 403 includes the stream input circuit 111, the decoder unit 113, the motion compensation circuit 114, the display output circuit 117, and a buffer control circuit 421. Under the control of the controller 401, the #2 decode chip 403 decodes the divided picture region supplied from the stream divider 72. In this case, the #2 decode chip 403 supplies the decoded pixel data to the video buffer 432 of the buffer 404, and also reads out reference pixel data from the video buffer 432 to perform decoding processing by referring to the read reference pixel data.

The buffer 404, which is formed of, for example, a DRAM, includes two storage areas, such as the stream buffer 431 and the video buffer 432. The stream buffer 431 temporarily stores coded streams supplied to the #1 decode chip 402 and #2 decode chip 403. The video buffer 432 receives and temporarily stores video signals (pixel data) decoded by the #1 decode chip 402 and decoded video signals (pixel data) decoded by the #2 decode chip 403.

The selector 79 receives the decoded pixel data from the #1 decode chip 402 and the #2 decode chip 403, and outputs the decoded pixel data as decoded video data.

The decoder 54-6 may be provided with the drive 80, and the drive 80 is connected to the controller 401 to send and receive information to and from the removable medium 81 installed in the drive 80.

The configuration and operation of the #1 decode chip 402 are described below.

The stream input circuit 91 receives a coded stream divided by the stream divider 72 and supplies it to the buffer control circuit 411. The buffer control circuit 411 buffers the input coded stream in the stream buffer 431 based on a basic clock supplied from a clock generator circuit (not shown). The buffer control circuit 411 also sequentially reads coded streams stored in the stream buffer 431 in chronological order in which the streams are stored and outputs them to the decoder unit 93.

The decoder unit 93 decodes the input stream based on the MPEG syntax, and supplies the decoded stream to the motion compensation circuit 94. More specifically, the decoder unit 93 separates the slice layer into macroblocks to decode the macroblocks, and outputs the resulting prediction vectors and pixels to the motion compensation circuit 94.

The motion compensation circuit 94 performs motion compensation by reading decoded reference pixel data from the video buffer 432 through the buffer control circuit 411 according to whether macroblocks output from the decoder unit 93 are subjected to motion compensation. The motion compensation circuit 94 then outputs the resulting pixel data to the buffer control circuit 411.

More specifically, if the macroblocks output from the decoder unit 93 are not subjected to motion compensation, the motion compensation circuit 94 stores the pixel data in the video buffer 432 through the buffer control circuit 411. The pixel data stored in the video buffer 432 is used as a display image and may be used as reference data for other pictures.

If the macroblocks output from the decoder unit 93 are subjected to motion compensation, the motion compensation circuit 94 reads reference pixel data from the video buffer 432 through the buffer control circuit 411 according to the prediction vectors output from the decoder unit 93. In this case, in order to read the reference pixel data from the video buffer 432, the motion compensation circuit 94 supplies necessary information concerning the pixel positions and sizes of the reference pixels to the buffer control circuit 411. The buffer control circuit 411 reads the necessary reference pixels based on the information concerning the pixel positions and sizes. In this case, since the video buffer 432 is accessed by the #1 decode chip 402 or the #2 decode chip 403, address control accompanying data transfer or timing control to determine when to occupy a data bus or when to send and receive data is necessary. Then, the motion compensation circuit 94 performs motion compensation by adding the read reference pixel data to the pixel data supplied from the decoder unit 93. The motion compensation circuit 94 stores the motion-compensated pixel data in the video buffer 432 through the buffer control circuit 411. The pixel data stored in the video buffer 432 is used as a display image and may be used as reference data for other pictures.

The buffer control circuit 411 also reads out the pixel data stored in the video buffer 432 and supplies it to the display output circuit 97. The display output circuit 97 generates a synchronizing timing signal for outputting the decoded pixel data, and based on the timing signal, the display output circuit 97 outputs the pixel data read from the video buffer 432 as decoded video data.

In the #2 decode chip 403, the functions of the stream input circuit 111, the decoder unit 113, the motion compensation circuit 114, the display output circuit 117, and the buffer control circuit 421 are basically similar to the counterparts of the #1 decode chip 402, and the operation of the #2 decode chip 403 is also similar to that of the #1 decode chip 402, and a detailed explanation thereof is thus omitted.

The stream input circuit 111 receives a coded stream. The buffer control circuit 421 buffers the input coded stream in the stream buffer 431 and also sequentially reads coded streams stored in the stream buffer 431 in chronological order in which the streams are stored and outputs them to the decoder unit 113.

The decoder unit 113 decodes the input stream based on the MPEG syntax, and supplies the decoded stream to the motion compensation circuit 114. The motion compensation circuit 114 performs motion compensation by reading decoded reference pixel data from the video buffer 432 through the buffer control circuit 421 according to whether macroblocks output from the decoder unit 113 are subjected to motion compensation. The motion compensation circuit 114 then outputs the resulting pixel data to the buffer control circuit 421. In this case, in order to read the reference pixel data from the video buffer 432, the motion compensation circuit 114 supplies necessary information concerning the pixel positions and sizes of the reference pixels to the buffer control circuit 421. The buffer control circuit 421 then reads the necessary reference pixels from the video buffer 432 based on the information concerning the pixel positions and sizes. In this case, since the video buffer 432 is accessed by the #1 decode chip 402 or the #2 decode chip 403, address control accompanying data transfer or timing control to determine when to occupy a data bus or when to send and receive data is necessary.

If the macroblocks output from the decoder unit 113 use motion compensation, the motion compensation circuit 114 reads the reference pixel data from the video buffer 432 through the buffer control circuit 421 in accordance with the prediction vectors output from the decoder unit 113, and then adds the read reference pixel data to the pixel data supplied from the decoder unit 113, thereby performing motion compensation. The motion compensation circuit 114 stores the motion-compensated pixel data in the video buffer 432 through the buffer control circuit 421. The pixel data stored in the video buffer 432 is used as a display image and may be used as reference data for other pictures.

The buffer control circuit 421 also reads out the pixel data stored in the video buffer 432 and supplies it to the display output circuit 97. The display output circuit 97 outputs the pixel data read from the video buffer 432 through the buffer control circuit 421 as decoded video data.

Figure 32:
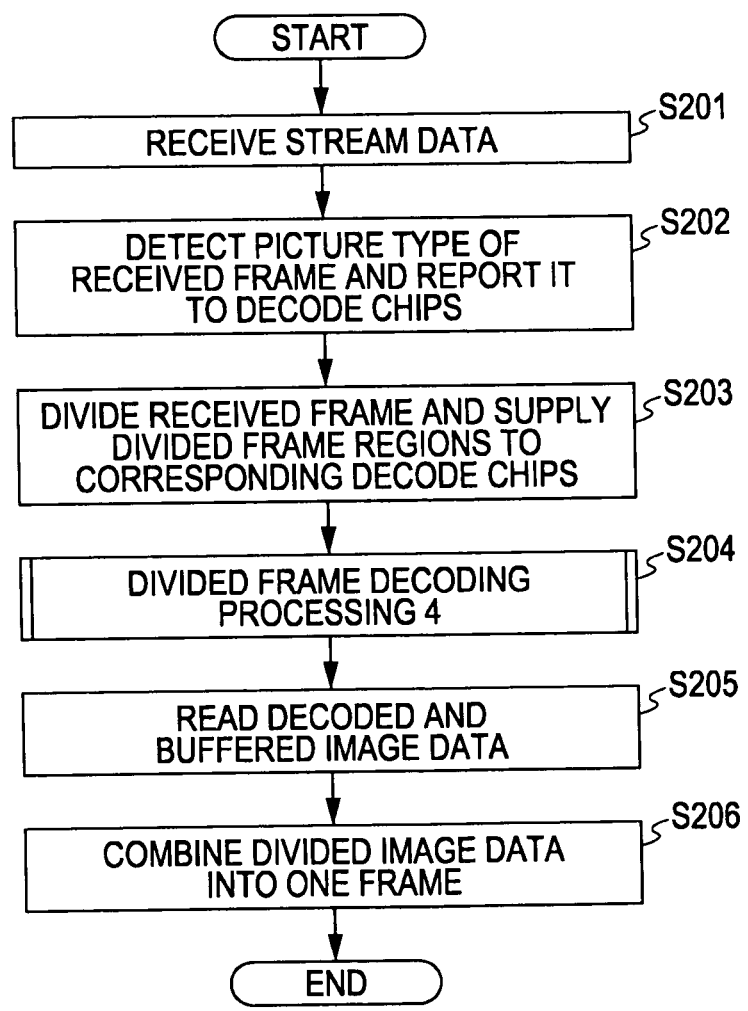
FIG. 32 is a flowchart illustrating decoding processing 4.

A description is now given, with reference to the flowchart in FIG. 32, of decoding processing 4 executed by the decoder 54-6 in FIG. 31.

In step S201, the stream divider 72 receives the input of stream data.

In step S202, the controller 401 detects the picture type of each frame of the stream data and supplies a control signal indicating the picture type to the #1 decode chip 402 and the #2 decode chip 403.

In step S203, the stream divider 72 divides the received frame under the control of the controller 401, and allocates and supplies the divided frame regions to the #1 decode chip 402 and the #2 decode chip 403.

Figure 33:
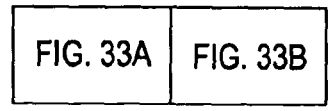
FIG. 33, which is composed of FIGS. 33A and 33B, is a flowchart illustrating divided frame decoding processing 4.
Figure 33A:
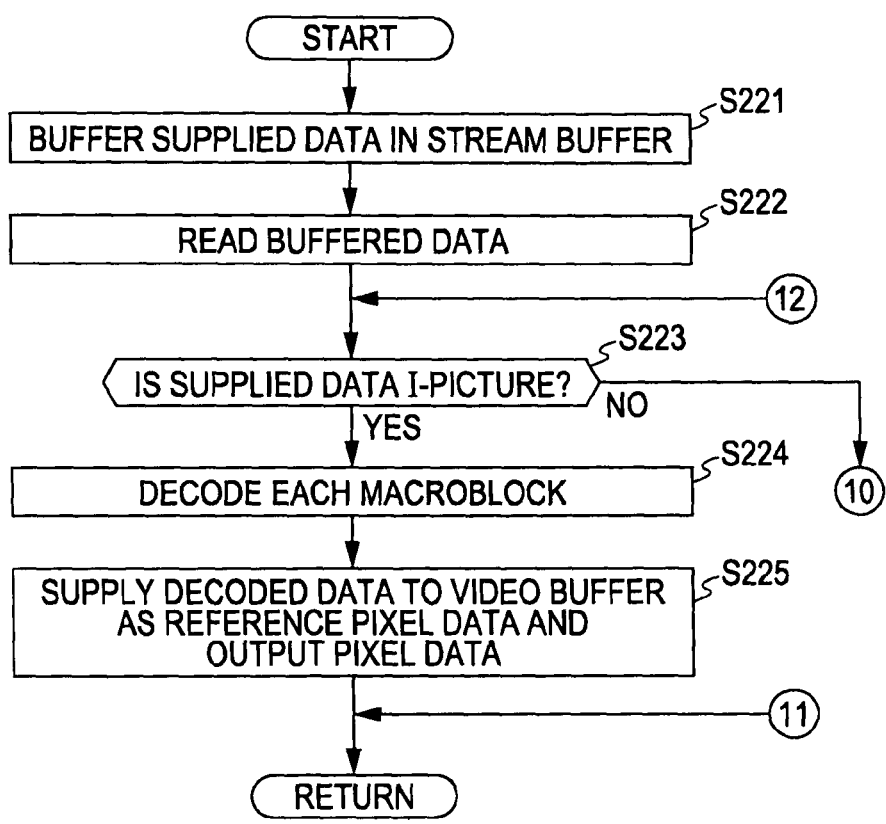
Figure 33B:
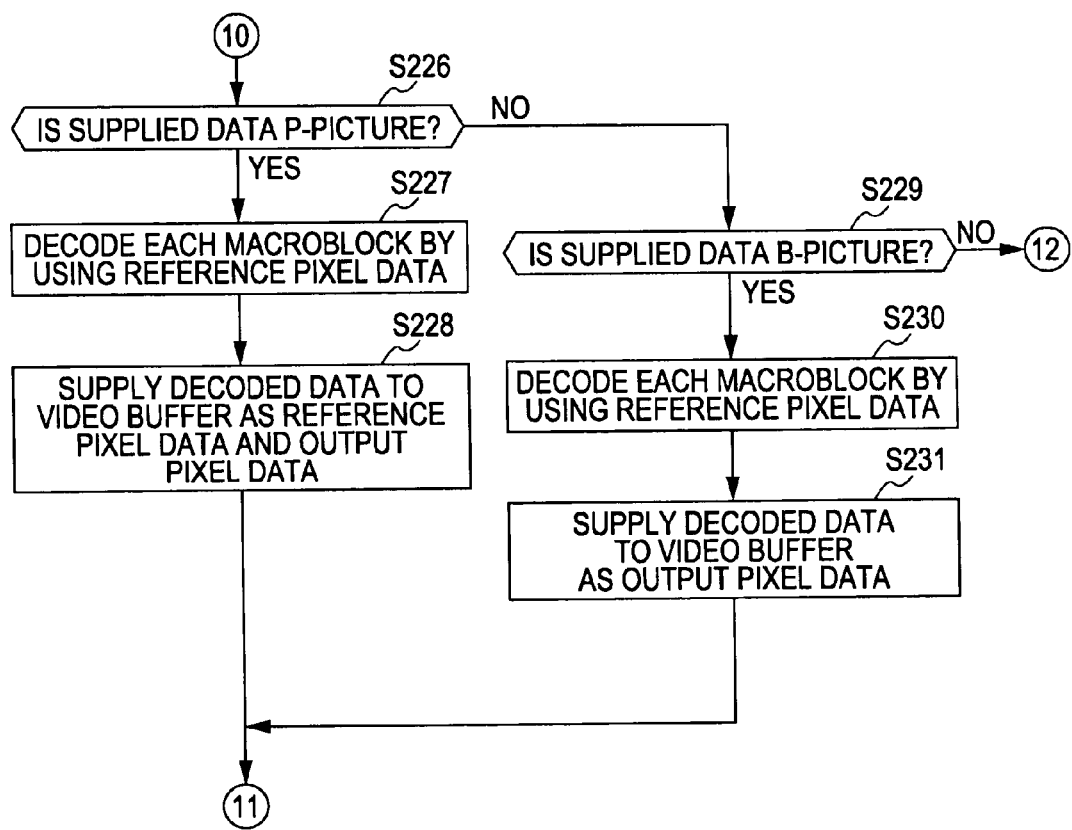

In step S204, divided frame decoding processing 4, which is described in detail below with reference to FIG. 33, which is composed of FIGS. 33A and 33B, is executed.

In step S205, the display output circuit 97 of the #1 decode chip 402 generates a synchronizing timing signal for outputting image data formed of the decoded pixel data, and based on the timing signal, the display output circuit 97 reads out, through the buffer control circuit 411, among the pixel data buffered in the video buffer 432, image data (indicated by a in FIG. 10) decoded by the decoder unit 93 to the selector 97 as decoded video data. Meanwhile, the display output circuit 117 of the #2 decode chip 403 generates a synchronizing timing signal for outputting image data formed of the decoded pixel data, and based on the timing signal, the display output circuit 117 reads out, through the buffer control circuit 421, among the pixel data buffered in the video buffer 432, image data (indicated by b in FIG. 10) decoded by the decoder unit 113 to the selector 97 as decoded video data.

In step S206, the selector 79 receives the image data decoded by the #1 decode chip 402 and the #2 decode chip 403 and combines the divided image data into one frame. The processing is then completed.

According to the above-described processing, the decoder 54-6 shown in FIG. 31 can divide one frame and decode divided frame regions by using the #1 decode chip 402 and the #2 decode chip 403.

In the #1 decode chip 402 and the #2 decode chip 403, however, since the buffer 404 is shared by the #1 decode chip 402 and the #2 decode chip 403, complicated address control accompanying data transfer or timing control to determine when to occupy the data bus or when to send and receive data is necessary. Accordingly, to perform fast decoding processing without a delay, the data transfer rate between the buffer 404 and the #1 decode chip 402 or the #2 decode chip 403 should be reasonably high.

Although tin this example the picture type of each frame is detected by the controller 401, each of the #1 decode chip 402 and the #2 decode chip 403 may detect the picture type.

Although in this example the stream divider 72 divides each frame of a supplied coded stream, each of the #1 decode chip 402 and the #2 decode chip 403 may receive undivided stream data and select and extract a decoding zone of the frame under the control of the controller 401.

Divided frame decoding processing 4 executed in step S204 in FIG. 32 is described below with reference to the flowchart in FIG. 33, which is composed of FIGS. 33A and 33B.

In step S221, the stream input circuit 91 of the #1 decode chip 402 receives data divided by the stream divider 72 and supplies it to the buffer control circuit 411. The buffer control circuit 411 buffers the supplied data in the stream buffer 431. Meanwhile, the stream input circuit 111 of the #2 decode chip 403 receives data divided by the stream divider 72 and supplies it to the buffer control circuit 421. The buffer control circuit 421 buffers the supplied data in the stream buffer 431.

In step S222, the buffer control circuit 411 reads out data buffered in the stream buffer 431 to the decoder unit 93. The buffer control circuit 421 reads out data buffered in the stream buffer 431 to the decoder unit 113.

In step S223, the decoder unit 93 or 113 determines based on a control signal supplied from the controller 401 whether the supplied data is an I-picture. If it is determined in step S223 that the supplied data is not an I-picture, the process proceeds to step S226.

If the supplied data is found to be an I-picture in step S223, the process proceeds to step S224 in which the decoder unit 93 or 113 decodes each macroblock contained in the supplied coded data.

In step S225, the buffer control circuit 411 receives the decoded data from the decoder unit 93, and supplies the decoded pixel data (corresponding to the I-picture first region in FIG. 11) to the video buffer 432 as a reference picture and as an output picture. The buffer control circuit 421 receives the decoded data from the decoder unit 113, and supplies the decoded pixel data (corresponding to the I-picture second region in FIG. 11) to the video buffer 432 as a reference picture and as an output picture. The process then returns to step S204 in FIG. 32 and proceeds to step S205.

If it is determined in step S223 that the supplied data is not an I-picture, the process proceeds to step S226 to determine based on the control signal supplied from the controller 401 whether the supplied data is a P-picture. If it is determined in step S226 that the supplied data is not a P-picture, the process proceeds to step S229, which is discussed later.

If the supplied data is found to be a P-picture in step S226, the process proceeds to step S227. In step S227, the decoder unit 93 or 113 decodes each macroblock by using reference pixel data. More specifically, since macroblocks contained in a P-picture use motion compensation, the decoder unit 93 separates the slice layer into macroblocks and outputs the resulting prediction vectors and pixels to the motion compensation circuit 94. The motion compensation circuit 94 reads out the reference pixel data from the video buffer 432 through the buffer control circuit 411 in accordance with the prediction vectors output from the decoder unit 93 and adds the read reference pixel data to the pixel data supplied from the decoder unit 93, thereby performing motion compensation. The decoder unit 113 separates the slice layer into macroblocks and outputs the resulting prediction vectors and pixels to the motion compensation circuit 114. The motion compensation circuit 114 reads out the reference pixel data from the video buffer 432 through the buffer control circuit 421 in accordance with the prediction vectors output from the decoder unit 113 and adds the read reference pixel data to the pixel data supplied from the decoder unit 113, thereby performing motion compensation.

In step S228, the buffer control circuit 411 receives the decoded data (corresponding to the pixel data of the P-picture first region in FIG. 13) from the decoder unit 93 and supplies it to the video buffer 432 as a reference picture or an output picture. The buffer control circuit 421 receives the decoded data (corresponding to the pixel data of the P-picture second region in FIG. 13) from the decoder unit 113 and supplies it to the video buffer 432 as a reference picture or an output picture. The process then returns to step S204 in FIG. 32 and proceeds to step S205.

If it is determined in step S226 that the supplied data is not a P-picture, the process proceeds to step S229 to determine based on the control signal supplied from the controller 401 whether the supplied data is a B-picture. If it is determined in step S229 that the supplied data is not a B-picture, the process returns to step S223.

If the pixel data is found to be a B-picture in step S229, the process proceeds to step S230. In step S230, the decoder unit 93 or 113 decodes each macroblock by using reference pixel data. More specifically, since the macroblocks contained in a B-picture use motion compensation, the decoder unit 93 separates the slice layer into macroblocks and decodes each macroblock to output the resulting prediction vectors and pixels to the motion compensation circuit 94. The motion compensation circuit 94 then reads the reference pixel data from the video buffer 432 through the buffer control circuit 411 in accordance with the prediction vectors output from the decoder unit 93 and adds the read reference pixel data to the pixel data supplied from the decoder unit 93, thereby performing motion compensation. Meanwhile, the decoder unit 113 separates the slice layer into macroblocks and decodes each macroblock to output the resulting prediction vectors and pixels to the motion compensation circuit 114. The motion compensation circuit 114 then reads the reference pixel data from the video buffer 432 through the buffer control circuit 421 in accordance with the prediction vectors output from the decoder unit 113 and adds the read reference pixel data to the pixel data supplied from the decoder unit 113, thereby performing motion compensation.

In step S231, the buffer control circuit 411 receives the decoded data (corresponding to the B-picture first region in FIG. 14) from the decoder unit 93, and supplies it to the video buffer 432 as an output image. The buffer control circuit 421 receives the decoded data (corresponding to the B-picture second region in FIG. 14) from the decoder unit 113, and supplies it to the video buffer 432 as an output image. The process then returns to step S204 in FIG. 32 and proceeds to step S205.

According to the above-described processing, decoding processing is performed by each of the #1 decode chip 402 and the #2 decode chip 403 based on the picture type detected by the controller 401. In this case, in each of the #1 decode chip 402 and the #2 decode chip 403, pixel data to be used as a reference picture by the other decode chip can be read from the same video buffer 432.

Figure 34:
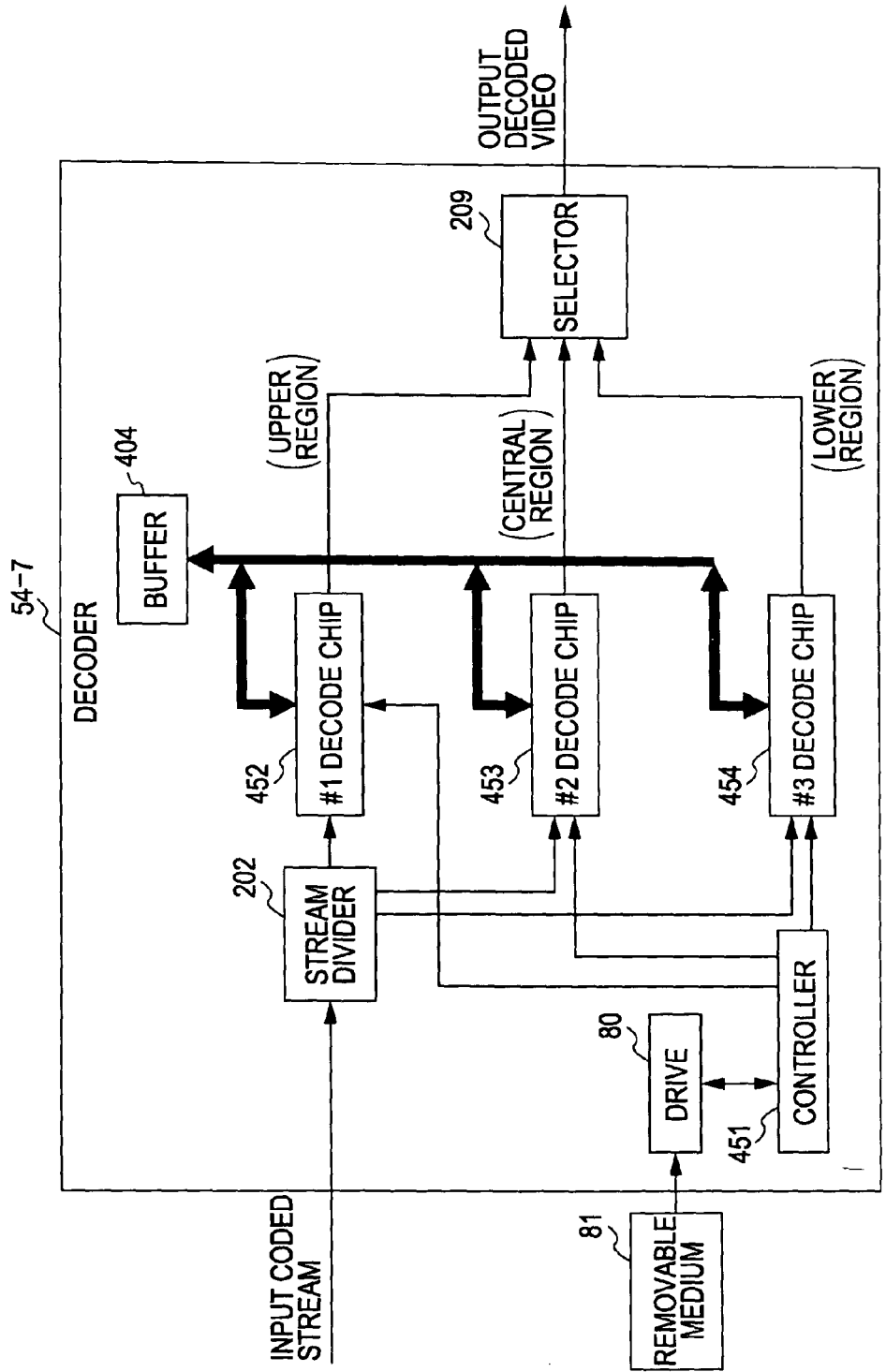
FIG. 34 is a block diagram illustrating a seventh example of the configuration of a decoder according to an embodiment of the present invention.

FIG. 34 is a block diagram illustrating the configuration of a decoder 54-7, which is a seventh example of the decoder 54, having three decode chips and using a common buffer for all the three decode chips. In FIG. 34, elements corresponding to those shown in any of the decoders 54-1 through 54-6 are designated with like reference numerals, and a detailed explanation thereof is thus omitted.

The decoder 54-7 includes the stream divider 202, the buffer 404, a controller 451, a #1 decode chip 452, #2 decode chip 453, a #3 decode chip 454, and the selector 209. Although the decoder 54-7 may be provided with four or more decode chips, a description is given below, assuming that three decoders, i.e., the #1 decode chip 452 through the # decode chip 454, are provided.

The controller 451 controls the overall operation of the decoder 54-7 based on the operation input from a user, a control signal supplied from an external device, or information supplied from the stream divider 202.

Under the control of the controller 451, the stream divider 202 decodes the sequence layer, the GOP layer, and the picture layer of a supplied coded stream, and divides each picture of the coded stream by the same number (in this case, three) as the decode chips, and allocates and supplies the divided picture regions to the #1 decode chip 452, the #2 decode chip 453, and the #3 decode chip 454.

The stream divider 202 also supplies information, such as the picture type, obtained as a result of decoding the sequence layer, the GOP layer, and the picture layer, of the supplied stream, to the controller 451.

A picture may be divided equally or unequally. The stream divider 202 may have the function of detecting the complexity of an image, and if the complexity of the image is very different among the picture regions, the stream divider 202 may determine the division ratio of a picture based on the complexity of the image (difficulty in coding).

The #1 decode chip 452 decodes the divided picture supplied from the stream divider 202 under the control of the controller 451, and stores the decoded pixel data in the buffer 404, and performs decoding processing by referring to the stored data if necessary.

The #2 decode chip 453 decodes the divided picture supplied from the stream divider 202 under the control of the controller 451, and stores the decoded pixel data in the buffer 404, and performs decoding processing by referring to the stored data if necessary.

The #3 decode chip 454 decodes the divided picture supplied from the stream divider 202 under the control of the controller 451, and stores the decoded pixel data in the buffer 404, and performs decoding processing by referring to the stored data if necessary.

The buffer 404, which is formed of, for example, a DRAM, temporarily stores coded streams supplied to the #1 decode chip 452, the #2 decode chip 453, and the #3 decode chip 454 and pixel data decoded by the #1 decode chip 452, the #2 decode chip 453, and the #3 decode chip 454.

The selector 209 receives the decoded pixel data from the #1 decode chip 452, the #2 decode chip 453, and the #3 decode chip 454 and outputs the pixel data as decoded video data.

The decoder 54-7 may be provided with the drive 80, and the drive 80 is connected to the controller 451 to send and receive information to and from the removable medium 81 installed in the drive 80.

Decoding processing performed by the decoder 54-7 by using the #1 decode chip 452 through the #3 decode chip 454 is basically similar to the decoding processing discussed with reference to FIGS. 32 and 33 performed by the decoder 54-6 shown in FIG. 31.

In the decoder 54-7, instead of providing a single buffer for all decode chips, a buffer may be provided for each decode chip. Instead of supplying reference pictures to another decode chip in advance, each decode chip may request another decode chip to send reference pictures for decoding processing when being needed.

Figure 35B:
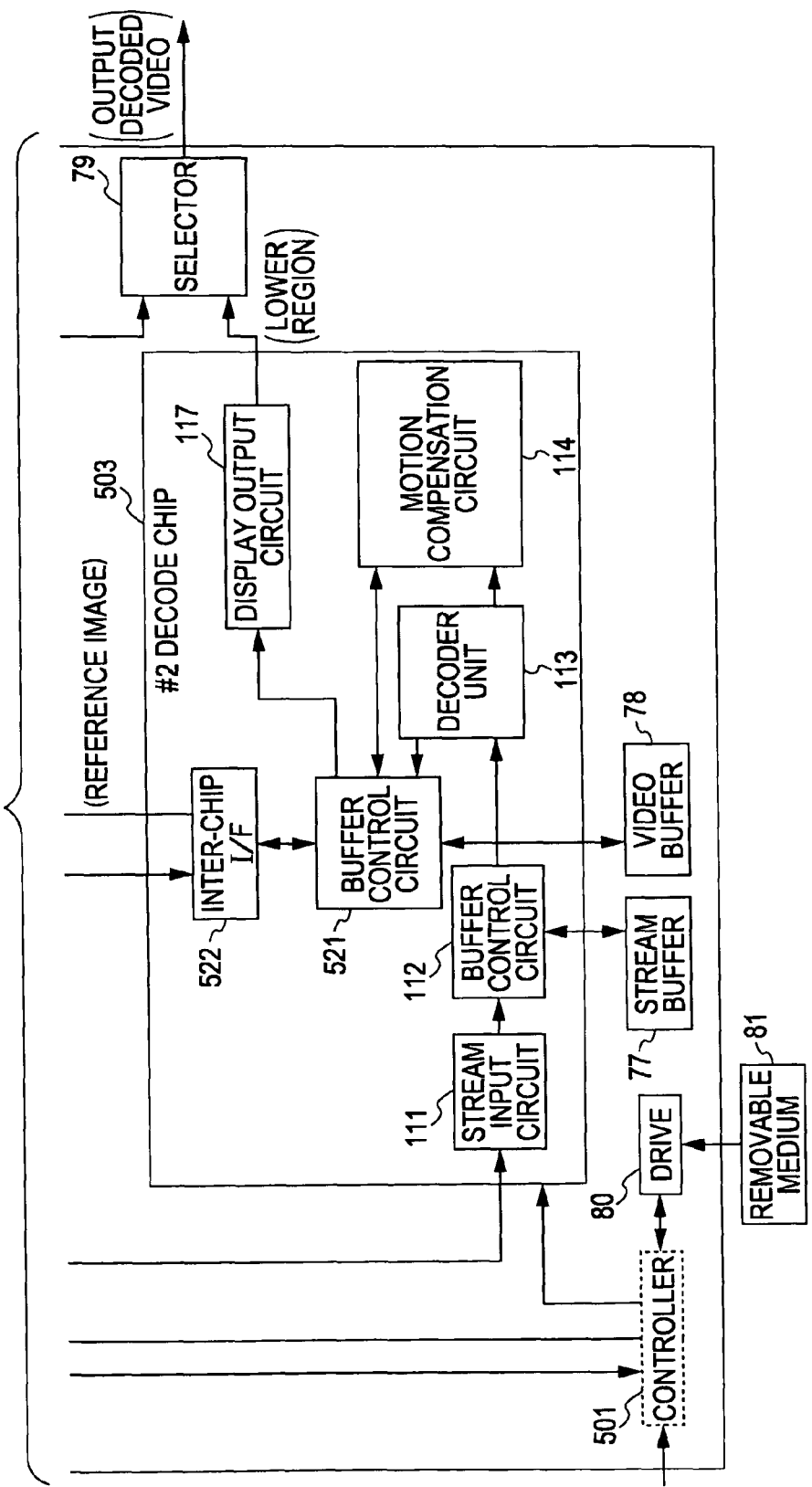
FIG. 35, which is composed of FIGS. 35A and 35B, is a block diagram illustrating an eighth example of the configuration of a decoder according to an embodiment of the present invention.

FIG. 35, which is composed of FIGS. 35A and 35B, is a block diagram illustrating the configuration of a decoder 54-8, which is an eighth example of the decoder 54. In the decoder 54-8, when one decode chip needs a reference picture in an area which is not contained in pixel data decoded by that decode chip, the decode chip can request another decode chip to send that area containing the reference picture. In FIG. 35, elements corresponding to those in FIG. 7 are designated with like reference numerals, and a detailed explanation thereof is thus omitted.

The configuration of the decoder 54-8 shown in FIG. 35 is basically similar to that of the decoder 54-1 shown in FIG. 7, except that a controller 501 is provided instead of the controller 71 and that a #1 decode chip 502 and a #2 decode chip 503 are provided instead of the #1 decode chip 73 and the #2 decode chip 76, respectively. In the decoder 54-8, even if one buffer, i.e., the #1 buffer 302 or the #2 buffer 304, each including the stream buffer 74 or 77 and the video buffer 75 or 78, is provided for each decode chip, and even if only one buffer control circuit is provided for each decode chip, as in the decoder 54-3 shown in FIG. 24, processing of such a decoder is basically similar to that of the decoder 54-8 having two buffers, i.e., a stream buffer and a video buffer, and two buffer control circuits in each decode chip. Accordingly, details of the configuration and processing of such a decoder is omitted here.

The configuration of the #1 decode chip 502 is basically similar to that of the #1 decode chip 73, except that a buffer control circuit 511 is substituted for the buffer control circuit 95 and an inter-chip interface 512 is substituted for the inter-chip interface 96. The configuration of the #2 decode chip 503 is basically similar to that of the #2 decode chip 76, except that a buffer control circuit 521 is substituted for the buffer control circuit 115 and an inter-chip interface 522 is substituted for the inter-chip interface 116.

In the #1 decode chip 502, when macroblocks sent from the decoder unit 93 use motion compensation, the motion compensation circuit 94 reads out reference pixel data from the video buffer 75 through the buffer control circuit 511 in accordance with the prediction vectors output from the decoder unit 93, or requests the #2 decode chip 503 to send reference pixel data through the buffer control circuit 511 and the inter-chip interface 512.

A signal requesting the #2 decode chip 503 to send reference pixel data includes information for specifying requested reference pixel data, such as information concerning the position or size of the reference pixel data.

The inter-chip interface 522 of the #2 decode chip 503 supplies the request signal received from the #1 decode chip 502 to the buffer control circuit 521. The buffer control circuit 521 reads out the requested reference picture from the video buffer 78, and supplies it to the #1 decode chip 502 through the inter-chip interface 522. The inter-chip interface 512 of the #1 decode chip 502 supplies the received reference pixel to the buffer control circuit 511, and the buffer control circuit 511 supplies the requested pixel data as a reference picture to the motion compensation circuit 94.

The motion compensation circuit 94 then performs motion compensation by adding the supplied reference pixel data to the pixel data output from the decoder unit 93. The motion compensation circuit 94 then writes the motion-compensated pixel data to the video buffer 75 through the buffer control circuit 511. The pixel data stored in the video buffer 75 is used as a display image and may be used as reference data for other pictures.

Also in the #2 decode chip 503, when macroblocks output from the decoder unit 113 use motion compensation, the motion compensation circuit 114 similarly requests the #1 decode chip 502 to send reference pixel data through the buffer control circuit 521 and the inter-chip interface 522.

Decoding processing 5 executed by the decoder 54-8 discussed with reference to FIG. 35 is described below with reference to the flowchart in FIG. 36.

In step S261, the stream divider 72 receives the input of stream data.

In step S262, the controller 501 detects the picture type of each frame of the stream data and supplies a control signal indicating the picture type to the #1 decode chip 502 and the #2 decode chip 503.

In step S263, the stream divider 72 divides the received frame under the control of the controller 501, and allocates and supplies the divided frame regions to the #1 decode chip 502 and the #2 decode chip 503.

Figure 37B:
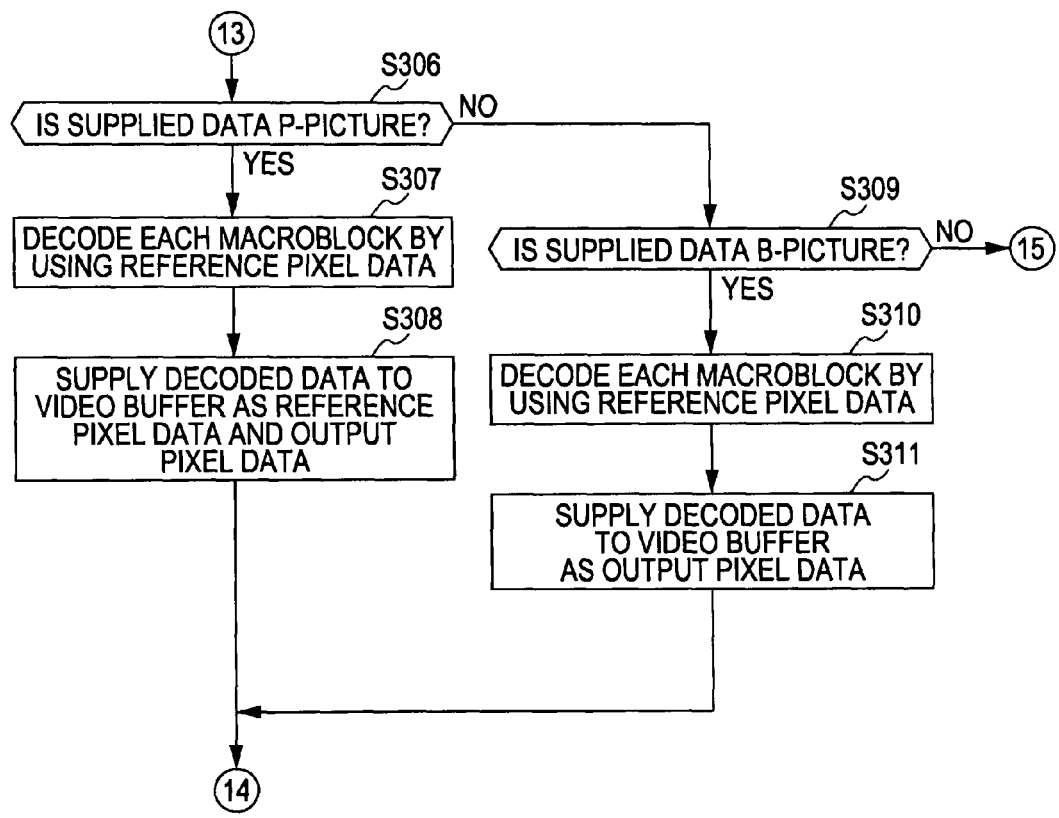
FIG. 37, which is composed of FIGS. 37A and 37B, is a flowchart illustrating divided frame decoding processing 5.

In step S264, divided frame decoding processing 5, which is described in detail below with reference to FIG. 37, which is composed of FIGS. 37A and 37B, is executed.

In step S265, the display output circuit 97 of the #1 decode chip 502 generates a synchronizing timing signal for outputting image data formed of the decoded pixel data, and based on the timing signal, the display output circuit 97 reads out, through the buffer control circuit 511, among the pixel data buffered in the video buffer 75, image data (indicated by a in FIG. 10) decoded by the decoder unit 93 to the selector 97 as decoded video data. Meanwhile, the display output circuit 117 of the #2 decode chip 503 generates a synchronizing timing signal for outputting image data formed of the decoded pixel data, and based on the timing signal, the display output circuit 117 reads out, through the buffer control circuit 521, among the pixel data buffered in the video buffer 78, image data (indicated by b in FIG. 10) decoded by the decoder unit 113 to the selector 97 as decoded video data.

In step S266, the selector 79 receives the image data decoded by the #1 decode chip 502 and the #2 decode chip 503 and combines the divided image data into one frame. The processing is then completed.

According to the above-described processing, the decoder 54-8 shown in FIG. 35 can divide one frame and decode divided frame regions by using the #1 decode chip 502 and the #2 decode chip 503.

Although in this example the picture type of each frame is detected by the controller 501, each of the #1 decode chip 502 and the #2 decode chip 503 may detect the picture type.

The stream divider 72 divides each frame of the supplied coded stream. Alternatively, each of the #1 decode chip 502 and the #2 decode chip 503 may receive undivided stream data and selects and extracts a decoding zone from each frame under the control of the controller 501.

Figure 36:
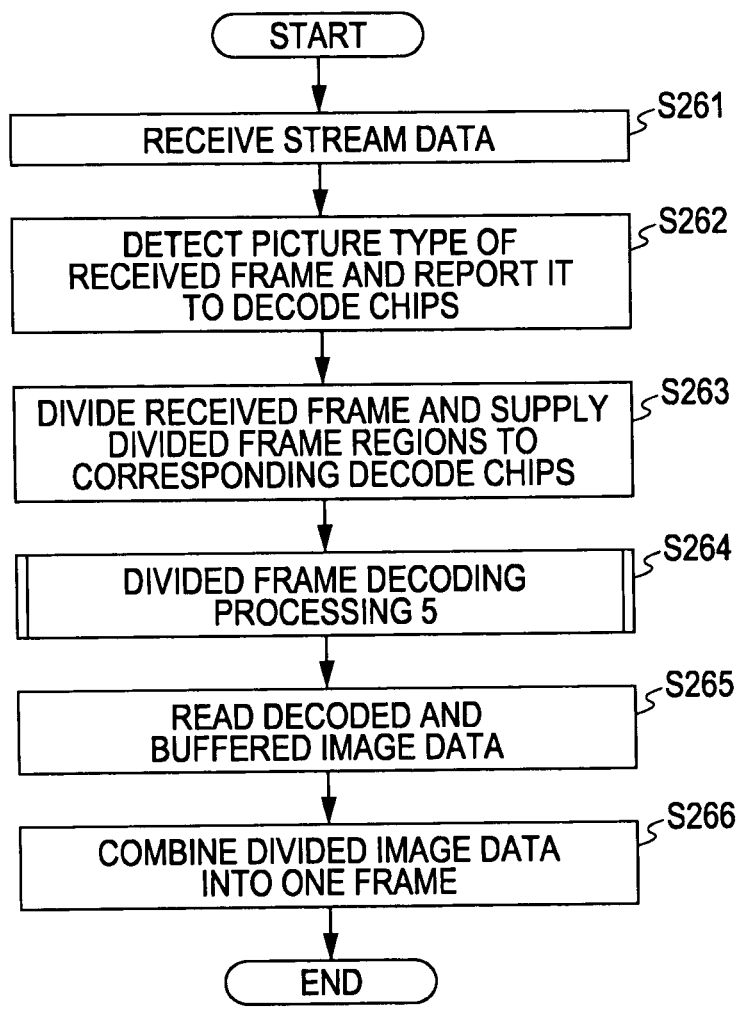
FIG. 36 is a flowchart illustrating decoding processing 5.

Divided frame decoding processing 5 executed in step S264 in FIG. 36 is described below with reference to the flowchart in FIG. 37 which is composed of FIGS. 37A and 37B.

In step S301, the stream input circuit 91 of the #1 decode chip 502 receives data divided by the stream divider 72 and supplies it to the buffer control circuit 92. The buffer control circuit 92 buffers the supplied data in the stream buffer 74. Meanwhile, the stream input circuit 111 of the #2 decode chip 503 receives data divided by the stream divider 72 and supplies it to the buffer control circuit 112. The buffer control circuit 112 buffers the supplied data in the stream buffer 77.

In step S302, the buffer control circuit 92 reads out data buffered in the stream buffer 74 to the decoder unit 93. The buffer control circuit 112 reads out data buffered in the stream buffer 77 to the decoder unit 113.

In step S303, the decoder unit 93 or 113 determines based on a control signal supplied from the controller 501 whether the supplied data is an I-picture. If it is determined in step S303 that the supplied data is not an I-picture, the process proceeds to step S306.

If the supplied data is found to be an I-picture in step S303, the process proceeds to step S304 in which the decoder unit 93 or 113 decodes each macroblock contained in the supplied coded data.

In step S305, the buffer control circuit 511 receives the decoded data from the decoder unit 93, and supplies the decoded pixel data (corresponding to the I-picture first region in FIG. 11) to the video buffer 75 as a reference picture and as an output picture. The buffer control circuit 521 receives the decoded data from the decoder unit 113, and supplies the decoded pixel data (corresponding to the I-picture second region in FIG. 11) to the video buffer 78 as a reference picture and as an output picture. The process then returns to step S264 in FIG. 36 and proceeds to step S265.

If it is determined in step S303 that the supplied data is not an I-picture, the process proceeds to step S306 to determine based on the control signal supplied from the controller 501 whether the supplied data is a P-picture. If it is determined in step S306 that the supplied data is not a P-picture, the process proceeds to step S309, which is discussed later.

If the supplied data is found to be a P-picture in step S306, the process proceeds to step S307. In step S307, the decoder unit 93 or 113 decodes each macroblock by using reference pixel data.

More specifically, since macroblocks contained in a P-picture use motion compensation, the decoder unit 93 separates the slice layer into macroblocks and outputs the resulting prediction vectors and pixels to the motion compensation circuit 94. The motion compensation circuit 94 reads out the reference pixel data from the video buffer 75 through the buffer control circuit 511 in accordance with the prediction vectors output from the decoder unit 93. Alternatively, the motion compensation circuit 94 requests the #2 decode chip 503 to send reference pixel data stored in the video buffer 78 through the buffer control circuit 511 and the inter-chip interface 512. If the #1 decode chip 502 requests reference pixel data, information concerning the pixel position and size for specifying reference pixel data is supplied to the #2 decode chip 503.

In response to the request signal, the inter-chip interface 522 of the #2 decode chip 503 supplies the request signal received from the #1 decode chip 502 to the buffer control circuit 521. The buffer control circuit 521 reads out the requested reference picture from the video buffer 78 and supplies it to the #1 decode chip 502 through the inter-chip interface 522. The inter-chip interface 512 of the #1 decode chip 502 supplies the received reference picture to the buffer control circuit 511, and the buffer control circuit 511 supplies the pixel data to the motion compensation circuit 94. The motion compensation circuit 94 then performs motion compensation by adding the obtained reference pixel data to the pixel data supplied from the decoder unit 93.

Also in #2 decode chip 503, the motion compensation circuit 114 reads out reference pixel data from the video buffer 78 or requests the #1 decode chip 502 to send reference pixel data.

In step S308, the buffer control circuit 511 receives the decoded data (corresponding to the pixel data of the P-picture first region in FIG. 13) from the decoder unit 93 and supplies it to the video buffer 75 as a reference picture or an output picture. The buffer control circuit 521 receives the decoded data (corresponding to the pixel data of the P-picture second region in FIG. 13) from the decoder unit 113 and supplies it to the video buffer 78 as a reference picture or an output picture. The process then returns to step S264 in FIG. 36 and proceeds to step S265.

If it is determined in step S306 that the supplied data is not a P-picture, the process proceeds to step S309 to determine based on the control signal supplied from the controller 501 whether the supplied data is a B-picture. If it is determined in step S309 that the supplied data is not a B-picture, the process returns to step S303.

If the pixel data is found to be a B-picture in step S309, the process proceeds to step S310. In step S310, the decoder unit 93 or 113 decodes each macroblock by using reference pixel data.

More specifically, since the macroblocks contained in a B-picture use motion compensation, the decoder unit 93 separates the slice layer into macroblocks and decodes each macroblock to output the resulting prediction vectors and pixels to the motion compensation circuit 94. The motion compensation circuit 94 then reads the reference pixel data from the video buffer 75 through the buffer control circuit 511 in accordance with the prediction vectors output from the decoder unit 93. Alternatively, the motion compensation circuit 94 requests the #2 decode chip 503 to send reference pixel data stored in the video buffer 78 through the buffer control circuit 511 and the inter-chip interface 512. If the #1 decode chip 502 requests reference pixel data, information concerning the pixel position and size for specifying reference pixel data is supplied to the #2 decode chip 503.

In response to the request signal, the inter-chip interface 522 of the #2 decode chip 503 supplies the request signal received from the #1 decode chip 502 to the buffer control circuit 521. The buffer control circuit 521 reads out the requested reference picture from the video buffer 78 and supplies it to the #1 decode chip 502 through the inter-chip interface 522. The inter-chip interface 512 of the #1 decode chip 502 supplies the received reference picture to the buffer control circuit 511, and the buffer control circuit 511 supplies the pixel data to the motion compensation circuit 94. The motion compensation circuit 94 then performs motion compensation by adding the obtained reference pixel data to the pixel data supplied from the decoder unit 93.

Also in the #2 decode chip 503, the motion compensation circuit 114 reads out reference pixel data from the video buffer 78 or requests the #1 decode chip 502 to send reference pixel data.

In step S311, the buffer control circuit 511 receives the decoded data (corresponding to the B-picture first region in FIG. 14) from the decoder unit 93, and supplies it to the video buffer 75 as an output image. The buffer control circuit 521 receives the decoded data (corresponding to the B-picture second region in FIG. 14) from the decoder unit 113, and supplies it to the video buffer 78 as an output image. The process then returns to step S264 in FIG. 36 and proceeds to step S265.

According to the above-described processing, decoding processing is performed by each of the #1 decode chip 502 and the #2 decode chip 503 based on the picture type detected by the controller 501. In this case, in each of the #1 decode chip 502 and the #2 decode chip 503, if pixel data used as a reference picture is not contained in the pixel data decoded by one decode chip, the decode chip can request the other decode chip to send reference pixel data.

Figure 38:
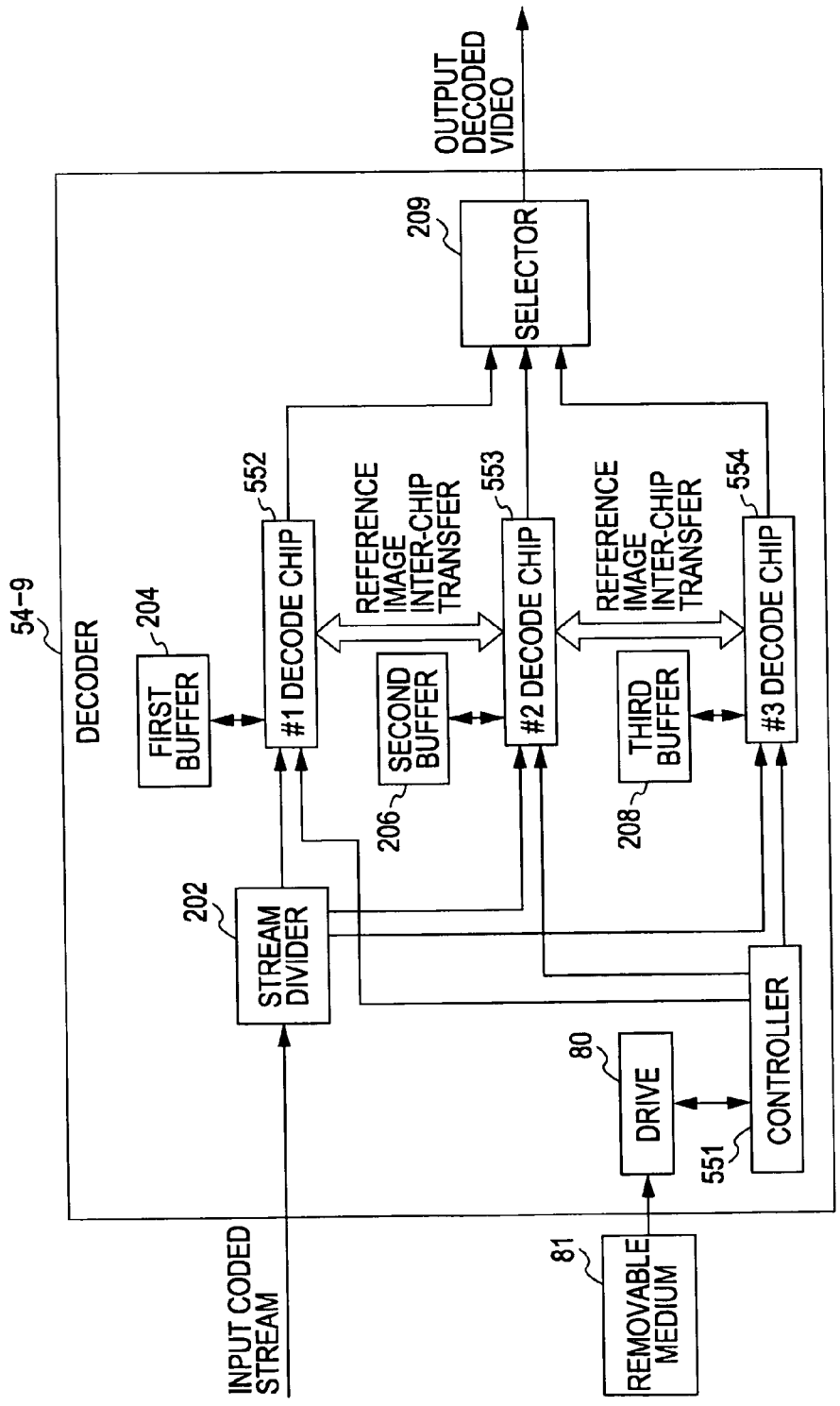
FIG. 38 is a block diagram illustrating a ninth example of the configuration of a decoder according to an embodiment of the present invention.

FIG. 38 is a block diagram illustrating the configuration of a decoder 54-9, which is a ninth example of the decoder 54. The decoder 54-9 includes three decode chips, and each decode chip can request another decode chip to send pixel data used as a reference picture only when it is necessary. In FIG. 38, elements corresponding to those in any of the decoders 54-1 through 54-8 are designated with like reference numerals, and a detailed explanation thereof is thus omitted.

The decoder 54-9 includes a controller 551, the stream divider 202, a #1 decode chip 552, the first buffer 204, a #2 decode chip 553, the second buffer 206, a #3 decode chip 554, the third buffer 208, and the selector 209. Although the decoder 54-9 may be provided with four or more decode chips, a description is given below, assuming that three decode chips, i.e., the #1 decode chip 552 through the #3 decode chip 554, are provided. The first buffer 204 through the third buffer 208 each include a stream buffer and a video buffer. The stream buffer and the video buffer may be provided separately.

The controller 551 controls the overall operation of the decoder 54-9 based on the operation input from a user, a control signal supplied from an external device, or information supplied from the stream divider 202.

Under the control of the controller 551, the stream divider 202 decodes the sequence layer, the GOP layer, and the picture layer of a supplied coded stream, and divides each picture of the coded stream by the same number (in this case, three) as the decode chips, and allocates and supplies the divided picture regions to the #1 decode chip 552 through the #3 decode chip 554. Each picture may be divided in units of slices by the same number (in this case, three) as the decode chips. Alternatively, each picture may be divided vertically or obliquely by the same number (in this case, three) as the decode chips. If MPEG2 decoding is employed, dividing pictures vertically or obliquely may be more difficult than dividing pictures in units of slices. When dividing one picture in units of slices by the same number as decode chips, the stream divider 202 can divide each frame based on the slice start code.

Under the control of the controller 551, the #1 decode chip 552 decodes the divided picture supplied from the stream divider 202 and supplies the decoded pixel data to the first buffer 204 and stores it therein. If the reference pixel data is not stored in the first buffer 204, the #1 decode chip 552 requests the #2 decode chip 553 to send the reference pixel data, and then performs decoding processing.

The first buffer 204, which is formed of, for example, a DRAM, receives coded streams supplied to the #1 decode chip 552 and video signals (pixel data) decoded by the #1 decode chip 552, and temporarily stores them.

Under the control of the controller 551, the #2 decode chip 553 decodes the divided picture supplied from the stream divider 202 and supplies the decoded pixel data to the second buffer 206 and stores it therein. If the reference pixel data is not stored in the second buffer 206, the #2 decode chip 553 requests the #1 decode chip 552 or the #3 decode chip 554 to send the reference pixel data, and then performs decoding processing.

The second buffer 206, which is formed of, for example, a DRAM, receives coded streams supplied to the #2 decode chip 553 and video signals (pixel data) decoded by the #2 decode chip 553, and temporarily stores them.

Under the control of the controller 551, the #3 decode chip 554 decodes the divided picture supplied from the stream divider 202 and supplies the decoded pixel data to the third buffer 208 and stores it therein. If the reference pixel data is not stored in the third buffer 208, the #3 decode chip 554 requests the #2 decode chip 553 to send the reference pixel data, and then performs decoding processing.

The third buffer 208, which is formed of, for example, a DRAM, receives coded streams supplied to the #3 decode chip 554 and video signals (pixel data) decoded by the #3 decode chip 554, and temporarily stores them.

The selector 209 receives the decoded pixel data from the #1 decode chip 552 through the #3 decode chip 554 and outputs it as decoded video data.

The decoder 54-9 may be provided with the drive 80, and the drive 80 is connected to the controller 551 to send and receive information to and from the removable medium 81 installed in the drive 80.

Processing performed by the decode chip 54-9 by using three decode chips, i.e., the #1 decode chip 552 through the #3 decode chip 554, is basically similar to the processing performed by the decoder 54-8 including two decode chips discussed with reference to FIGS. 35 through 37.

The above-described series of processing operations may be executed by software. In this case, a corresponding software program is installed from a recording medium into a computer built in dedicated hardware or into a computer, such as a general-purpose computer, that can execute various functions by installing various programs thereinto.

Such a recording medium is formed of, as shown in FIG. 7, 21, 24, 25, 28, 31, 34, 35, or 38, the removable medium 81, recording the program thereon, such as a magnetic disk (including a flexible disk), an optical disc (including a compact disk read only memory (CD-ROM or a digital versatile disk (DVD)), a magneto-optical disk (including a mini-disk (MD) (registered)), or a semiconductor memory, distributed to the user separately from a computer.

In this specification, steps forming the program recorded on a recording medium may be executed in chronological order described in the specification. Alternatively, they may be executed in parallel or individually.

In this specification, the system is an entire apparatus including a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for decoding a coded stream and outputting a decoded stream, comprising:
a plurality of decoding means, for each frame divided into a plurality of predetermined regions equal to the number of decoding means each decoding means performing decoding processing on one predetermined region of each divided frame forming the coded stream; and
output means for receiving a plurality of pixel data obtained as a result of the decoding processing performed by the plurality of decoding means and combining the plurality of pixel data into decoded image data and for outputting the decoded image data,
wherein, among the plurality of decoding means, one decoding means supplies, among pixel data obtained as a result of the decoding processing performed by said one decoding means, pixel data necessary for a future decoding processing performed by another decoding means to said another decoding means, and also obtains, among pixel data obtained as a result of the decoding processing performed by said another decoding means, pixel data necessary for a future decoding processing performed by said one decoding means from said another decoding means, and
said one decoding means performs the decoding processing by referring to the pixel data obtained as a result of the decoding processing perform by said one decoding means and the pixel data obtained in advance from said another decoding means, wherein boundary areas of adjacent predetermined regions are decoded before non-boundary areas of the adjacent predetermined regions such that each decoding means first performs decoding processing for a boundary area of the predetermined region with the adjacent predetermined region which is to be supplied to another decoding means before finishing decoding processing on a remaining area of the predetermined region such that some of the decoding means decode the predetermined region from a top of the predetermined region to a bottom and remaining decoding means decode the bottom of the predetermined region before the top.

2. The image processing apparatus according to claim 1, further comprising:
a plurality of pixel data storage means, the number of pixel data storage means being the same number as the plurality of decoding means, for temporarily storing the pixel data obtained as a result of the decoding processing performed by each of the plurality of decoding means or pixel data necessary for the decoding processing performed by each of the plurality of decoding means,
wherein said one decoding means stores the pixel data obtained as a result of the decoding processing performed by said one decoding means and the pixel data obtained from said another decoding, means in the pixel data storage means, and performs the decoding processing by referring to the pixel data obtained as a result of the decoding processing performed by said one decoding means and stored in the pixel data storage means and the pixel data obtained from said another decoding means and stored in the pixel data storage means.

3. The image processing apparatus according to claim 1, wherein the pixel data necessary for the decoding processing performed by said another decoding means is pixel data included in a motion vector search zone for a motion-compensation reference area included in a predetermined region decoded by said another decoding means, and the pixel data necessary for the decoding processing performed by said one decoding means is pixel data included in a motion vector search zone for a motion-compensation reference area included in a predetermined region decoded by said one decoding means.

4. image processing apparatus according to claim 1, wherein each of the plurality of decoding means is formed of one chip, and input/output terminals of the chips are connected to each other so that the plurality of decoding means are connected to each other to send and receive the pixel data.

5. The image processing apparatus according to claim 1, further comprising:
control means for controlling the decoding processing performed by the plurality of decoding means,
wherein the control means detects a picture type of each picture forming the coded stream, and each of the plurality of decoding means performs the decoding processing based on the picture type detected by the control means.

6. The image processing apparatus according to claim 1, wherein each of the plurality of decoding means detects a picture type of each picture forming the coded stream, and performs the decoding processing based on the detected picture type.

7. The image processing apparatus according to claim 1, further comprising:
stream dividing means for dividing the coded stream,
wherein each of the plurality of decoding means performs the decoding processing on a predetermined region of each frame forming the coded stream divided by the stream dividing means.

8. The image processing apparatus according to claim 7, wherein the stream dividing means divides each frame forming the coded stream into the predetermined regions in units of slices, the number of slices being the same number as the plurality of decoding means.

9. The image processing apparatus according to claim 1, wherein each of the plurality of decoding means receives each frame forming the coded stream, divides the frame into the predetermined regions in units of slices, and extracts and decodes one of the predetermined regions, the number of slices being, the same number as the plurality of decoding means.

10. The image processing apparatus according to claim 1, wherein each of the plurality of decoding means preferentially decodes pixel data necessary for decoding processing performed by said another decoding means.

11. An image processing method for an image processing apparatus for decoding a coded stream and outputting a decoded stream, comprising the steps of:
dividing each frame into a plurality of predetermined regions equal to a number of decoders and performing decoding processing on each predetermined region of each divided frame forming the coded stream by using the plurality of decoders;
supplying, among pixel data obtained as a result of decoding processing performed by one of the plurality of decoders, pixel data necessary for future decoding processing performed by another decoder to said another decoder;
obtaining, among pixel data obtained as a result of the decoding processing performed by said another decoder, pixel data necessary for a future decoding processing performed by said one decoder from said another decoder; and
receiving the pixel data obtained as a result of the decoding processing performed by the plurality of decoders and combining the received pixel data into decoded image data, and outputting the decoded image data,
wherein, in the decoding processing, when the predetermined regions of an inter-frame prediction coded frame are decoded, the predetermined regions are decoded by referring to the pixel data obtained as a result of the decoding processing performed by said one decoder and the pixel data necessary for the decoding processing performed by said one decoder and obtained in advance from said another decoder, and wherein boundary areas of adjacent predetermined regions are decoded before non-boundary areas of adjacent predetermined regions such that each decoder first performs decoding processing for a boundary area of the predetermined region with the adjacent predetermined region which is to be supplied to another decoder before finishing decoding processing on a remaining area of the predetermined region such that some of the decoders decode the predetermined region from a top of the predetermined region to a bottom and remaining decoders decodes the bottom of the predetermined region before the top.

12. An image processing apparatus for decoding a coded stream and outputting a decoded stream, comprising:
a plurality of decoders, for each frame divided into a plurality of predetermined regions equal to the number of decoders each decoder being configured to perform decoding processing on one predetermined region of each divided frame forming the coded stream; and
an output unit configured to receive plurality of pixel data obtained as a result of the decoding processing performed by the plurality of decoders and combining the plurality of pixel data into decoded image data and to output the decoded image data,
wherein, among the plurality of decoders, one decoder supplies, among pixel data obtained as a result of the decoding processing performed by said one decoder, pixel data necessary for a future decoding processing performed by another decoder to said another decoder, and also obtains, among pixel data obtained as a result of the decoding processing performed by said another decoder, pixel data necessary for a future decoding processing performed by said one decoder from said another decoder, and
said one decoder performs the decoding processing by referring to the pixel data obtained as a result of the decoding processing performed by said one decoder and the pixel data obtained in advance from said another decoder, wherein boundary areas of adjacent predetermined regions are decoded before non-boundary areas of adjacent predetermined regions such that each decoder first performs decoding processing for a boundary area of the predetermined region with the adjacent predetermined region which is to be supplied to another decoder before finishing decoding processing on a remaining area of the predetermined region such that some of the decoders decode the predetermined region from a top of the predetermined region to a bottom and remaining decoders decodes the bottom of the predetermined region before the top.

13. A decoding device for decoding a coded stream and outputting a decoded stream, comprising:
one decoder, for each frame divided into a plurality of predetermined regions equal to the number of decoders, performing decoding processing on one predetermined region of each divided frame forming the coded stream; and
transferring unit for transferring pixel data obtained as a result of the decoding processing performed by said one decoder, pixel data necessary for a future decoding processing performed by another decoder to said another decoder, and receiving pixel data obtained as a result of the decoding processing performed by said another decoder, pixel data necessary for a future decoding processing performed by said one decoder from said another decoder when decoding of P pixel data is finished, wherein, said one decoder performs the decoding processing by referring to the pixel data obtained as a result of the decoding processing performed by said one decoder and the pixel data obtained in advance from said another decoder, wherein boundary areas of adjacent predetermined regions are decoded before non-boundary areas of adjacent predetermined regions such that each decoder first performs decoding processing for a boundary area of the predetermined region with the adjacent predetermined region which is to be supplied to another decoder before finishing decoding processing on a remaining area of the predetermined region such that some of the decoders decode the predetermined region from a top of the predetermined region to a bottom and remaining decoders decodes the bottom of the predetermined region before the top.

14. An image processing method for a decoding device for decoding a coded stream and outputting a decoded stream, comprising the steps of:

dividing each frame into a plurality of predetermined regions equal to the number of decoders and performing decoding processing on one predetermined region of each divided frame forming the coded stream by using one decoder;

transferring pixel data obtained as a result of the decoding processing performed by said one decoder, pixel data necessary for a future decoding processing performed by another decoder to said another decoder; and receiving pixel data obtained as a result of the decoding processing performed by said another decoder, pixel data necessary for a future decoding processing performed by said one decoder front said another decoder, wherein, said one decoder performs the decoding processing by referring to the pixel data obtained as a result of the decoding processing performed by said one decoder and the pixel data obtained in advance from said another decoder, and wherein boundary areas of adjacent predetermined regions are decoded before non-boundary areas of adjacent predetermined regions such that each decoder first performs decoding processing for a boundary area of the predetermined region with the adjacent predetermined region which is to be supplied to another decoder before finishing decoding processing on a remaining area of the predetermined region such that some of the decoders decode the predetermined region from a top of the predetermined region to a bottom and remaining decoders decodes the bottom of the predetermined region before the top.

* * * * *